US012750125B2

(12) United States Patent
Angeletti et al.

(10) Patent No.: US 12,750,125 B2
(45) Date of Patent: Sep. 29, 2026

(54) HEURISTIC RADIO RESOURCE MANAGEMENT FOR MASSIVE MIMO IN SATELLITE BROADBAND COMMUNICATION NETWORKS

(71) Applicant: European Space Agency, Paris (FR)

(72) Inventors: Piero Angeletti, Noordwijk (NL); Riccardo de Gaudenzi, Noordwijk (NL)

(73) Assignee: European Space Agency, Paris (FR)

( * ) Notice: Subject to any disclaimer, the term of this patent is extended or adjusted under 35 U.S.C. 154(b) by 216 days.

(21) Appl. No.: 18/684,392

(22) PCT Filed: Aug. 20, 2021

(86) PCT No.: PCT/EP2021/073148
§ 371 (c)(1),
(2) Date: Feb. 16, 2024

(87) PCT Pub. No.: WO2023/020702
PCT Pub. Date: Feb. 23, 2023

(65) Prior Publication Data
US 2025/0047363 A1 Feb. 6, 2025

(51) Int. Cl.
*H04W 16/10* (2009.01)
*H04B 7/08* (2006.01)
*H04B 7/185* (2006.01)

(52) U.S. Cl.
CPC ......... *H04B 7/0897* (2013.01); *H04B 7/1851* (2013.01)

(58) Field of Classification Search
CPC .... H04B 7/0897; H04B 7/1851; H04B 7/088; H04B 7/086; H04B 7/2041; H04B 7/024;
(Continued)

(56) References Cited

U.S. PATENT DOCUMENTS 8,095,139 B2 * 1/2012 Marinier ............. H04W 52/343 455/448
8,451,172 B2 5/2013 Angeletti
(Continued)

FOREIGN PATENT DOCUMENTS

EP 2 296 225 A1 3/2011
WO 2021/254607 A1 12/2021

OTHER PUBLICATIONS

International Search Report for International Application No. PCT/EP2021/073148, mailing date May 24, 22, 25 pages.
(Continued)

*Primary Examiner* — Cindy Trandai
(74) *Attorney, Agent, or Firm* — Seed Intellectual Property Law Group LLP

(57) ABSTRACT

Beam pointing directions and resource mappings are determined for performing wireless communications between a hub station and a plurality of user terminals. For at least one user terminal, a set of candidate beam pointing directions among a predefined set of beam pointing directions is determined such that the candidate beam pointing directions differ from a direction pointing towards the at least one user terminal by less than a predefined amount. For each of the candidate beam pointing directions, a quantity is determined that is positively correlated with an aggregated interference that a beam pointing in the respective candidate beam pointing direction would either cause for the remaining user terminals or receive from the remaining user terminals among the plurality of user terminals, and for serving the at least one user terminal, a candidate beam pointing direction is selected among the set of candidate beam pointing directions that minimizes said quantity.

12 Claims, 41 Drawing Sheets

(58) Field of Classification Search
CPC . H04W 36/20; H04W 36/0072; H04W 16/10; H04W 16/14; H04W 24/02; H04W 28/16; H04W 72/541; H04W 72/27; H04W 84/045
See application file for complete search history.

(56) References Cited

U.S. PATENT DOCUMENTS

| | | | | |
|---|---|---|---|---|
| 9,654,201 | B2 | 5/2017 | Angeletti et al. | |
| 10,085,154 | B2 * | 9/2018 | Zhang | H04W 72/23 |
| 10,178,664 | B1 * | 1/2019 | Mansour | H04W 52/243 |
| 10,470,137 | B2 * | 11/2019 | Boudreau | H04W 88/06 |
| 2011/0117967 | A1 * | 5/2011 | Vedantham | H04W 72/541 455/561 |
| 2014/0024386 | A1 * | 1/2014 | Novak | H04W 72/541 455/452.1 |
| 2016/0128001 | A1 * | 5/2016 | Tsuda | H04W 52/143 370/329 |
| 2019/0207657 | A1 * | 7/2019 | Cao | H04W 72/12 |
| 2020/0008204 | A1 * | 1/2020 | Matsumura | H04L 27/261 |
| 2020/0059278 | A1 * | 2/2020 | Wu | H04B 7/068 |
| 2020/0128552 | A1 * | 4/2020 | Son | H04W 52/242 |
| 2020/0153570 | A1 * | 5/2020 | Peng | H04W 72/542 |
| 2020/0236697 | A1 * | 7/2020 | Takeda | H04W 76/11 |
| 2021/0337450 | A1 * | 10/2021 | Chen | H04W 36/0072 |
| 2022/0272746 | A1 * | 8/2022 | Sevindik | H04W 72/1268 |
| 2023/0261710 | A1 | 8/2023 | De Gaudenzi et al. | |
| 2023/0268964 | A1 * | 8/2023 | Hadani | H04B 7/0486 375/262 |

OTHER PUBLICATIONS

Angeletti, P. "Multiple Beams From Planar Arrays", IEEE Transactions on Antennas and Propagation, vol. 62, No. 4, Apr. 2014, 12 pages.
Björnson, E. et al., Chapter 3 of the book "Massive MIMO Networks: Spectral, Energy, and Hardware Efficiency", http://www.nowpublishers.com, 2017, 507 pages.
Hamici, Z. "Fast Beamforming With Fault Tolerance in Massive Phased Arrays Using Intelligent Learning Control", IEEE Transactions on Antennas and Propagation, vol. 67, No. 7, Jul. 2019, 11 pages.
Angeletti, P. et al., "A Pragmatic Approach to Massive MIMO for Broadband Communication Satellites", IEEE*Access*, 2020, 25 pages.
Chen, Z. et al., "SPSA-Based Successive Beamforming for Mobile Satellite Receivers with Phased Arrays", arxiv.org, Apr. 19, 2021, 5 pages.
Re, E. et al. "Radio resource management for large constellations in a spectrum sharing environment", *Int J Satell Commun Network*, 2021; 39:78-91, 14 pages.

* cited by examiner $k = 1$ $k = 2$ $k = 3$ $k = 4$

HEURISTIC RADIO RESOURCE MANAGEMENT FOR MASSIVE MIMO IN SATELLITE BROADBAND COMMUNICATION NETWORKS

BACKGROUND

Technical Field

This application relates to methods of determining beam pointing directions for performing wireless communications between a hub station and a plurality of user terminals, methods of determining a radio resource mapping for performing wireless communications between a hub station and a plurality of user terminals, and methods of performing wireless communications between a hub station and a plurality of user terminals. In particular, the application relates to practical techniques for implementing solutions approaching the Massive Multiple-Input Multiple-Output (Massive MIMO, or M-MIMO) performance in telecommunication broadband access networks with much lower complexity. Such networks use line of sight telecommunication between the user terminals and (terrestrial) base stations generating a multitude of ground-based cells or satellites (connected to terrestrial hub stations) generating a multitude of beams. The base/hub stations are linking the user terminals to the terrestrial networks. The application further relates to corresponding apparatus for performing wireless communications, and to corresponding computer programs and computer-readable storage media.

Description of the Related Art

The need for higher throughput, hence large frequency reuse, in point-to-point satellite communications has triggered the exploitation of payloads with a large number of beams and the development of associated technologies. While the increase of the number of satellite beams is beneficial in terms of achievable frequency reuse and antenna gain, its practical adoption creates a number of system-level issues. The main challenge is related to the non-uniform nature of traffic seen by a satellite with large coverage area. This is because the satellite broadband access services are playing a complementary role to terrestrial networks. Hence, satellite use is mainly related to underserved regions such as low-densely populated areas, maritime and, aviation routes over non populated areas (e.g., oceanic routes). To cope with this spatially uneven and time variant traffic distribution over the satellite coverage area, a number of technologies to support flexible payload resource allocation have been devised and are continuously improved.

Regardless of any recent advancements in the field, there is a need for practical techniques for adopting M-MIMO in communication networks, such as broadband satellite networks. There is particular need for such techniques that require reduced computation power and/or that can accommodate for higher numbers of user terminals.

BRIEF SUMMARY

In view of some or all of these needs, the present disclosure proposes methods of determining beam pointing directions for performing wireless communications between a hub station and a plurality of user terminals, methods of determining a radio resource mapping for performing wireless communications between a hub station and a plurality of user terminals, methods of performing wireless communications between a hub station and a plurality of user terminals, as well as corresponding apparatus, computer programs, and computer-readable storage media, having the features of the respective independent claims. The proposed resource management techniques are effective to cope with uneven users' traffic distributions optimizing, with truly affordable computational complexity (linear dependency to the number of users instead of exponential), situations where the same spectrum resources are allocated to too closer users.

An aspect of the disclosure relates to a method of determining beam pointing directions for performing wireless communications between a hub station and a plurality of user terminals. The plurality of user terminals may relate to user terminals that are jointly served within a given radio resource block, i.e., they may correspond to co-channel users. The user terminals may be located at (substantially) known locations. The method may include, for at least one user terminal of the plurality of user terminals, determining a set of candidate beam pointing directions among a predefined set of beam pointing directions, such that the candidate beam pointing directions differ from a direction pointing towards the at least one user terminal by less than a predefined amount. The method may further include, for the at least one user terminal of the plurality of user terminals, for each of the candidate beam pointing directions, determining a quantity that is positively correlated with an aggregated interference that a beam pointing in the respective candidate beam pointing direction would cause for the remaining user terminals among the plurality of user terminals, or that is positively correlated with an aggregated interference that a beam pointing in the respective candidate beam pointing direction would receive from the remaining user terminals among the plurality of user terminals. The two alternatives for the determined quantity may relate to a hub station acting as a transmit hub station and as a receive hub station, respectively. The method may yet further include, for the at least one user terminal of the plurality of user terminals, selecting, for serving the at least one user terminal, the candidate beam pointing direction among the set of candidate beam pointing directions that minimizes the determined quantity. The method may be performed for each of the plurality of user terminals.

Thereby, useful gains and unwanted interferences for co-channel users can be optimized to improve overall throughput for a given assignment of user terminals to radio resource blocks (e.g., colors). Since the main-lobe interference is mainly dependent on the distance of the beam position (beam pointing direction) to the interfered user terminals' positions, the optimization of the beam positions achieved by the proposed method can be translated into a distancing of the beams from the nearest-neighbor users. Accordingly, the distance between co-channel users is virtually increased by the proposed method, to the benefit of overall throughput.

In some embodiments, the determined quantity for a given candidate beam pointing direction may be further inversely proportional to a gain, towards the at least one user terminal, of the beam pointing in the given candidate beam pointing direction.

In some embodiments, the predefined set of beam pointing directions may correspond to a plurality of fixed beams, each fixed beam having a respective beam pointing direction and a respective beam center. Therein, the beam centers of the plurality of fixed beams may be arranged at the vertices of a regular lattice. This allows for computationally efficient selection of appropriate beam pointing directions that maximize usable gain and minimize unwanted interference.

In some embodiments, the plurality of fixed beams may have a normalized beam spacing between adjacent beams that is smaller than 1.

Another aspect of the disclosure relates to a further method of determining beam pointing directions for performing wireless communications between a hub station and a plurality of user terminals. The method may include, for at least one user terminal of the plurality of user terminals, iteratively determining a beam pointing direction for serving the at least one user terminal by incrementally updating an intermediate beam pointing direction until a termination criterion is met. The intermediate beam pointing direction in a given iteration may be referred to as a current or temporary beam pointing direction. The repeated incremental updating of the intermediate beam pointing direction may eventually valorize gain towards the (served) at least one user terminal for the respective intermediate beam pointing direction. For each iteration, the intermediate beam pointing direction may be incrementally updated such that the value of a cost function is optimized under the constraint that a gain towards the at least one user terminal for the intermediate beam pointing direction exceeds a predefined minimum gain. Therein, the cost function may be designed to penalize aggregated interference that a beam pointing in the intermediate beam pointing direction would cause for the remaining user terminals among the plurality of user terminals. Optimizing the value of the cost function may mean reducing (e.g., minimizing) its value. The constraint that the gain towards the at least one user terminal for the intermediate beam pointing direction exceeds the predefined minimum gain may translate into a constraint that the intermediate beam pointing direction differs from a direction pointing towards the user terminal to be served by less than a predefined amount. An alternative, yet depending on circumstances preferred embodiment relates to optimizing the beam pointing directions by selection from a predefined set of beam pointing directions (e.g., corresponding to the vertices of a regular lattice) to maximize the usable gain while minimizing the sum interference for co-channel users.

Thereby, useful gains and unwanted interferences for co-channel users can be optimized to improve overall throughput for a given assignment of user terminals to radio resource blocks (e.g., colors). Since the main-lobe interference is mainly dependent on the distance of the beam position (beam pointing direction) to the interfered user terminals' positions, the optimization of the beam positions achieved by the proposed method can be translated into a distancing of the beams from the nearest-neighbor users. Accordingly, the distance between co-channel users is virtually increased by the proposed method, to the benefit of overall throughput.

In some embodiments, for each iteration, the intermediate beam pointing direction may be incrementally updated such that the value of the cost function is optimized under the constraint that a difference between the intermediate beam pointing direction and a direction pointing towards the at least one user terminal does not exceed a predefined maximum difference. Therein, the cost function may be designed to penalize closeness between the intermediate beam pointing direction and respective directions pointing towards the remaining user terminals among the plurality of user terminals if differences between the intermediate beam pointing direction and the respective directions pointing towards the remaining user terminals are less than a predefined threshold. Further, for any of the remaining user terminals, the respective penalty may increase as the difference between the intermediate beam pointing direction and the direction pointing towards the respective user terminal among the remaining user terminals decreases. The aforementioned constraint may be implemented by a hard cut-off for the update amount of the current beam pointing direction, for example. Enforcing this constraint may trigger the termination criterion.

In some embodiments, optimization of the value of the cost function in each iteration may involve determining a set of virtual forces between the directions pointing towards the remaining user terminals and the intermediate beam pointing direction. These virtual forces may be repulsive forces that act on the intermediate beam pointing direction and that depend on respective differences between the intermediate beam pointing direction and respective directions pointing towards the remaining user terminals. Said optimization may further involve determining an update amount for the intermediate beam pointing direction based on a virtual net force of the set of virtual forces. The virtual forces may be modeled according to a (modified) Hooke's law, for example. The update amount may indicate an update direction and an update magnitude. Said update amount may be determined by numeric integration, for example.

Defining a set of distance-dependent repulsive forces between beam pointing directions and user terminals other than respective user terminals to be served allows for an efficient implementation of the aforementioned cost function, and to ensure both sufficient usable gain as well as minimized unwanted interference.

In some embodiments, the virtual forces may be modeled to be zero if the respective differences between the intermediate beam pointing direction and respective directions pointing towards the remaining user terminals exceed the predefined threshold.

In some embodiments, the virtual forces may be modeled to be discontinuous at the predefined threshold for respective differences between the intermediate beam pointing direction and respective directions pointing towards the remaining user terminals.

Thereby, it is ensured that beam pointing directions are not pushed away from non-served users by more than an amount that is necessary for ensuring acceptably low interference, while also ensuring a limited gain loss. In other words, the latter property of the virtual forces ensures that a beam pointing direction is pushed away from a non-served user up to the aforementioned predefined threshold, if possible, instead of only asymptotically approaching this predefined threshold.

In some embodiments, the termination criterion may relate to at least one of a number of iterations, a magnitude of an update amount of the intermediate beam pointing direction from one iteration to the next iteration, and/or differences between the intermediate beam pointing direction and respective directions pointing towards the remaining user terminals. For example, iterative determination of the beam pointing direction may be terminated if the number of iteration has reached a predefined number, if the update amount is smaller than a predefined amount, or if said differences all exceed the predefined threshold.

Another aspect of the disclosure relates to a method of determining a radio resource mapping that assigns a plurality of user terminals to a set of radio resource blocks, for performing wireless communications between a hub station and the plurality of user terminals. The method may include obtaining a set of quantities indicating mutual radio interferences between pairs of user terminals among the plurality of user terminals. The method may further include determining the radio resource mapping in one or more iterations, by successively updating an intermediate radio resource mapping, applying the constraint that each user terminal is assigned to at most one radio resource block among the set of radio resource blocks. Each iteration may include determining, for each radio resource block, based on the intermediate radio resource mapping and the set of quantities indicating mutual radio interferences, indications of aggregated radio interferences that would be received by any non-assigned user terminals among the plurality of user terminals, if assigned to the respective radio resource block, from any user terminals already assigned to the respective radio resource block. Each iteration may further include, for a given non-assigned user terminal, determining, based on said indications of aggregated radio interferences, the radio resource block among the set of radio resource blocks that would result in the smallest aggregated radio interference for the given non-assigned user terminal. Each iteration may yet further include updating the intermediate radio resource mapping to assign the given non-assigned user terminal to the determined radio resource block. The radio resource blocks may be referred to as colors, for example. In the resulting radio resource mapping, each active user terminal may be assigned to at least one (e.g., exactly one) radio resource block. The assignment of more than one radio resource block per user may be required when users have different Service Level Agreement (e.g. peak data rate) or are given different physical layer configurations hence spectral efficiencies (physical layer MODCOD, see Section II.B.) because of the different signal-to-noise plus interference ratios experienced. To simplify notation, throughout the present disclosure it will be referred to the case of single resource block/user allocation, without intended limitation.

The proposed method allows for computationally efficient RRM and is applicable in particular to M-MIMO satellite forward links. Compared to Mixed Integer Quadratic Programming (MIQP)-based approaches, computational complexity of the proposed method grows linearly with the number of active user terminals, instead of exponentially. While being computationally much more efficient than MIQP-based approaches for RRM applied to M-MIMO, the proposed method features a performance in terms of throughput that is very close to the theoretical optimum of MIQP-based approaches. It is to be remarked that although reference is made to the forward link of a multi-beam satellite network with full frequency reuse, the proposed techniques and embodiments are applicable to more conventional color reusing schemes and applicable to both the forward and the return link for both satellite and terrestrial networks. Extensions to these cases are described in Appendix B.

In some embodiments, the method may further include, in each iteration, determining, based on said indications of aggregated radio interferences, a non-assigned user terminal that would receive the largest aggregated radio interference among the non-assigned user terminals for any of the radio resource blocks. The method may further include, in each iteration, selecting the determined non-assigned user terminal as the given non-assigned user terminal. This may amount to selecting, based on said indications, the non-assigned user terminal that has the largest aggregated radio interference. Specifically, said indications specify a non-assigned user terminal and a potential assignment of this non-assigned user terminal to a radio resource block that would result in the largest aggregated radio interference among the aggregated radio interferences indicated by said indications. This non-assigned user terminal may then be selected. In yet other words, for each user terminal, that radio resource block may be considered that would result in the maximum aggregated radio interference for the respective user terminal, and subsequently, the user terminal may be selected that has the largest maximum aggregated radio interference.

Thus, in each iteration, the respective most interfered user is identified and assigned to a color that minimizes the aggregated interference. Thereby, in each iteration a potential worst case assignment is identified and a radio resource block assignment is chosen that ensures that the worst case assignment is avoided in the eventual radio resource mapping. It is further ensured that each iteration achieves optimum reduction of overall aggregated interference.

In some embodiments, the given non-assigned user terminal may be a user terminal that newly requests wireless communication with the hub station. Thereby, user terminals that newly become active can be readily integrated into an established communication system in real time.

In some embodiments, the method may further include, in a first iteration, selecting the user terminal that has the largest mutual radio interference among the mutual radio interferences. The method may further include, in the first iteration, initializing the intermediate radio resource mapping to assign the selected user terminal to a radio resource block among the set of radio resource blocks. The radio resource block selected for assignment in the first iteration may be an arbitrary radio resource block, such as a first radio resource block in a chosen numbering of radio resource blocks. After the first iteration, which may be said to correspond to an initialization of the iterative determination of the radio resource mapping, said iterative determination may include one iteration for each of the remaining user terminals among the plurality of user terminals. This allows for a meaningful initialization of the proposed method.

In some embodiments, obtaining the set of quantities indicating mutual radio interferences between pairs of (active) user terminals among the plurality of user terminals may include obtaining an N×N interference matrix Q that indicates mutual radio interferences between pairs of (active) user terminals among the plurality of user terminals, where N is the number of (active) user terminals. In some embodiments, determining the indications of aggregated radio interferences may include determining an N×C aggregated interference matrix A by a matrix multiplication based on the interference matrix Q and an N×C intermediate radio resource mapping matrix C, where C is the number of radio resource blocks. Here, matrix entries $a_{ij}$ of the aggregated interference matrix A may indicate an aggregated radio interference that an i-th user terminal would receive if assigned to a j-th radio resource block. Therein, the radio resource mapping matrix C may be a binary matrix that implements the intermediate radio resource mapping. Matrix entries $c_{ij}$ of the radio resource mapping matrix C may indicate whether or not the i-th user terminal is assigned to the j-th radio resource block. The matrix A may be determined via A=QC. An entry $Q_{ij}$ of the interference matrix Q may indicate the power that is transmitted for the i-th user but received by the j-th user. It is understood that the assignment of user terminals and radio resource blocks to rows and columns, respectively, of the A and C matrices may be an arbitrary choice and might be reversed in some implementations. Columns and rows of the matrix Q that relate to already assigned users may be omitted in the matrix multiplication(s), along with corresponding rows (or columns, depending on the column/row assignment) of the matrix C.

Richness of information in the matrix A thus defined allows very efficient selection of user terminals and assignment of the selected user terminals to radio resource blocks, to minimize the overall aggregated radio interference.

In some embodiments, the method may further include determining the set of quantities indicating mutual radio interferences between pairs of user terminals among the plurality of user terminals based on mutual distances on ground between the user terminals among the plurality of terminals. Alternatively, the method may further include determining the set of quantities indicating mutual radio interferences between pairs of user terminals among the plurality of user terminals based on an independent determination of a beam pattern for each user terminal among the plurality of user terminals. Further alternatively, the method may further include determining the set of quantities indicating mutual radio interferences between pairs of user terminals among the plurality of user terminals based on a channel matrix representing a complex transfer function between an antenna array of the hub-station array and the plurality of user terminals.

In some embodiments (see for example Appendix B), obtaining the set of quantities indicating mutual radio interferences between pairs of user terminals among the plurality of user terminals may include obtaining a CN×CN generalized interference matrix $\tilde{Q}$ that indicates mutual radio interferences between pairs of user terminals among the plurality of user terminals, with a first user terminal using one of the radio resource blocks of C radio resource blocks, and a second user terminal using another one of the radio resource blocks of C radio resource blocks, where N is the number of (active) user terminals. Therein, determining the indications of aggregated radio interferences may include determining an N×C aggregated interference matrix A by a reordering of a matrix multiplication based on the generalized interference matrix Q and a vectorization of a N×C intermediate radio resource mapping matrix C, where C is the number of radio resource blocks, with matrix entries $a_{ij}$ of the aggregated interference matrix A indicating an aggregated radio interference that an i-th user terminal would receive if assigned to a j-th radio resource block. Further, the radio resource mapping matrix C may be a binary matrix that implements the intermediate radio resource mapping, with matrix entries $c_{ij}$ indicating whether or not the i-th user terminal is assigned to the j-th radio resource block. For the generalized interference matrix $\tilde{Q}$ the columns may relate to user terminals. The matrix A may be determined via $A=\mathrm{vec}^{-1}(\tilde{Q}\,\mathrm{vec}(C))$, where $\mathrm{vec}^{-1}(\ )$ indicates the reordering and vec( ) indicates a vectorization.

In some embodiments, the radio resource blocks may be time slots, frequency slots, pseudo-random spreading sequences, polarization modes, or combinations thereof.

Another aspect of the disclosure relates to a method of performing wireless communications between a hub station and a plurality of user terminals. The method may include the method of determining beam pointing directions as described herein, and/or the method of determining a radio resource mapping as described herein.

In some embodiments, the method may further include precoding and/or beamforming. Beamforming in this context may be optimal beamforming. Techniques for (optimal) beamforming may include matched filtering, zero forcing, and MMSE, for example.

According to another aspect, a computer program is provided. The computer program may include instructions that, when executed by a processor (e.g., computer processor, server processor), cause the processor to carry out all steps of the methods described throughout the disclosure.

According to another aspect, a non-transitory computer-readable storage medium is provided. The computer-readable storage medium may store the aforementioned computer program.

According to yet another aspect an apparatus including a processor and a memory coupled to the processor is provided. The processor may be adapted to carry out all steps of the methods described throughout the disclosure. This apparatus may relate to a controller of a hub station, for example.

It will be appreciated that apparatus features and method steps may be interchanged in many ways. In particular, the details of the disclosed apparatus (e.g., hub station) can be realized by the corresponding method of operating the apparatus (e.g., communication method), and vice versa, as the skilled person will appreciate. Moreover, any of the above statements made with respect to the apparatus are understood to likewise apply to the corresponding method, and vice versa.

BRIEF DESCRIPTION OF THE SEVERAL VIEWS OF THE DRAWINGS

Example embodiments of the disclosure are explained below with reference to the accompanying drawings, wherein FIG. 1 schematically illustrates an example of a physical layer superframe structure that may be used in the context of the present disclosure.

as functions of the ratio $$\frac{S_T}{S_A},$$

Figure 29:
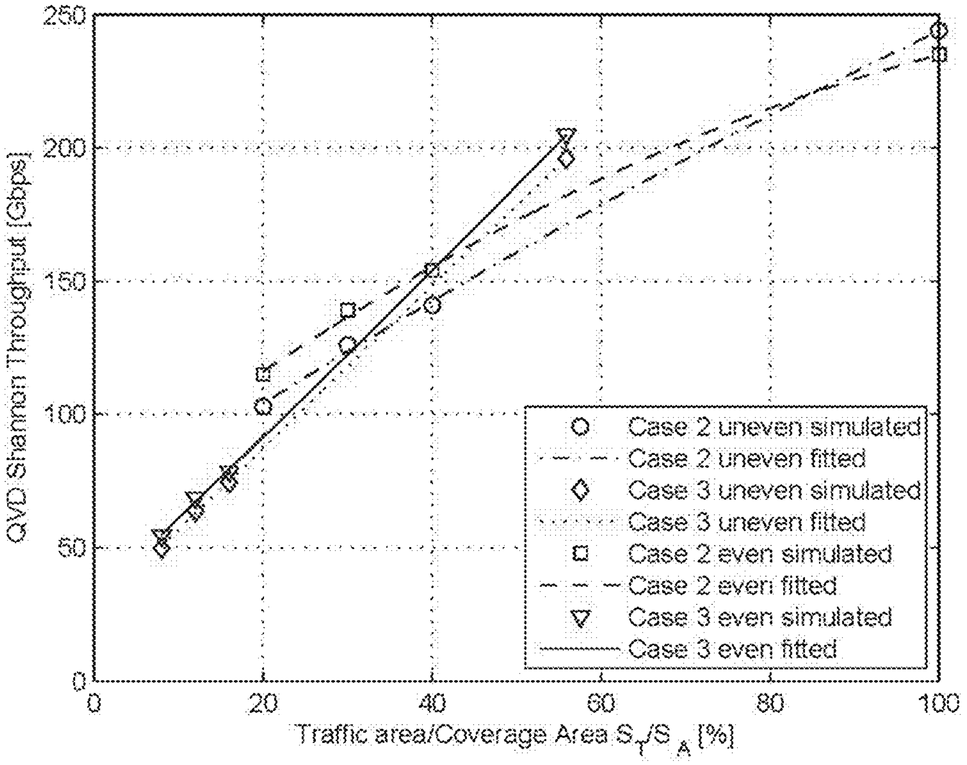
Figure 30:
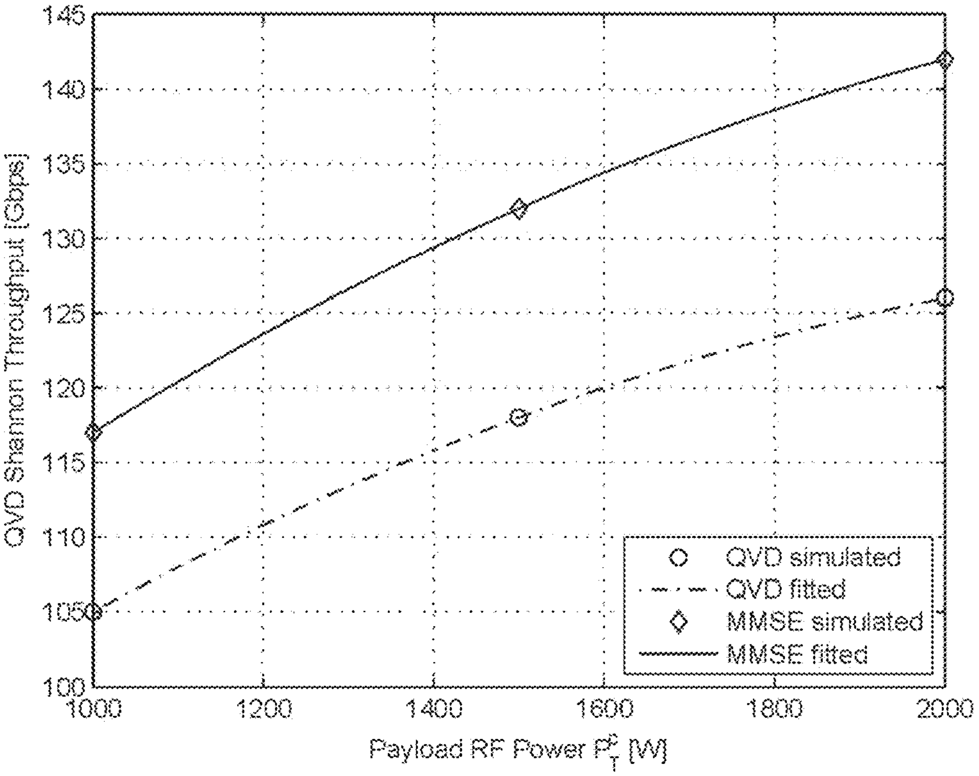
Figure 31:
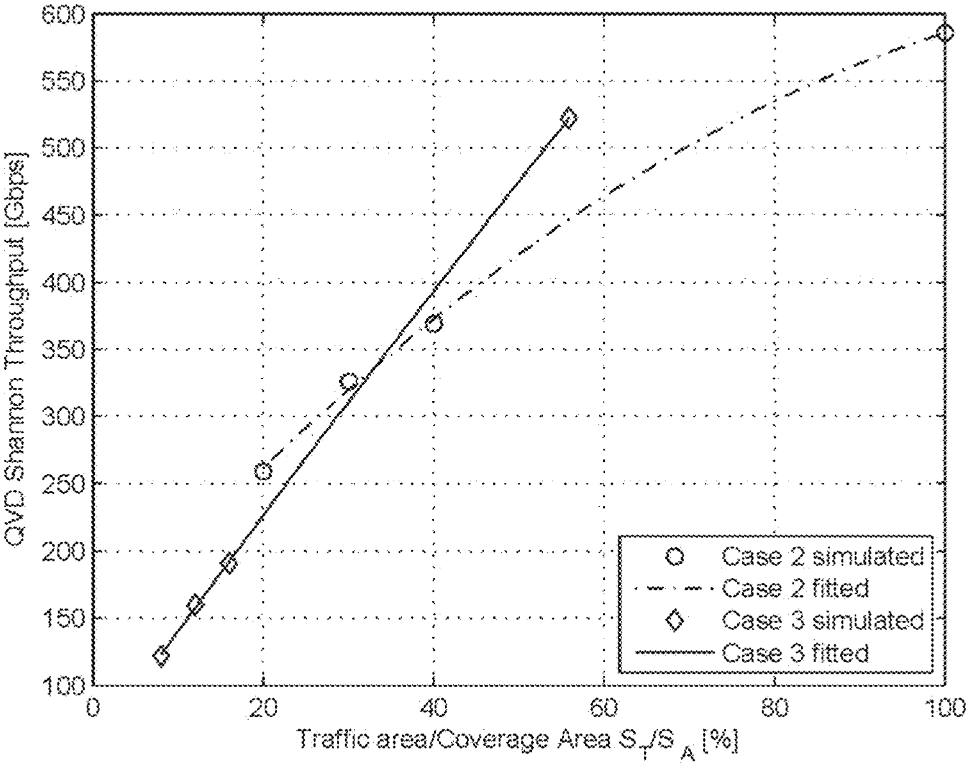
Figure 32:
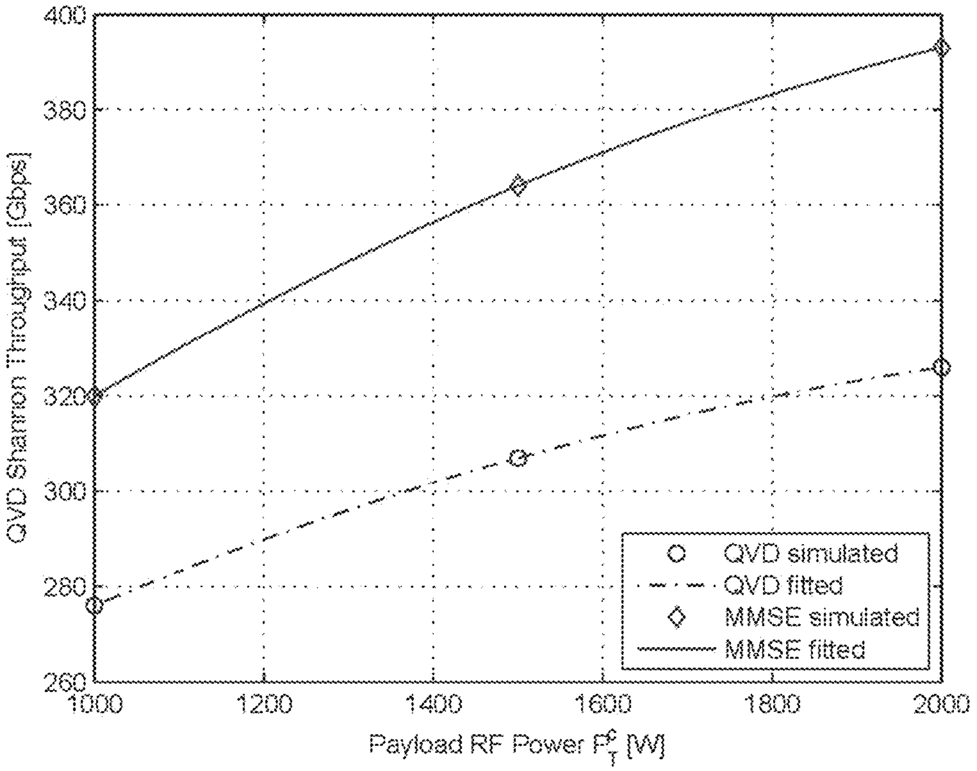
Figure 33A:
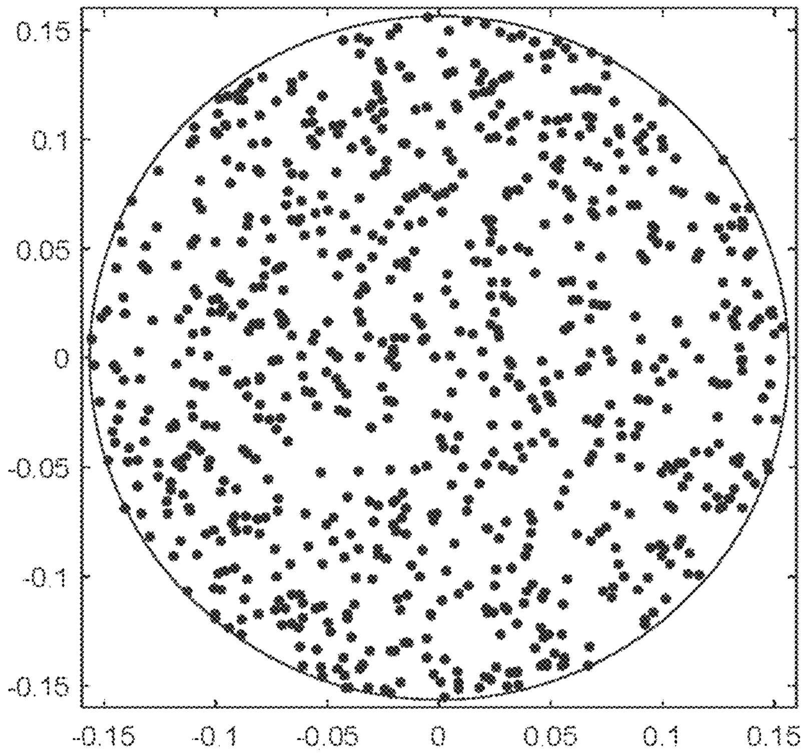
Figure 33B:
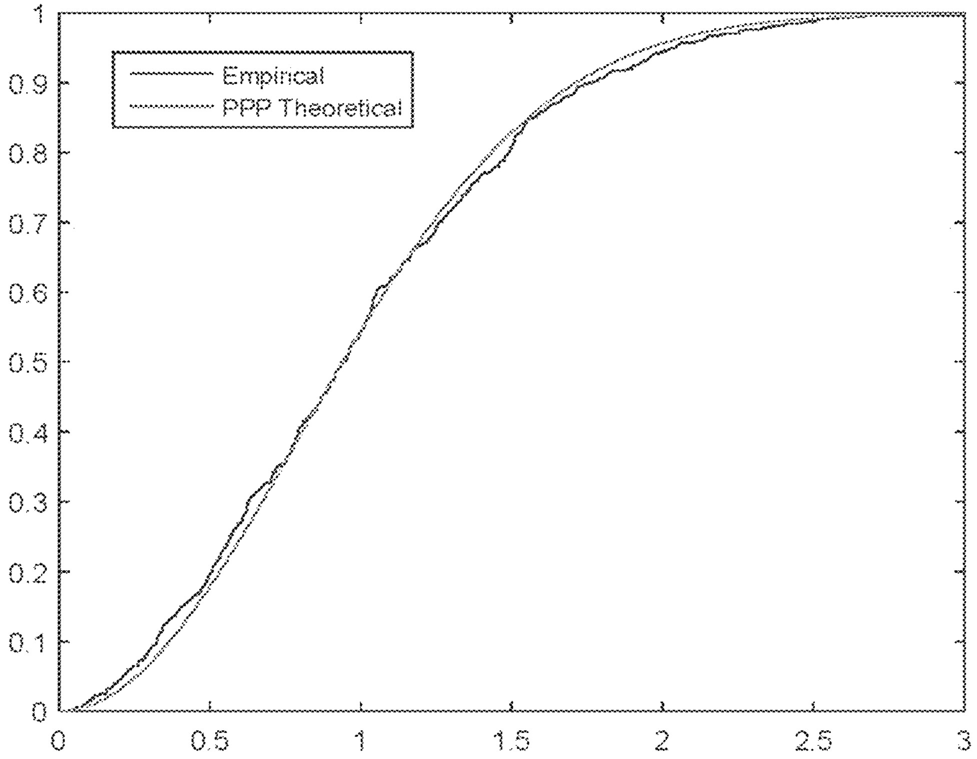
Figure 34A:
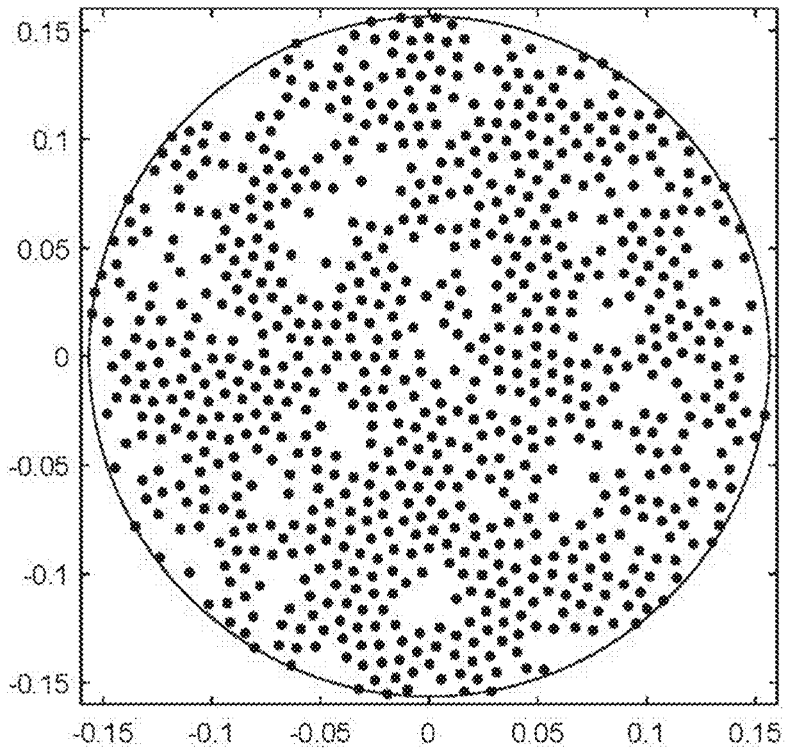
Figure 34B:
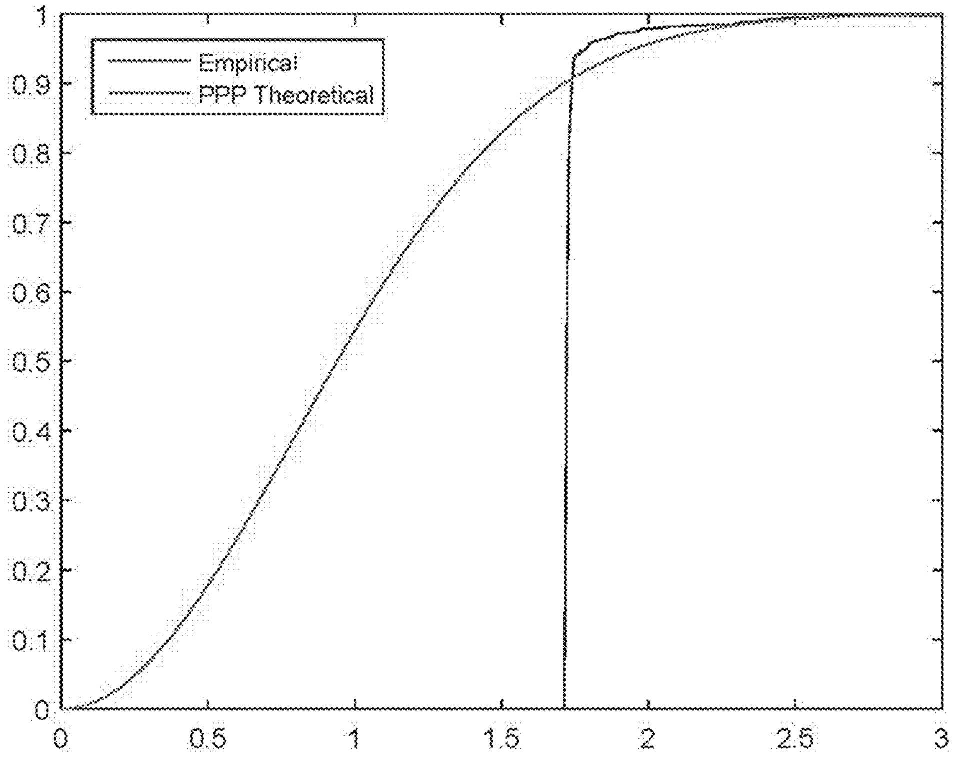
Figure 35A:
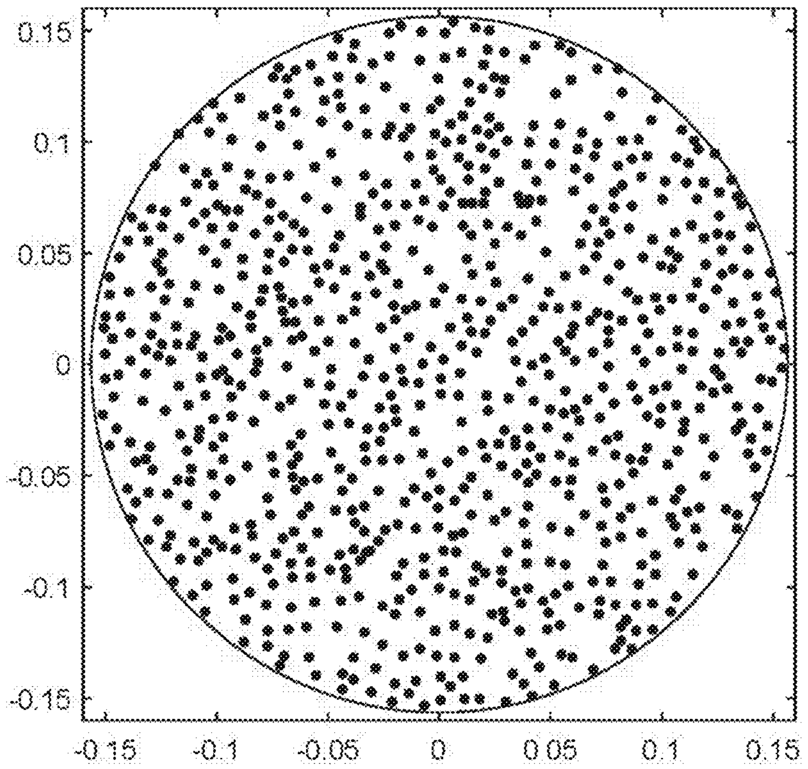
Figure 35B:
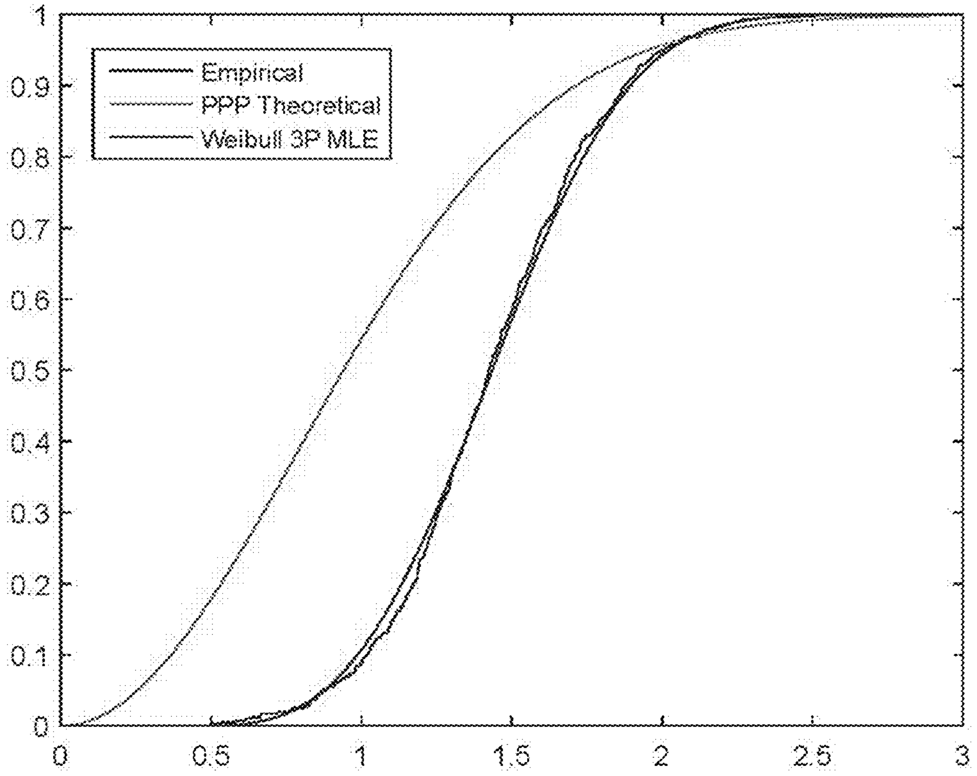

according to embodiments of the present disclosure,

FIG. 29 is a graph schematically illustrating examples of simulated Shannon throughput achievable according to embodiments of the present disclosure as function of the ratio $$\frac{S_T}{S_A}$$

for the second and third example cases,

FIG. 30 is a graph schematically illustrating an example of simulated Shannon throughput achievable according to embodiments of the disclosure as function of the RF power $$P_T^c$$

for a realization of the second example case,

FIG. 31 is a graph schematically illustrating further examples of simulated Shannon throughput achievable according to embodiments of the present disclosure as function of the ratio $$\frac{S_T}{S_A}$$

for the second and third example cases,

FIG. 32 is a graph schematically illustrating a further example of simulated Shannon throughput achievable according to embodiments of the present disclosure as function of the RF power $$P_T^c$$

for a realization of the second example case,

FIGS. 33A and 33B schematically illustrate an example of a Poisson point distribution, FIGS. 34A and 34B schematically illustrate an example of a Poisson disk process distribution, and FIGS. 35A and 35B schematically illustrate an example of a point pattern representing a user distribution to which embodiments of the present disclosure may be applied.

DETAILED DESCRIPTION

The Figures (Figs.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

I. INTRODUCTION AND MOTIVATION

To cope with this spatially uneven and time variant traffic distribution over the satellite coverage area, a number of technologies to support flexible payload resource allocation have been devised and are continuously improved. Among the most important technologies, digital on-board processors, beam hopping, adaptive coding and modulation, and flexible power allocation per beam and active antennas are mentioned. Satellites equipped with flexible payload and resource allocation have the potential to mitigate the demand supply space-time mismatch due to their high altitude and large coverage area. On the other hand, terrestrial networks deployment is sized for a given traffic pattern (e.g., cell size and density) with limited short/medium term flexibility to cover demand evolution.

As flexible multi-beam payload technologies became available at affordable cost, the problem on how to manage the intrinsic space segment flexibility arose. As a consequence, Radio Resource Management (RRM) for multi-beam satellite networks became an active field of research in the last fifteen years.

Previous approaches towards RRM for multi-beam satellite networks have assumed, with few exceptions, a conventional geostationary orbit (GSO) and single feed per beam payload architecture.

One feasible approach deals with the optimum power and spotbeam allocation to satisfy demand and quality of service in a multi-beam satellite system. Substantial power gains and fairness advantages can be realized by using parallel multibeams with optimum power allocation.

Further, optimal solutions for joint resource allocation and congestion control over satellite downlinks based on incoming traffic were investigated for multiple beam and phased array antennas. It has been shown that the optimum beam pattern depends on the distances between users and their signal-to-noise ratios (SNRs).

Another feasible approach involves a cross-layer design for the packet scheduling on a forward link that implements ACM under the assumptions that power and bandwidth are constant. Here the power and bandwidth allocation per beam is considered to be fixed while the presence of multi-beam co-channel interference and atmospheric fading is considered.

Another feasible approach for addressing the issue of multi-beam satellite system design in the presence of uneven traffic request is based on jointly optimizing power and carrier bandwidth allocation in order to best match the asymmetric traffic requests. Further, beam hopping may be used to provide satellite payload flexibility to cope with uneven traffic, where beam-hopping and non-orthogonal frequency reuse may be dual to each other in the time and frequency domains, respectively. Yet further, minimizing differences between beam traffic demands and allocated beam throughput in allocating the active beams' bandwidth may achieve a trade-off between the maximum total capacity and proportional fairness among beams.

Another feasible approach aims at the joint beam size and bandwidth allocation to cope with non-uniform traffic conditions. A dynamic power allocation algorithm based on duality theory may be used to obtain a locally optimal solution for the optimization problem. Compared to traditional power allocation algorithms, this dynamic power allocation algorithm can improve the fairness of power allocation amongst the beams, and in certain scenarios, can increase the total system capacity.

For the feeder link, satellite-switched smart gateway diversity may be combined with scheduling methods to improve the feeder link availability in rain fading conditions. For the user link, interference-aware scheduling with beam hopping for the forward link may be implemented. Further, a two-stage multi-objective optimization approach employing state-of-the-art heuristic optimization algorithms may be applied to a payload allowing flexible per beam power allocation.

According to another feasible approach, the system throughput or rate matching may be taken as the optimization object and the problem may be modeled as energy efficiency optimization under the constrained power resource available in satellite. In this case, as for the other approaches described above, the co-channel interference is assumed to be negligible.

Another feasible approach may be to geometrically separate users for a multi-beam single feed per beam satellite system with precoding.

Another feasible approach introduces the concept of combining beam hopping with interference mitigation (preferably centralized precoding) allocating resources in a way to reduce the precoding complexity. However, it is not apparent how this approach would work with realistic traffic scenarios.

However, none of currently available approaches for RRM covers the case of Massive Multiple-Input Multiple Output (M-MIMO) for the satellite forward link, which case is considered to be the most constraining one. The present disclosure seeks to provide a heuristic computational efficient solution for satellite multi-beam pragmatic M-MIMO approximating the Mixed Integer Quadratic Programming (MIQP) approach in terms of performance. An example of the MIQP approach is described in P. Angeletti, R. De Gaudenzi, "A Pragmatic Approach to Massive MIMO for Broadband Telecommunication Satellites," IEEE Access, Vol. 8, pp. 132212-132236, 16 Jul. 2020 (hereafter "reference literature 1"). It can be shown that the proposed heuristic RRM (H-RRM) algorithm has performance very close to the MIQP with a complexity linearly (instead of exponentially) dependent on the number of users. The H-RRM solution optimally organizes the active users' population in the system resource colors (e.g., slices in time, frequency, or code) and can be further enhanced by a further beam selection optimization step based on the so called "virtual distancing" technique. The proposed heuristic RRM solution can be easily implemented using the current DVB-S2X standard and perfectly matches the Multi-Beam (MB) M-MIMO simplified payload architecture proposed in reference literature 1.

Although the RRM technique proposed by the present disclosure may be particularly suited for the pragmatic M-MIMO case (e.g., as per reference literature 1) it can also be used in more conventional multi-beam satellite systems exploiting frequency coloring schemes or other coloring schemes.

Two new "virtual distancing" approaches provided by the present disclosure allow to determine beam steering positions/beam pointing directions) and relevant precoding/beamforming vectors based on the knowledge of the contemporary active users with an associated improvement of the overall system throughput. Although the proposed approaches are described in relation to pragmatic-MIMO and H-RRM techniques, they have broader applicability to multibeam flexible payloads and wireless multiple user systems.

Both the H-RRM and the virtual distancing techniques only require approximated (e.g., few km accuracy for the Geostationary satellite case) information of the user geographical positions and antenna layout, and imply a low implementation complexity.

Thorough extensive computer simulations the H-RRM techniques have been applied to the pragmatic M-MIMO multibeam satellite system in the presence of several non-uniform and uniform (best case) traffic scenarios. Results thereof are presented towards the end of the present disclosure. For all traffic distribution cases investigated, the pragmatic M-MIMO throughput performance are shown to be only slightly below to ideal Minimum Mean Square Error (MMSE) M-MIMO precoding with ideal channel estimation and adopting the same H-RRM scheme. On the other hand, when using a simple RRM scheme for MMSE M-MIMO, the performances of the latter are well below the pragmatic M-MIMO using H-RRM. Simulation results show a truly remarkable H-RRM algorithm robustness to very different traffic scenarios and allow to understand the system throughput performance dependency on key system parameters. It is also to be noted that MMSE M-MIMO represents a purely theoretical upper bound as it cannot be implemented in practice without major impairments. By contrast, the proposed H-RRM combined with the pragmatic M-MIMO approach represents a readily feasible solution.

The present disclosure is organized as follows: Section II described the M-MIMO system in terms of forward link, physical layer and traffic models. Section III outlines the proposed H-RRM algorithms approximating the MIQP solution and the virtual distancing techniques. Section IV provides extensive simulation results for the H-RRM and virtual distancing algorithms under different traffic scenarios.

In general, the present disclosure aims at providing affordable (linear) complexity radio resource management (RRM) techniques for satellite multi-beam broadband communication networks. These techniques are referred to as heuristic RRM (H-RRM). At least some of these techniques closely approach the optimum solution, which has an exponential complexity with the number of users. The proposed heuristic RRM solution may be applied even to the most demanding case of Massive Multiple Input Multiple Output (M-MIMO). It can be shown that the payload low-complexity pragmatic M-MIMO solution (as described for example in co-assigned patent application PCT/EP2020/066730) combined with heuristic RRM can efficiently cope with very different traffic conditions with a small penalty in terms of throughput compared to the much more complex ideal Minimum Mean Square Error (MMSE) M-MIMO when adopting the same RRM algorithm. On the other hand, the pragmatic M-MIMO with heuristic RRM clearly outperforms MMSE M-MIMO and simple RRM.

II. SYSTEM MODEL

While the present disclosure will frequently make reference to a communication satellite communicating with a plurality of user terminals (or simply "users" or "terminals" for short), it is understood that the disclosure generally relates to hub stations that perform wireless communication (e.g., line-of-sight communication) with user terminals (users) either directly or via a satellite payload.

A generalized system model to which techniques according to the present disclosure are likewise applicable will be described in Appendix B.I.

II.A. Forward Link Model

In the following it will be assumed that a population of N users (user terminals) has to be served by the satellite forward-link (i.e., by the hub station in general). Assuming that a precoding/beamforming technique is applied to the full population of users, a (N×N) normalized power transfer matrix S $$S = \begin{bmatrix} s(1,1) & \dots & s(1,N) \\ \vdots & & \vdots \\ s(N,1) & \dots & s(N,N) \end{bmatrix} \tag{1}$$

can be introduced such that its entry element s(i,j) represents the power transmitted for the j-th user and received by the i-th user, normalized to the thermal noise power. Without loss of generality it is assumed that all the users have identical terminal characteristics and experience the same receiver noise power. An example of a feasible precoding/beamforming technique is described in reference literature 1. The approach described therein will henceforth be referred to as pragmatic M-MIMO approach.

The following notation will be used: vectors will be represented in bold lower-case and matrices in bold capital letters. Superscripts T and H will indicate transpose and complex conjugate transpose matrix operators, respectively.

Signal-to-noise ratio (SNR), interference-to-noise ratio (INR) and signal-to-noise plus interference ratio (SNIR) for the i-th user can be derived from relevant entries of the power transfer matrix S, respectively, $$SNR(i) = s(i, i), \tag{2}$$

$$INR(i) = \sum_{j=1, j\neq i}^{N} s(i, j), \tag{3}$$

$$SNIR(i) = \frac{s(i, i)}{1 + \sum_{j=1, j\neq i}^{N} s(i, j)} = \frac{SNR(i)}{1 + INR(i)}. \tag{4}$$

The diagonal entries of the matrix S thus represent the useful part of the transmission corresponding to the signal-to-noise ratio. All the off diagonal elements are unwanted contributions that should be minimized. Taking the elements of the i-th row, with the exclusion of the diagonal one, will yield the aggregate interference-to-noise ratio experienced by the i-th user. When taking the i-th column, the off-diagonal elements represent the power of the patterns for the i-th user leaking in undesired directions normalized to the noise power. The matrix S is generally non-symmetric.

II.B. Physical Layer Model

Without intended limitation, it is assumed in the following that full frequency reuse among the currently active users' beams is exploited. These are the ones simultaneously activated by the RRM algorithm and correspond to a subset of the family of beams that the payload active antenna can generate. As only one subset of the potential beams generated by the active antenna is active at the same time, a beam coloring scheme has to be introduced in the physical layer. The proposed coloring scheme is based on organizing the different transmissions for sub-sets of beams in Time Division Multiplexing (TDM) with a super-frame (SF) having a time duration TSF. While the following description refers to TDM, it is to be noted that other techniques for multiplexing are feasible as well in the context of the present disclosure.

The preference for TDM instead of Frequency Division Multiplexing (FDM) is related to its easier payload implementation. In fact, TDM although fully dual to FDM in terms of performance, allows to avoid the flexible payload channelization required by the FDM approach. Nevertheless, it is understood that the present disclosure shall not be limited to use of TDM and that other multiplexing techniques, such as FDM or Code Division Multiplexing (CDM), or combination thereof are feasible as well. For instance, TDM can also be combined with an FDM approach to reduce the TDM carrier bandwidth. In this case the RRM should be preferably applied independently to each TDM sub-band as the payload may have a frequency dependent beam forming characteristic over a very wide bandwidth. An alternative coloring scheme is represented by CDM which also allows full frequency reuse. However, CDM is less used in satellite networks and standards, therefore not explicitly described in the following. As mentioned before, although the present disclosure describes techniques and embodiments for the forward link, it is straightforward to extend these techniques and embodiments to the reverse link of a wireless network exploiting Time Division Multiple Access (TDMA), Frequency Division Multiple Access (FDMA), Code Division Multiple Access (CDMA) or combinations thereof, as the skilled person will appreciate.

Figure 1:
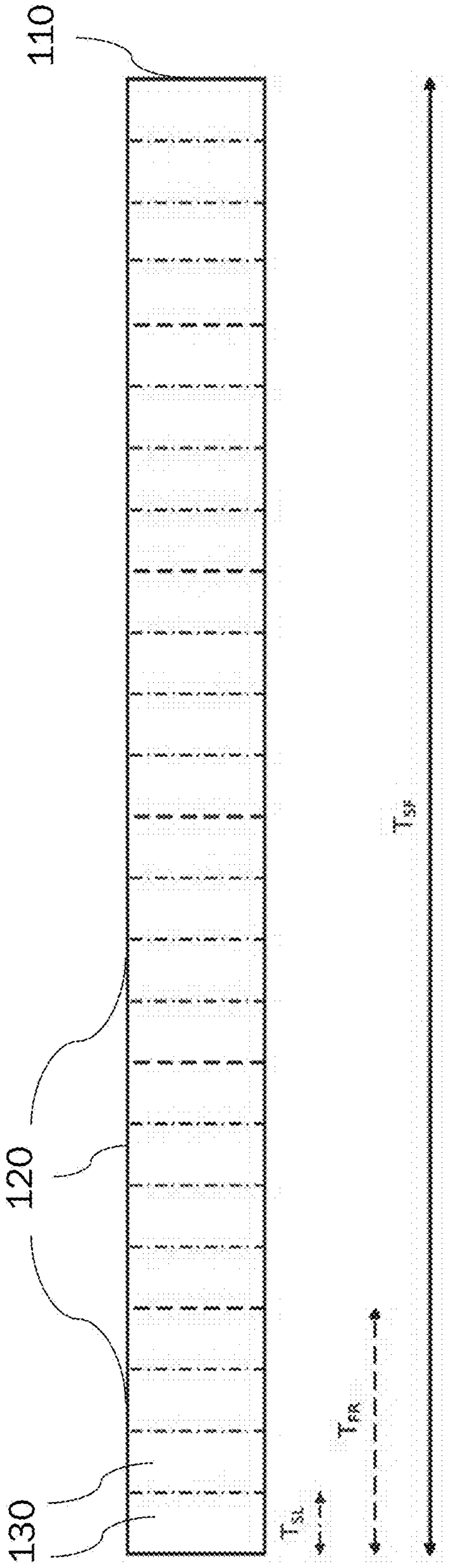

FIG. 1 shows an example of a physical layer superframe structure that may be used in the context of the disclosure. As shown therein, the superframe 110 is divided in $N_{FR}$ frames (FR) 120 having duration $T_{FR}$. Each FR 120 represents, for example, a color to be used by the RRM to place users at the same time over the satellite coverage region. Each frame 120 is divided in $N_{SL}$ slots (SL) 130 having duration $T_{SL}$. To each slot 130 the RRM assigns a specific Adaptive Coding and Modulation (ACM) physical layer configuration called MODCOD in line for example with the DVB-S2X standard nomenclature (Digital Video Broadcasting (DVB), Second generation framing structure channel coding and modulation systems for Broadcasting Interactive Services News Gathering and other broadband satellite applications; Part 2: DVBS2 Extensions (DVB-S2X), October 2014). The frame partitioning into slots 130 can ensure a high level of frame filling, assuming that each frame 120 is associated with a specific satellite beam. Allowing different MODCODs inside each frame 120 allows to serve different users within the current beam experiencing different signal-to-noise plus interference ratios. Each slot 130 in turn is divided into $N_{SY}$ symbols each having duration $T_s$, with $$R_s = \frac{1}{T_s},$$

where $R_s$ is the TDM carier transmission baud rate. The following relations may hold for this superframe structure:

$$T_{SL} = N_{SY} T_s,\ \ T_{FR} = N_{SL} T_{SL},\ \ T_{SF} = N_{FR} T_{FR}. \tag{5}$$

For the slots in frame number f the number of transmitted bits $$N_b^{SL}$$

are given by $$N_b^{SL}(s, f) = N_{SY} \eta_{ACM}(s, f), \tag{6}$$

where $\eta_{ACM}$(s,f) is the spectral efficiency corresponding to the MODCOD selected for the slot s in frame f. The total number of bits transmitted in the frame with frame number f is then simply given by $$N_b^{FR}(f) = N_{SY} \sum_{s=1}^{N_{SL}} \eta_{ACM}(s, f). \tag{7}$$

Similarly for the superframe, the total number of bits transmitted is given by $$N_b^{SF} = N_{SY} \sum_{f=1}^{N_{FR}} \sum_{s=1}^{N_{SL}} \eta_{ACM}(s, f). \tag{8}$$

The corresponding superframe average bit rate is given by $$R_b^{SF} = \frac{N_b^{SF}}{T_{SF}} = \frac{N_{SY}}{T_{SF}} \sum_{f=1}^{N_{FR}} \sum_{s=1}^{N_{SL}} \eta_{ACM}(s, f). \tag{9}$$

The number of time slots in a frame may depend on the SNIR range to be covered by the ACM MODCODs and the number of MODCODs supported. Typically, each MODCOD carries packets belonging to different users sharing similar received SNIR values and being served by the same satellite beam. Adopting a large number of MODCODs reduces the ACM SNIR granularity. However, this approach is likely to diminish the filling rate of each MODCOD. Consequently, a trade-off is required to optimize the overall physical layer efficiency. In the following, the RRM in terms of color assignment per FR with ACM will be analyzed assuming that there is enough traffic request to achieve a full SL packets filling rate. Clearly, under-loaded conditions are not relevant to a maximum throughput analysis. Moreover, the approach proposed by the present disclosure does not require to adapt the superframe format to the actual traffic distribution. This can simplify the beam-hopping (BH) functioning and associated signaling implementations.

Attention may be paid to the ACM implementation. The pragmatic M-MIMO approach implies the exploitation of beam hopping to activate only a subset of the satellite beams at any time. As it will be shown below, the RRM algorithm proposed by the present disclosure can use the beam hopping payload capability in a dynamic way to serve the traffic request. This means that the subset of active beams may change on a frame-by-frame basis, but may repeat on superframe-by-superframe basis, at least for a reasonable amount of time. For the long term, the "slow" spatial/time variability of traffic may generate an evolution in the frames that are active in each superframe. To adapt the ACM physical layer configuration, the SNIR evaluation shall be restricted to the useful user frame. This is to avoid unwanted fluctuations of the ACM SNIR estimates generated by other frames dedicated to users located in nearby active beams of the superframe.

It is understood that the techniques proposed by the present disclosure may be used independently of the above superframe structure.

II.C. Traffic Model

A flexible spatially non uniform random traffic model has been developed to test the H-RRM algorithm performance under various traffic conditions. The model assumes that the traffic is present in $N_{TS}$ circular spots. The generic traffic spot l is characterized by a normalized radius $r_{TS}$(l) and center location normalized offset distance with respect to the satellite nadir $c_{TS}$(l) with orientation angle $\phi_{TS}$(l). Each traffic spot may have a probability of occurrence $p_{TS}$(l), with $$\sum_{l=1}^{N_{TS}} p_{TS}(l) = 1.$$

It is assumed that the traffic inside each spot can be generated with Gaussian bi-dimensional truncated distribution within the circular spot area characterized by the standard deviations $\sigma_{XX}$, $\sigma_{YY}$, and $\sigma_{XY}$, or with a uniform distribution. The simulated traffic configurations are summarized in Table 1 and Table 2 for the uneven and even spot traffic probabilities, respectively. In Table 1, case 1 corresponds to a uniform traffic single spot distribution, while cases 2 and 3 correspond to bi-dimensional Gaussian traffic spot distributions. In Table 2, cases 2 and 3 correspond to even traffic spot distributions.

In more detail, case 1 corresponds to a single traffic area $S_T$ covering the full satellite coverage area $S_A$ with uniform traffic distribution (or Poisson Point Process, see Appendix A). In case 2 there are five traffic spots which in sub-cases a and b are overlapping among them so that $S_T=S_A$. On the other hand, sub-cases c, d, e, f assume $S_T<S_A$. Case 3 corresponds to two traffic spots with different geometry and traffic distributions in sub-cases a to f. In all cases, offset beams are characterized by $$c_{TS}(l) = \frac{1}{3}.$$

Figure 2:
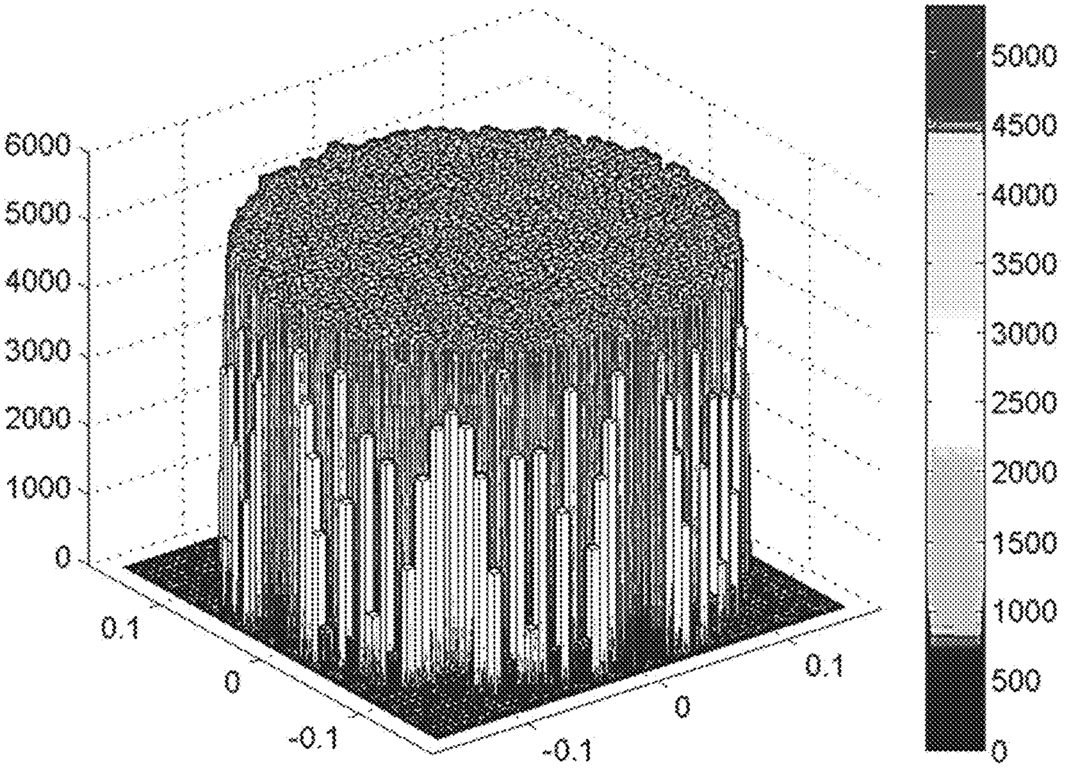
FIG. 2 shows a simulated traffic probability density function (PDF) for a first example case used for assessing technical results of embodiments of the present disclosure.
Figure 3A:
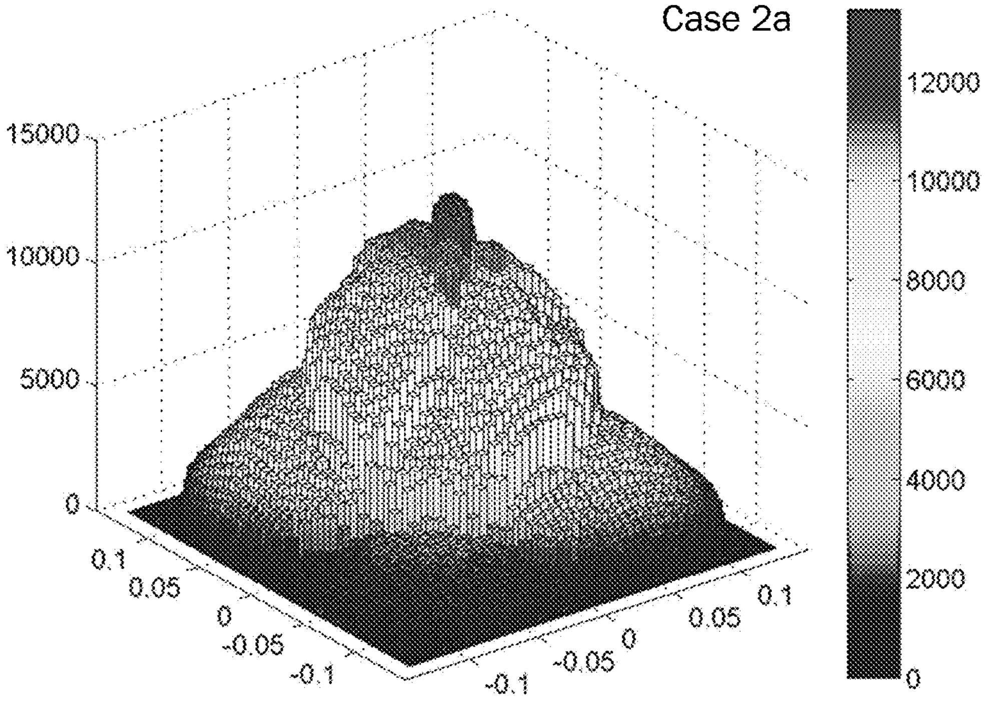
FIGS. 3A-3F and FIGS. 4A-4F show simulated traffic PDFs for a second example case used for assessing technical results of embodiments of the present disclosure.
Figure 3B:
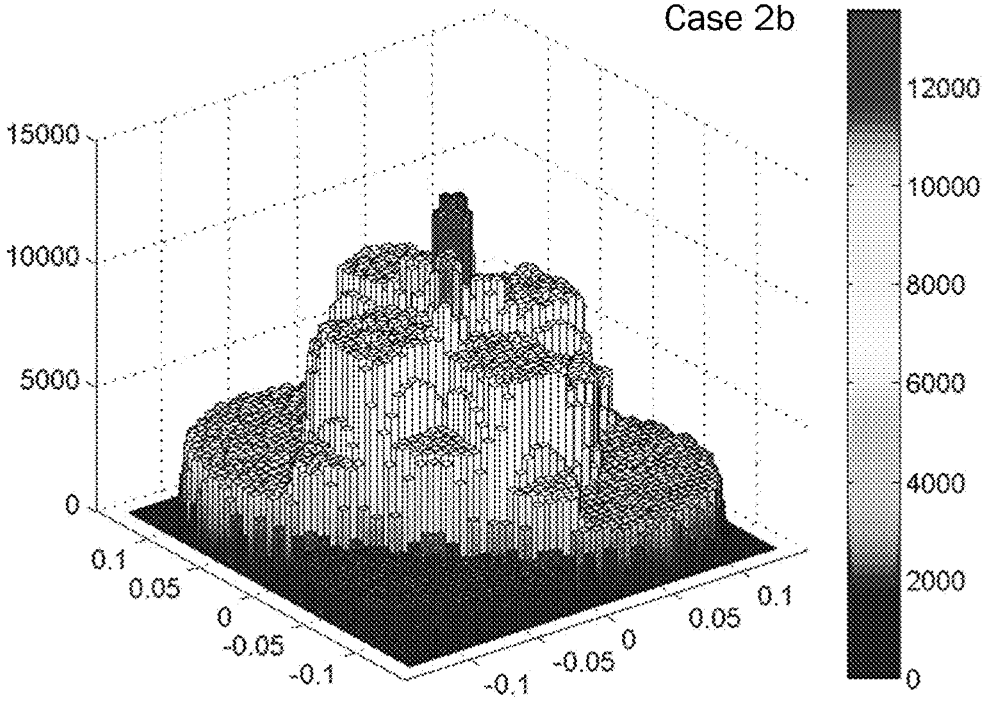
Figure 3C:
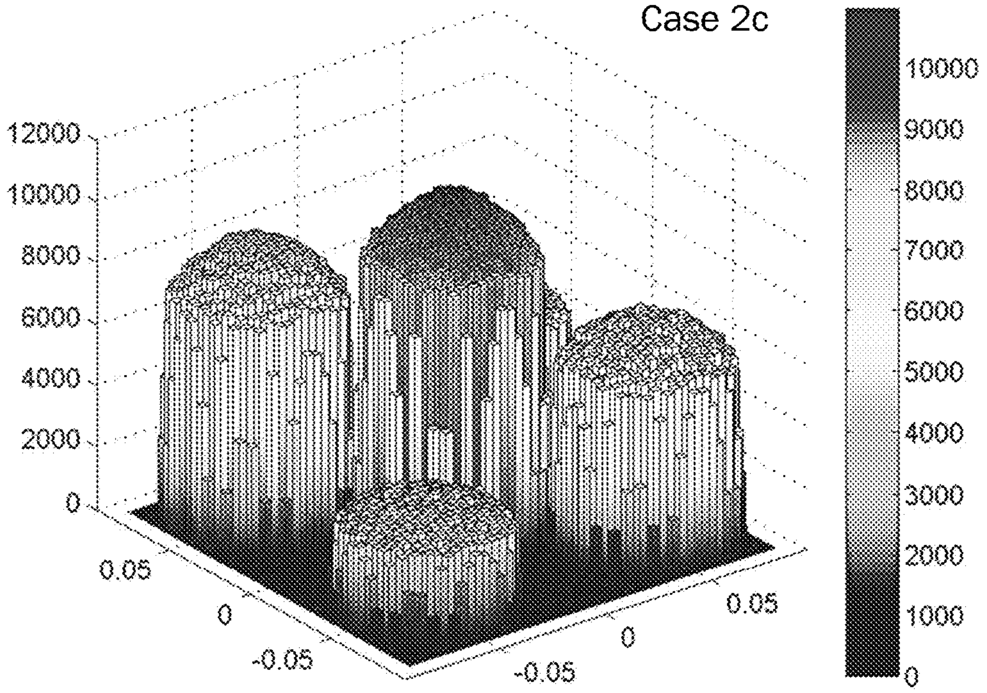
Figure 3D:
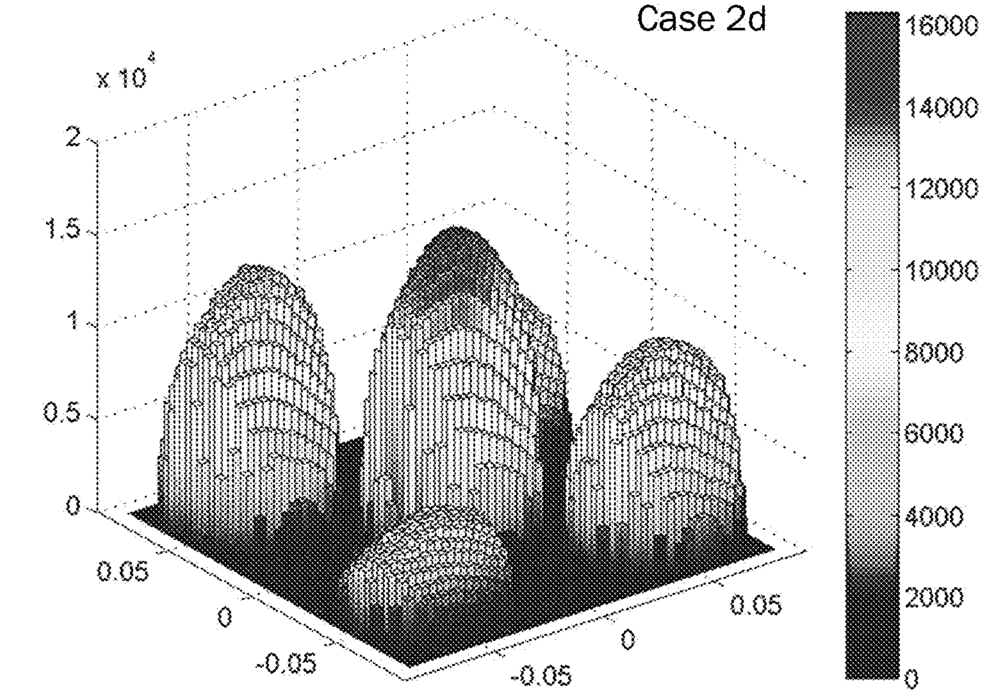
Figure 3E:
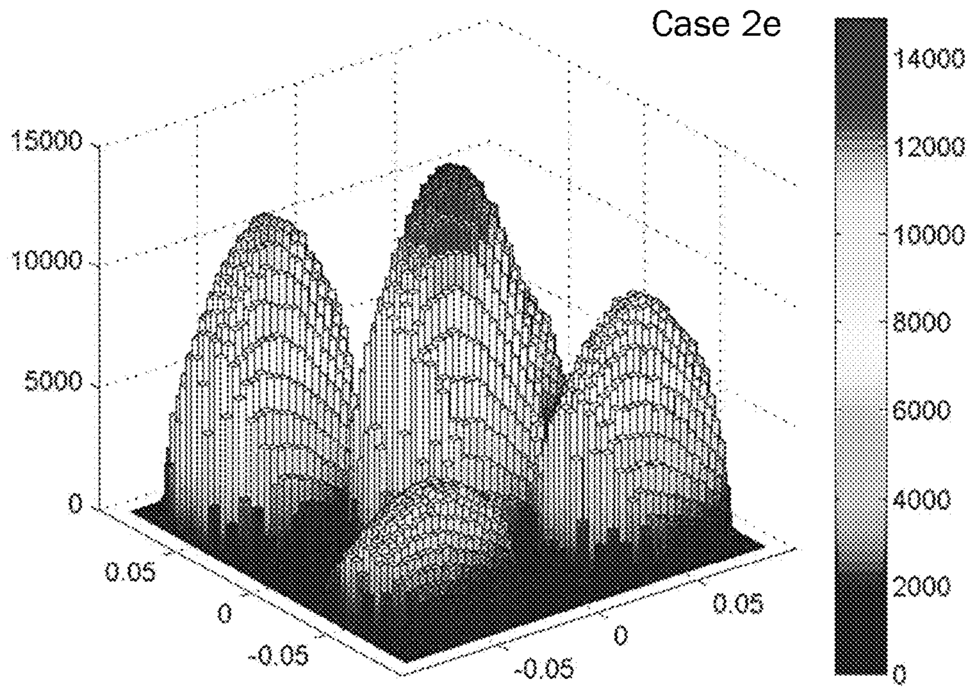
Figure 3F:
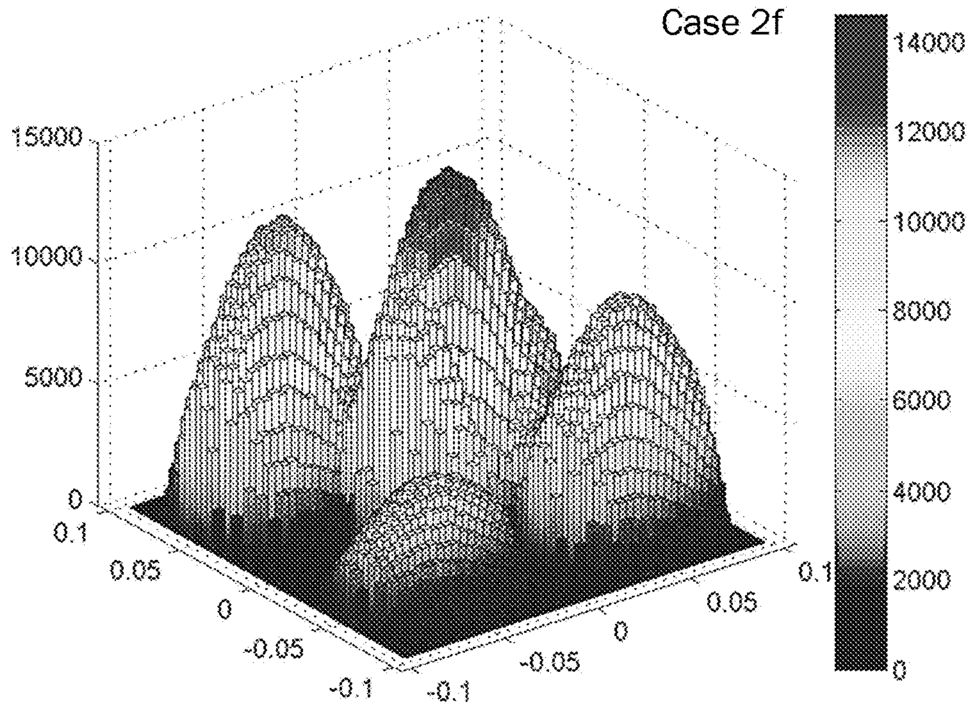
Figure 4A:
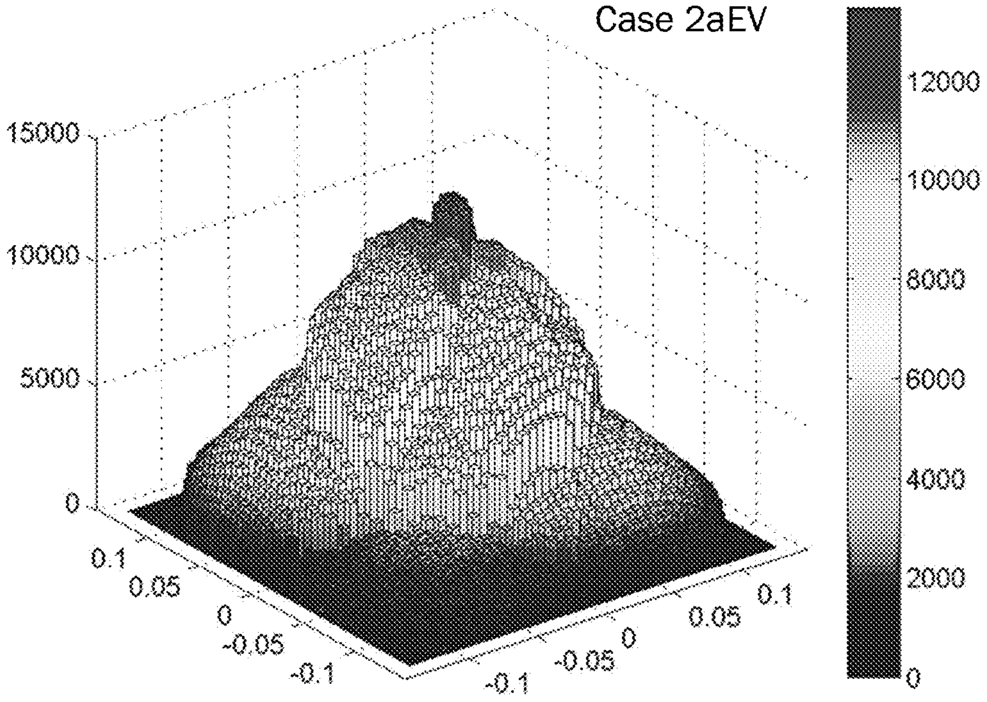
Figure 4B:
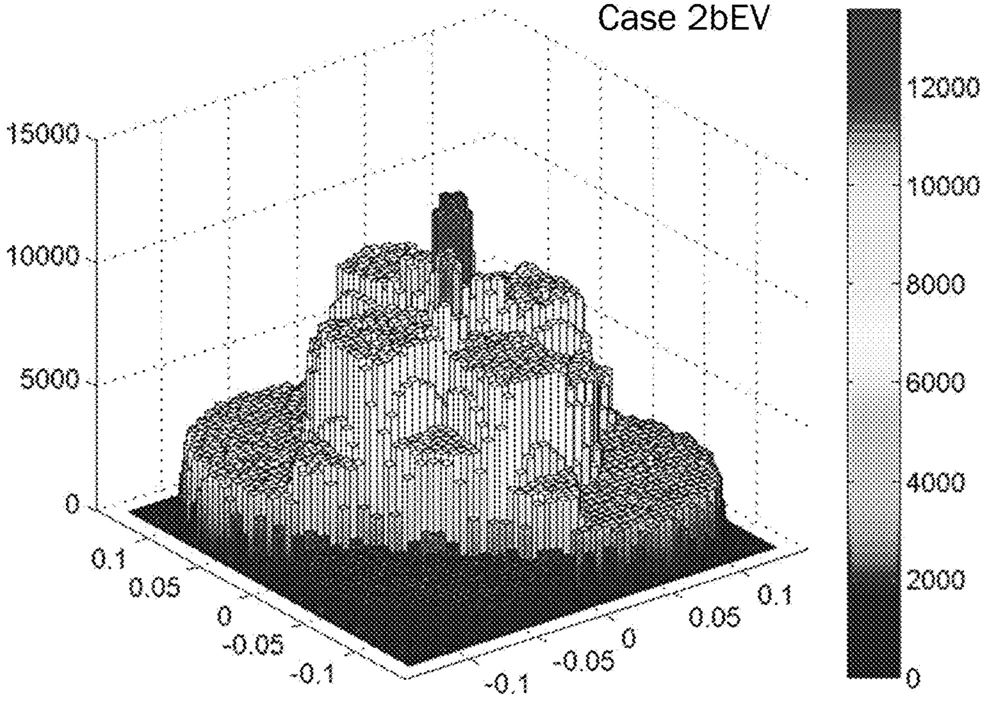
Figure 4C:
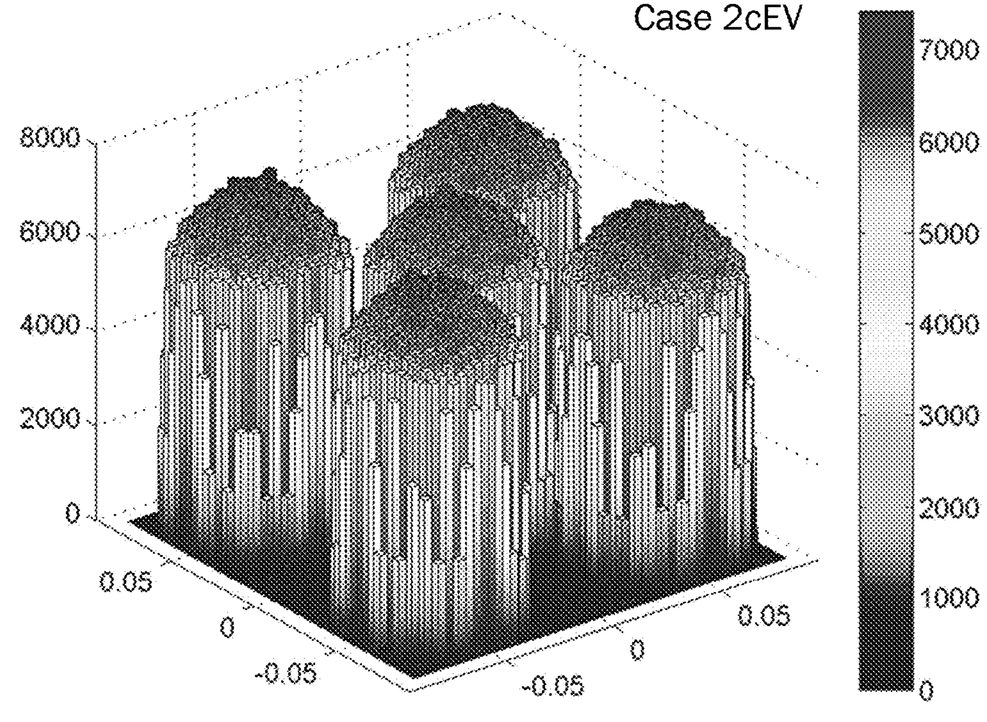
Figure 4D:
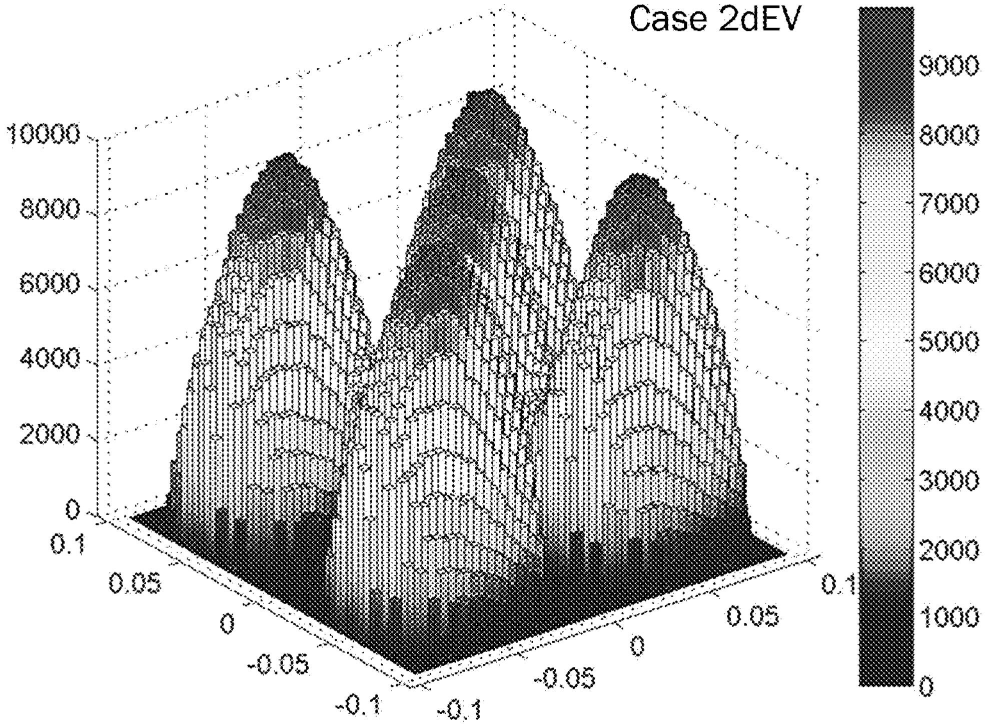
Figure 4E:
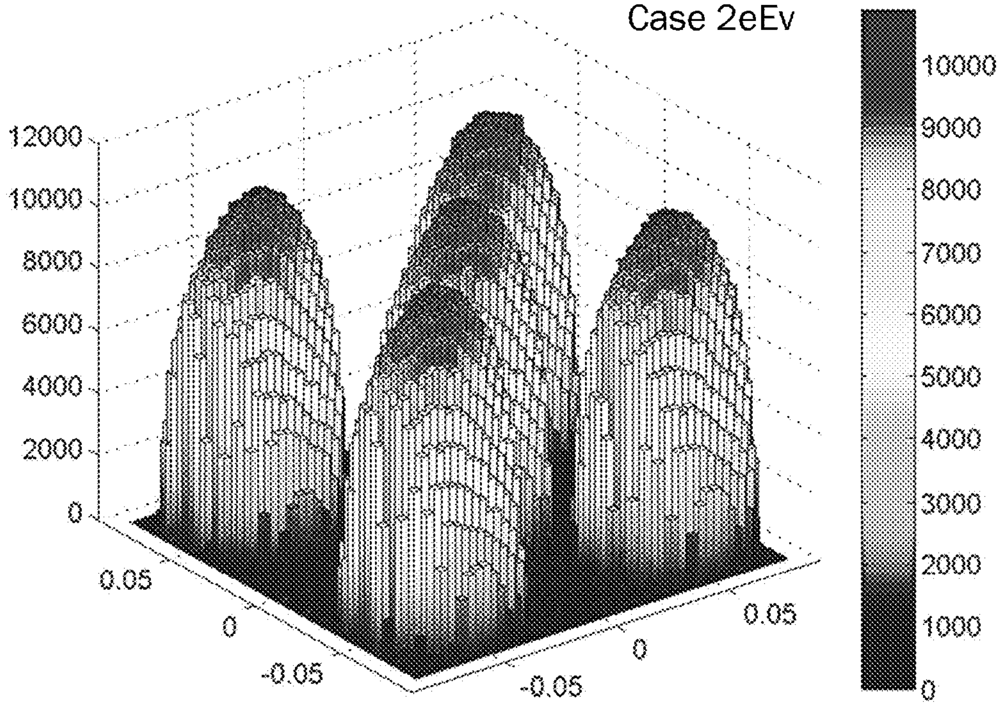
Figure 4F:
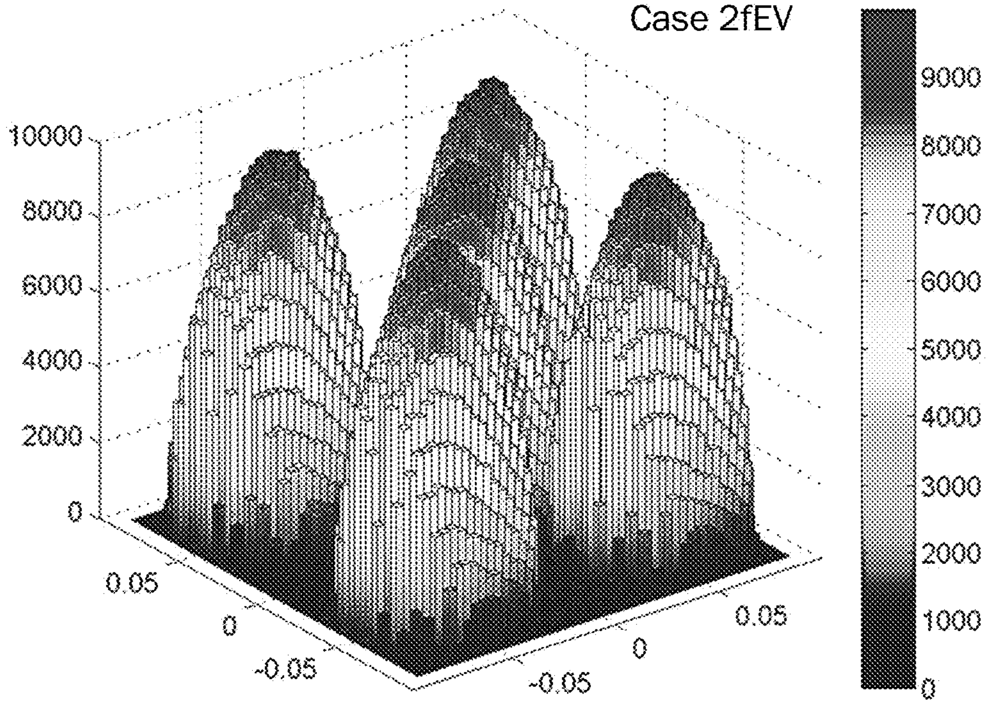
Figure 5A:
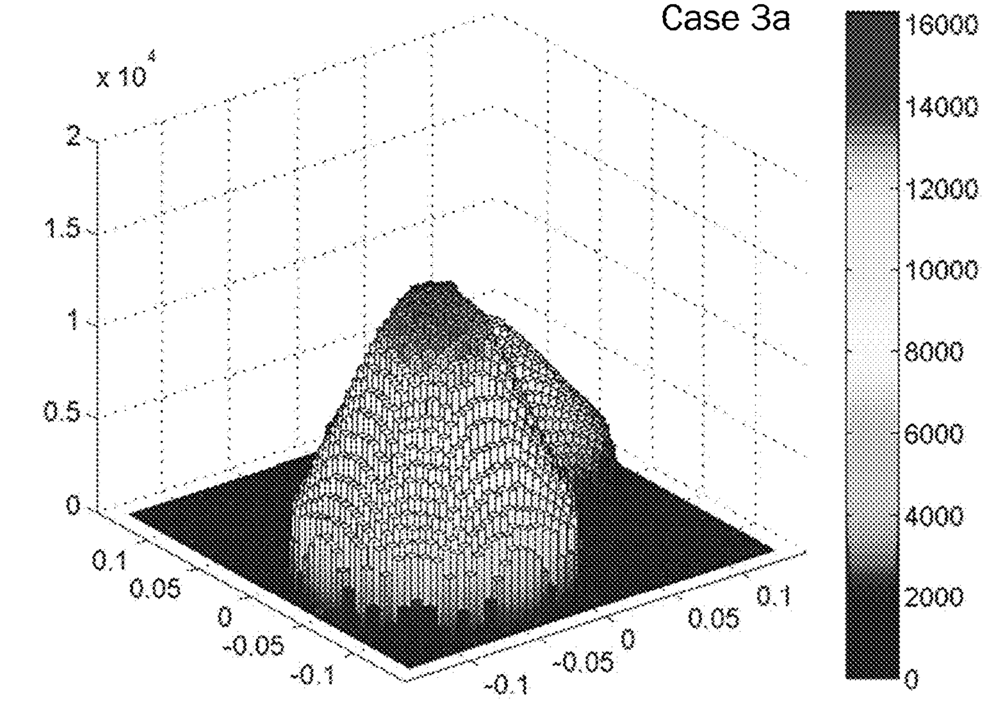
FIGS. 5A-5F and FIGS. 6A-6F show simulated traffic PDFs for a third example case used for assessing technical results of embodiments of the present disclosure.
Figure 5B:
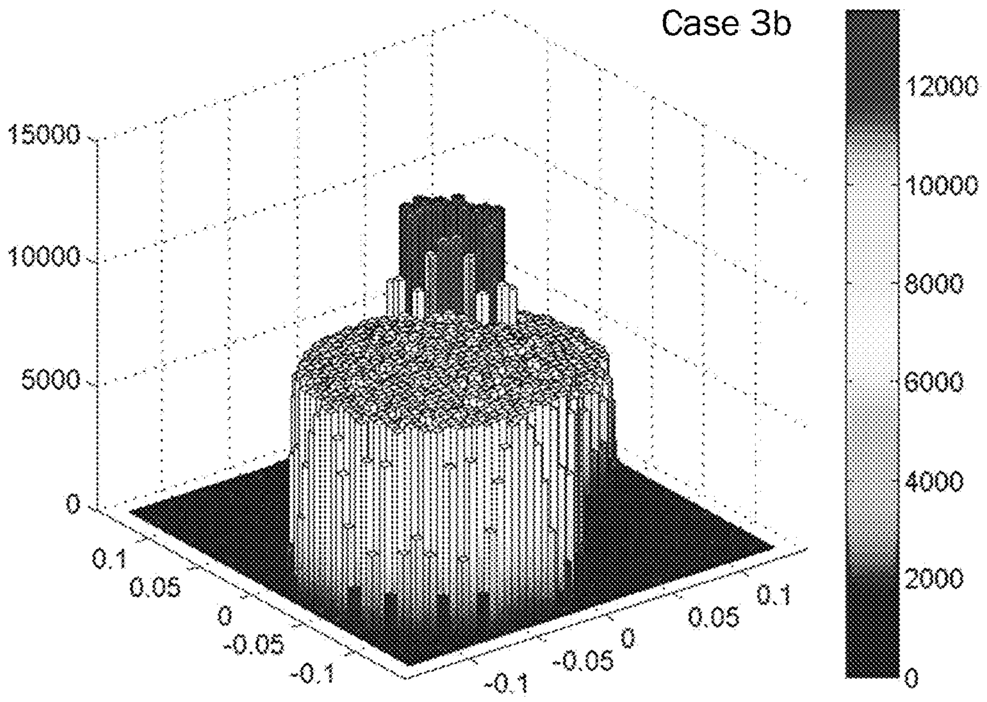
Figure 5C:
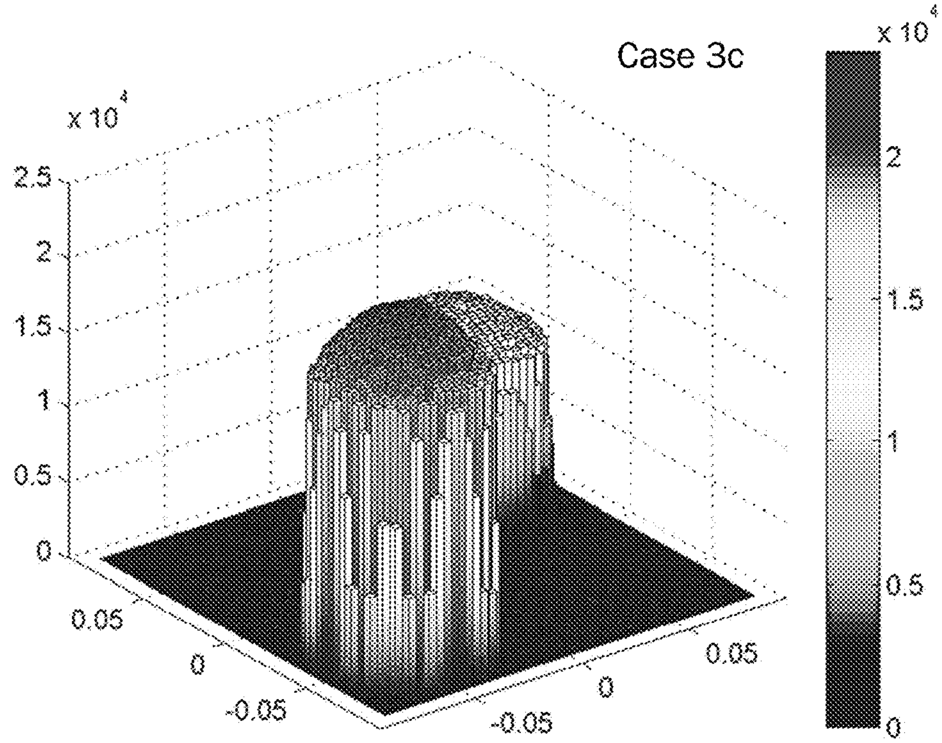
Figure 5D:
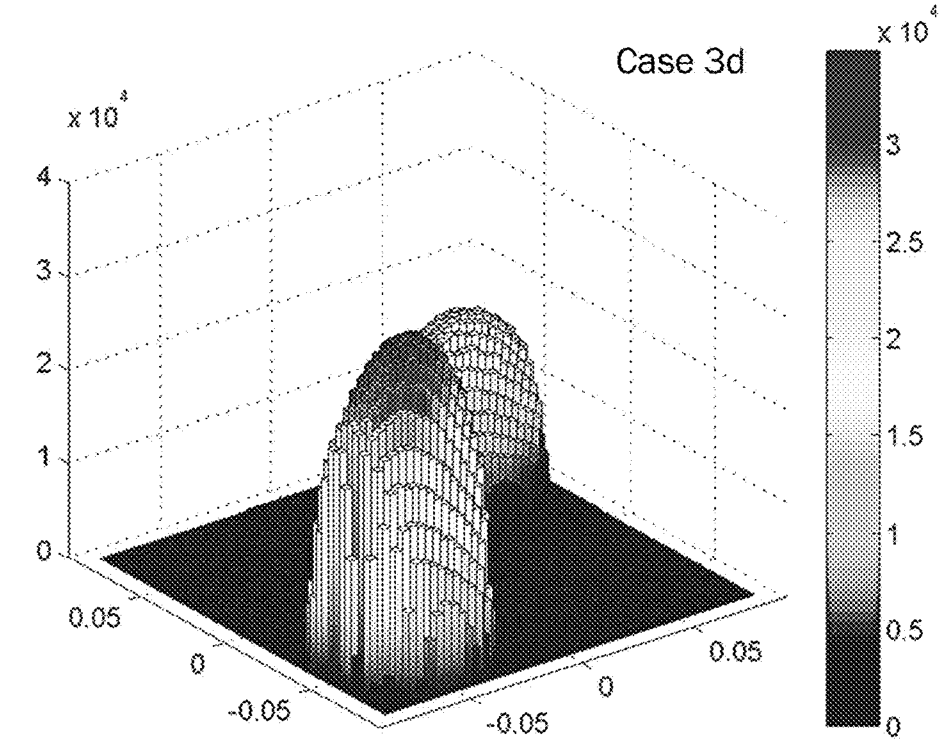
Figure 5E:
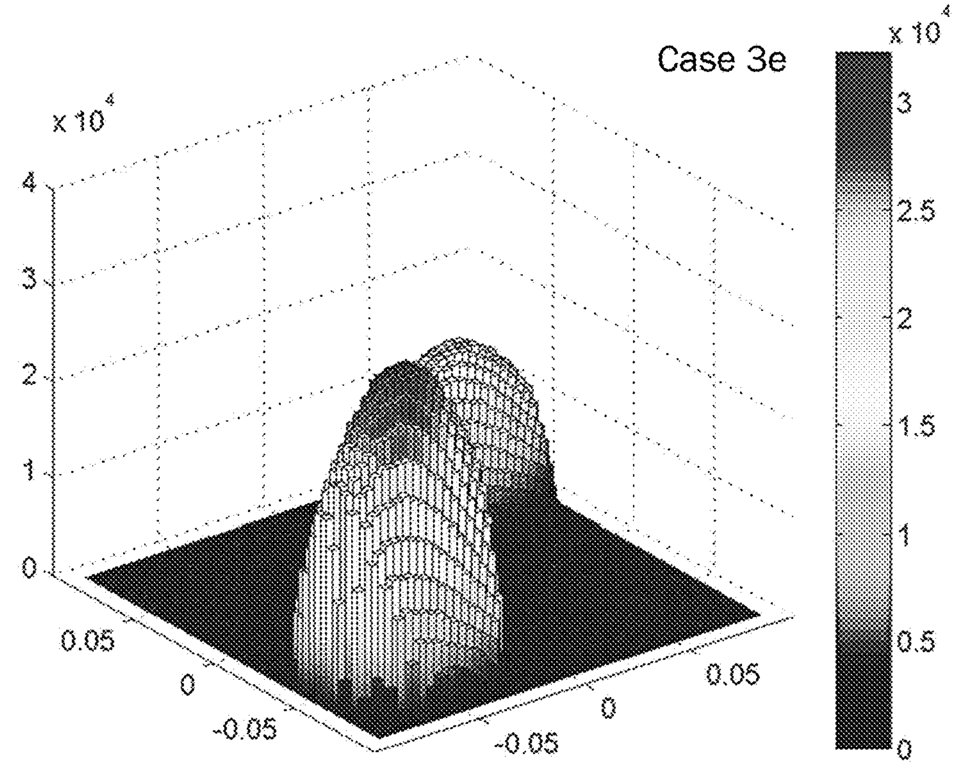
Figure 5F:
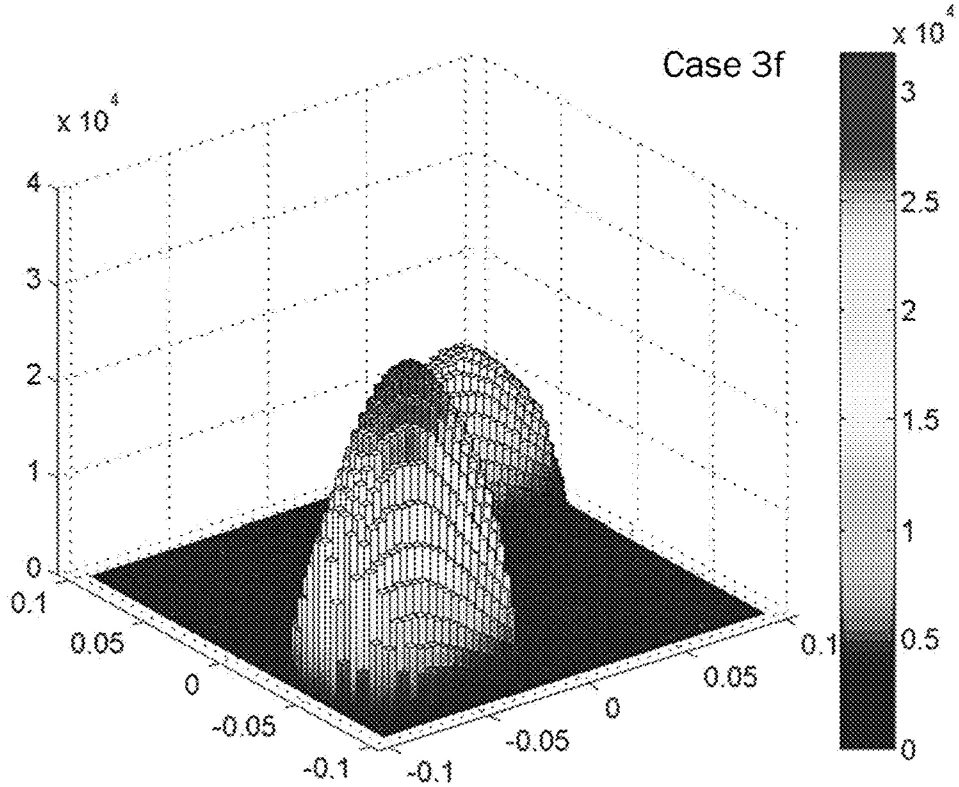
Figure 6A:
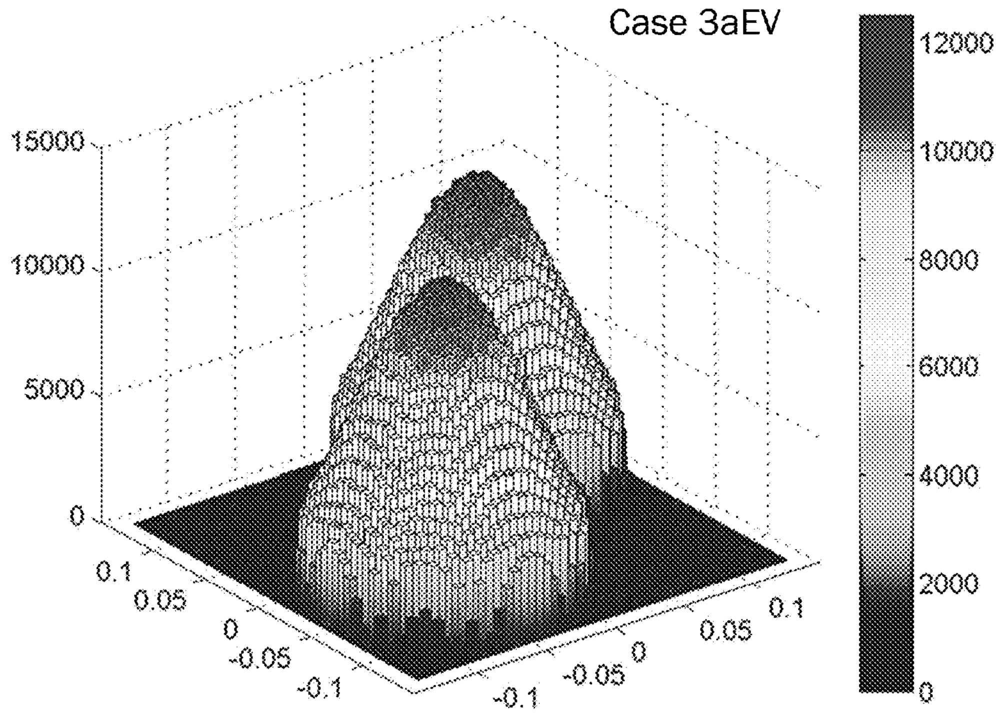
Figure 6B:
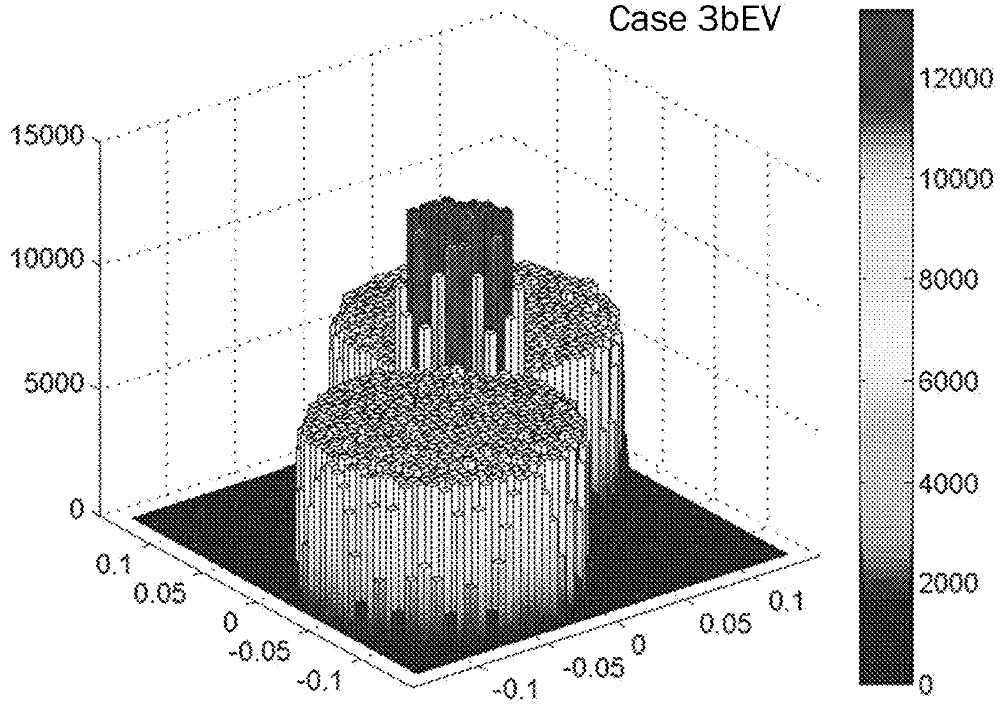
Figure 6C:
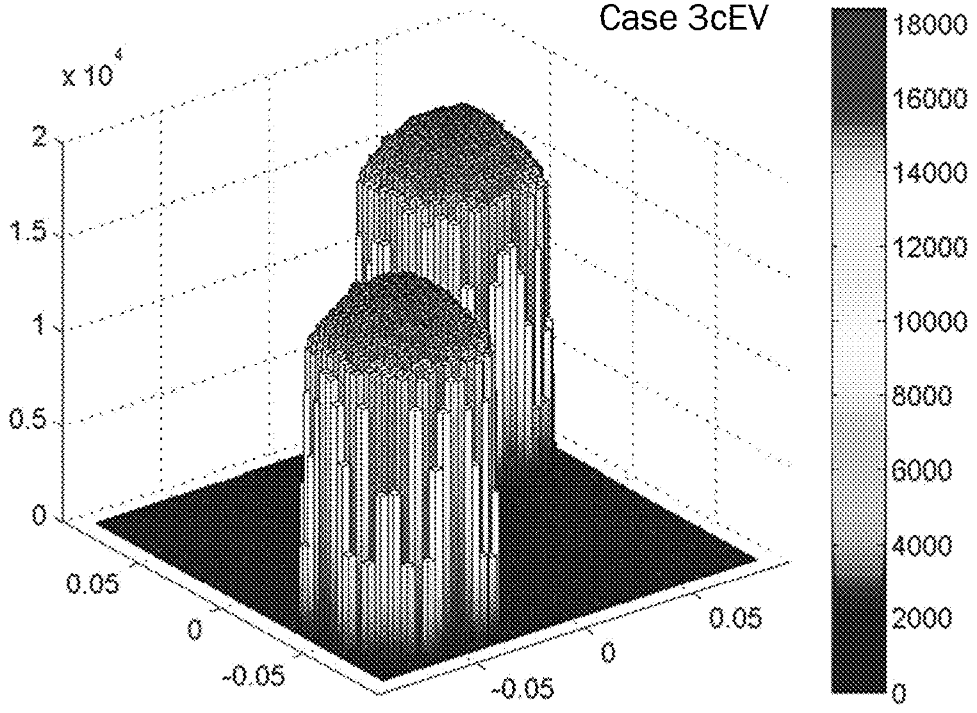
Figure 6D:
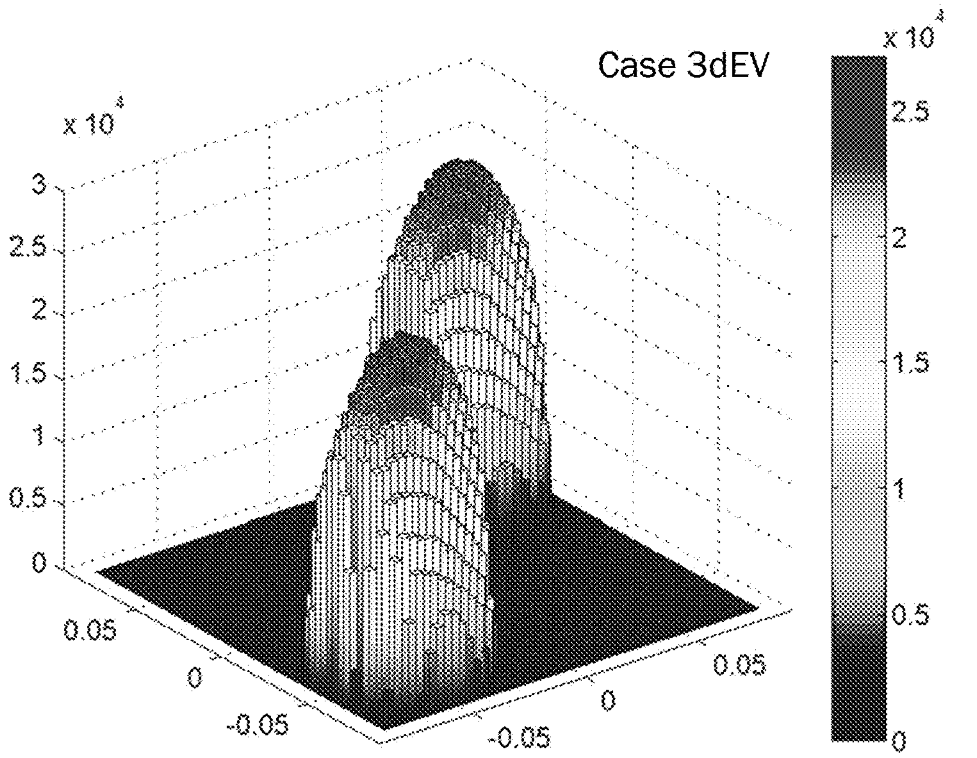
Figure 6E:
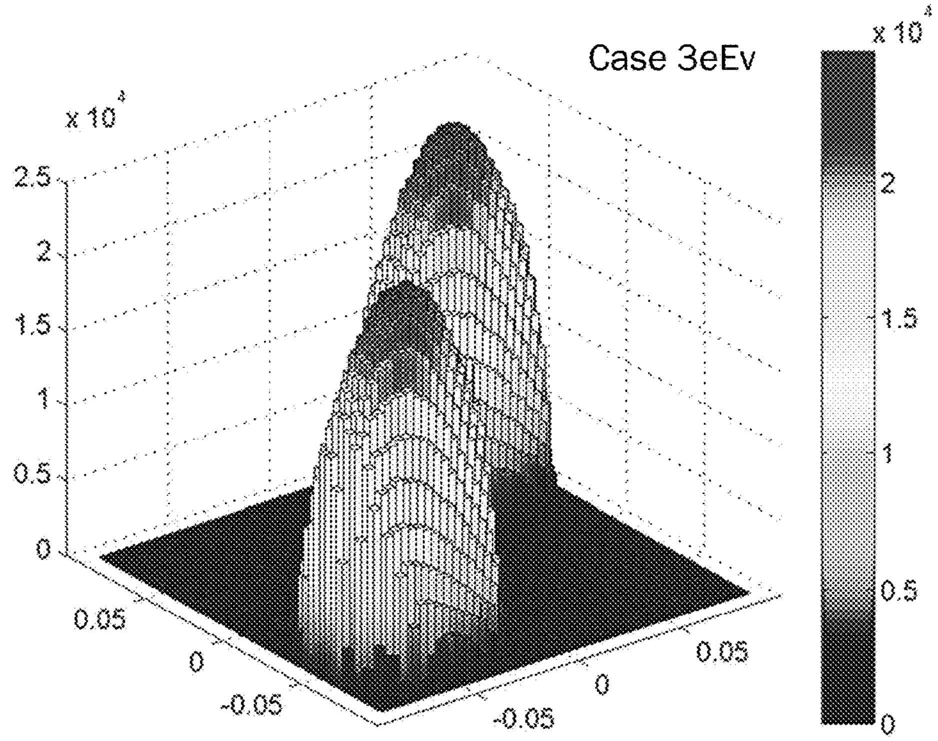
Figure 6F:
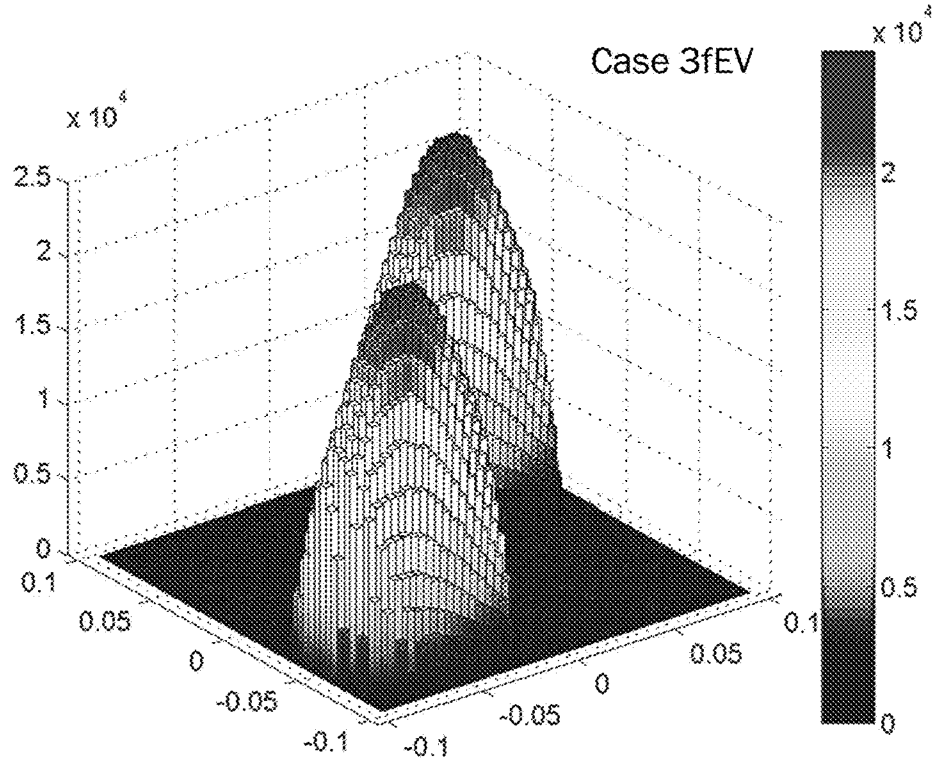

The simulated PDFs for the geometry configurations of Table 1 are shown in FIG. 2 to FIG. 6F. Of these, FIG. 2 shows the simulated traffic PDF for case 1. FIGS. 3A-3F show the uneven spot probability simulated traffic PDFs for sub-cases a to f of case 2, respectively. FIGS. 4A-4F show the even spot probability simulated traffic PDFs for sub-cases a to f of case 2, respectively. FIGS. 5A-5F show the uneven spot probability simulated traffic PDFs for sub-cases a to f of case 3, respectively. Finally, FIGS. 6A-6F show the even spot probability simulated traffic PDFs for Table 2 sub-cases a to f of case 3, respectively.

TABLE 1

Traffic geometry configurations for uneven spot traffic probabilities

| Case | $N_{TS}$ | $r_{TS}(l)$ | $\phi_{TS}(l)$ | $S_T/S_A$ % | $P_{TS}(l)$ | $\sigma_{XX}$ | $\sigma_{YY}$ | $\sigma_{XY}$ |
|---|---|---|---|---|---|---|---|---|
| 1 | 1 | $\sin(\theta_{max})$ | [0] | 100 | [1.0] | NA | NA | NA |
| 2a | 5 | $1-\frac{\sqrt{2}}{3}$ | $\left[0, \pm\frac{\pi}{4}, \pm\frac{3\pi}{4}\right]$ | 100 | [0.3, 0.15, 0.1, 0.25, 0.2] | 0.05 | 0.05 | 0.0 |
| 2b | 5 | $1-\frac{\sqrt{2}}{3}$ | $\left[0, \pm\frac{\pi}{4}, \pm\frac{3\pi}{4}\right]$ | 100 | [0.3, 0.15, 0.1, 0.25, 0.2] | 0.2 | 0.20 | 0.0 |
| 2c | 5 | 0.22 | $\left[0, \pm\frac{\pi}{4}, \pm\frac{3\pi}{4}\right]$ | 24.2 | [0.3, 0.15, 0.1, 0.25, 0.2] | 0.05 | 0.05 | 0.0 |
| 2d | 5 | $\sqrt{\frac{0.2}{5}}$ | $\left[0, \pm\frac{\pi}{4}, \pm\frac{3\pi}{4}\right]$ | 20 | [0.3, 0.15, 0.1, 0.25, 0.2] | 0.04 | 0.02 | 0.4 |
| 2e | 5 | $\sqrt{\frac{0.3}{5}}$ | $\left[0, \pm\frac{\pi}{4}, \pm\frac{3\pi}{4}\right]$ | 30 | [0.3, 0.15, 0.1, 0.25, 0.2] | 0.04 | 0.02 | 0.4 |
| 2f | 5 | $\sqrt{\frac{0.2}{5}}$ | $\left[0, \pm\frac{\pi}{4}, \pm\frac{3\pi}{4}\right]$ | 40 | [0.3, 0.15, 0.1, 0.25, 0.2] | 0.04 | 0.02 | 0.4 |
| 3a | 2 | $1-\frac{\sqrt{2}}{3}$ | $\left[0, \pm\frac{\pi}{4}, \pm\frac{3\pi}{4}\right]$ | 55.6 | [0.35, 0.65] | 0.05 | 0.05 | 0 |
| 3b | 2 | $1-\frac{\sqrt{2}}{3}$ | $\left[0, \pm\frac{\pi}{4}, \pm\frac{3\pi}{4}\right]$ | 55.6 | [0.35, 0.65] | 0.2 | 0.20 | 0 |
| 3c | 2 | 0.22 | $\left[0, \pm\frac{\pi}{4}, \pm\frac{3\pi}{4}\right]$ | 9.7 | [0.35, 0.65] | 0.05 | 0.05 | 0.0 |
| 3d | 2 | $\sqrt{\frac{0.2}{5}}$ | $\left[0, \pm\frac{\pi}{4}, \pm\frac{3\pi}{4}\right]$ | 8.0 | [0.35, 0.65] | 0.04 | 0.02 | 0.4 |
| 3e | 2 | $\sqrt{\frac{0.3}{5}}$ | $\left[0, \pm\frac{\pi}{4}, \pm\frac{3\pi}{4}\right]$ | 12.0 | [0.35, 0.65] | 0.04 | 0.02 | 0.4 |
| 3f | 2 | $\sqrt{\frac{0.2}{5}}$ | $\left[0, \pm\frac{\pi}{4}, \pm\frac{3\pi}{4}\right]$ | 16.0 | [0.35, 0.65] | 0.04 | 0.02 | 0.4 |

TABLE 2

Traffic geometry configurations for even traffic probabilities

| Case | $N_{TS}$ | $r_{TS}(l)$ | $\phi_{TS}(l)$ | $S_T/S_A$ % | $P_{TS}(l)$ | $\sigma_{XX}$ | $\sigma_{YY}$ | $\sigma_{XY}$ |
|---|---|---|---|---|---|---|---|---|
| 1 | 1 | $\sin(\theta_{max})$ | [0] | 100 | [1.0] | NA | NA | NA |
| 2aEV | 5 | $1-\frac{\sqrt{2}}{3}$ | $\left[0, \pm\frac{\pi}{4}, \pm\frac{3\pi}{4}\right]$ | 100 | [0.2, 0.2, 0.2, 0.2, 0.2] | 0.05 | 0.05 | 0.0 |
| 2bEV | 5 | $1-\frac{\sqrt{2}}{3}$ | $\left[0, \pm\frac{\pi}{4}, \pm\frac{3\pi}{4}\right]$ | 100 | [0.2, 0.2, 0.2, 0.2, 0.2] | 0.2 | 0.20 | 0.0 |

TABLE 2-continued

| Traffic geometry configurations for even traffic probabilities | | | | | | | | |
|---|---|---|---|---|---|---|---|---|
| Case | $N_{TS}$ | $r_{TS}(l)$ | $\phi_{TS}(l)$ | $S_T/S_A$ % | $P_{TS}(l)$ | $\sigma_{XX}$ | $\sigma_{YY}$ | $\sigma_{XY}$ |
| 2cEV | 5 | 0.22 | $\left[0, \pm\frac{\pi}{4}, \pm\frac{3\pi}{4}\right]$ | 24.2 | [0.2, 0.2, 0.2, 0.2, 0.2] | 0.05 | 0.05 | 0.0 |
| 2dEV | 5 | $\sqrt{\frac{0.2}{5}}$ | $\left[0, \pm\frac{\pi}{4}, \pm\frac{3\pi}{4}\right]$ | 20 | [0.2, 0.2, 0.2, 0.2, 0.2] | 0.04 | 0.02 | 0.4 |
| 2eEV | 5 | $\sqrt{\frac{0.3}{5}}$ | $\left[0, \pm\frac{\pi}{4}, \pm\frac{3\pi}{4}\right]$ | 30 | [0.2, 0.2, 0.2, 0.2, 0.2]] | 0.04 | 0.02 | 0.4 |
| 2fEV | 5 | $\sqrt{\frac{0.2}{5}}$ | $\left[0, \pm\frac{\pi}{4}, \pm\frac{3\pi}{4}\right]$ | 40 | [0.2, 0.2, 0.2, 0.2, 0.2] | 0.04 | 0.02 | 0.4 |
| 3aEV | 2 | $1-\frac{\sqrt{2}}{3}$ | $\left[0, \pm\frac{\pi}{4}, \pm\frac{3\pi}{4}\right]$ | 55.6 | [0.5, 0.5] | 0.05 | 0.05 | 0.0 |
| 3bEV | 2 | $1-\frac{\sqrt{2}}{3}$ | $\left[0, \pm\frac{\pi}{4}, \pm\frac{3\pi}{4}\right]$ | 55.6 | [0.5, 0.5] | 0.2 | 0.20 | 0.0 |
| 3cEV | 2 | 0.22 | $\left[0, \pm\frac{\pi}{4}, \pm\frac{3\pi}{4}\right]$ | 9.7 | [0.5, 0.5] | 0.05 | 0.05 | 0.0 |
| 3dEV | 2 | $\sqrt{\frac{0.2}{5}}$ | $\left[0, \pm\frac{\pi}{4}, \pm\frac{3\pi}{4}\right]$ | 8.0 | [0.5, 0.5] | 0.04 | 0.02 | 0.4 |
| 3eEV | 2 | $\sqrt{\frac{0.3}{5}}$ | $\left[0, \pm\frac{\pi}{4}, \pm\frac{3\pi}{4}\right]$ | 12.0 | [0.5, 0.5] | 0.04 | 0.02 | 0.4 |
| 3fEV | 2 | $\sqrt{\frac{0.2}{5}}$ | $\left[0, \pm\frac{\pi}{4}, \pm\frac{3\pi}{4}\right]$ | 16.0 | [0.5, 0.5] | 0.04 | 0.02 | 0.4 |

III. RADIO RESOURCE MANAGEMENT ALGORITHMS

Next, examples of techniques (e.g., methods or algorithms) for RRM according to embodiments of the present disclosure will be described. These techniques may also include techniques for virtual distancing of users (user terminals), and in particular techniques for selecting an appropriate set of beam centers or beam pointing directions (beam steering directions) given a set of users that request service.

Considering that the user distribution is an uncontrollable input with non-uniform statistical distribution and possible clustering due to hot spots in areas of high user density, the aforementioned pragmatic M-MIMO approach describes a method for assigning users to different radio resources (e.g., time slots and/or frequency carriers) in a manner that maximizes the overall throughput.

The power transfer matrix S has been introduced in reference literature 1 for the pragmatic M-MIMO approach. Its generic element s(i,j) describes the power transmitted for user j and received by user i. Here for convenience the matrix S has dimension N×N, where $N=N_T$ represents the total number of active users (user terminals) in all colors or time slices (or radio resource blocks in general). On the other hand, $N_U(c)$ represents the number of users allocated by the RRM to the color with number c. As will be shown in Section IV.C.4, $N_U(c)$ is an integer random variable when considering different SFs. Disregarding the dependency of $N_U$ on the SF index for simplicity of notation, the following relation holds for each SF:

$$N = \sum_{c=1}^{C} N_{U(c)}. \tag{10}$$

Analyzing the power transfer matrix S, it can be seen that the off-diagonal coefficients s(i,j) play a detrimental effect in increasing the interference experienced by the i-th user. Assigning the users to different time/frequency slots (or radio resource blocks in general) will null their reciprocal interference. This effect can be modelled with a generalized co-channel matrix X for which a unit entry identifies the assignment of the same radio resource to the users with relevant row and column indexes, $$X = \begin{bmatrix} x(1,1) & \dots & x(1,N) \\ \vdots & & \vdots \\ x(N,1) & \dots & x(N,N) \end{bmatrix}, \tag{11}$$

where $$x(i,j) = \begin{cases} 1 & \text{if user } i \text{ and user } j \text{ share the same color,} \\ 0 & \text{otherwise.} \end{cases} \tag{11a}$$

The matrix X is symmetric with unit diagonal elements and has the same dimensions as the power transfer matrix S. Matrices S and X can be combined by means of the Hadamard product, which will result in a co-channel power transfer matrix $S_{CC}$ that takes into account the radio resource assignments. The matrix $S_{CC}$ can be computed as $$S_{CC} = X \odot S. \quad (12)$$

The SNR, INR and SNIR equations for the i-th user (i=1, . . . , N) are modified accordingly as $$SNR(i) = s(i, i), \quad (13)$$

$$INR(i) = \sum_{j=1, j\neq i}^{N} x(i, j)s(i, j), \quad (14)$$

$$SNIR(i) = \frac{s(i, i)}{1 + \sum_{j=1, j\neq i}^{N} x(i, j)s(i, j)} = \frac{SNR(i)}{1 + INR(i)}. \quad (15)$$

Given a power transfer matrix S, the resource management problem is cast into a color assignment problem that is formulated as a 0-1 integer programming instance on the coloring matrix binary entries. Defining C as the preassigned number of colors, the binary coloring matrix C of size (N×C) can be introduced as $$C = \begin{bmatrix} c(1, 1) & \ldots & c(1, N) \\ \vdots & & \vdots \\ c(N, 1) & \ldots & c(N, N) \end{bmatrix}. \quad (16)$$

Considering that the i-th user can be assigned to only one color, the rows of C must satisfy the following linear constraint corresponding to one color per user, $$\sum_{k=1}^{C} c(i, k) = 1 \quad \forall\, i. \quad (17)$$

Additionally, summing all entries of the coloring matrix C must yield the number of users N, $$\sum_{i=1}^{N} \sum_{k=1}^{C} c(i, k) = N. \quad (18)$$

The co-channel matrix X can be obtained as the matrix product of C with its transpose $C^T$, $$X = CC^T. \quad (19)$$

Considering that the central target of the color assignment lies in the reduction of the mutual interference, attention may be focused on the off-diagonal elements of the power transfer matrix S. This leads to the introduction of the diagonally null part Q of the power transfer matrix S, which may be referred to as the interference matrix. The interference matrix Q may be defined as $$Q = S - \text{diag}\{\text{diag}(S)\}, \quad (20)$$

$$q(i, j) = \begin{cases} 0 & \text{if } i = j \\ s(i, j) & \text{if } i \neq j \end{cases}, \quad (21)$$

where the diag{·} operator is used in accordance with the MATLAB® notation (i.e., returning a vector with the diagonal elements of a square matrix, and returning a diagonal square matrix if applied to a vector). As such, the interference matrix Q corresponds to the power transfer matrix S with all diagonal entries set to zero. With the nulling of the diagonal elements, the interference-to-noise ratio for the i-th user (INR(i)) summation can be extended to all the indexes via $$INR(i) = \sum_{j=1}^{N} x(i, j)q(i, j). \quad (22)$$

This represents the sum of the interference power seen from all N users in all C colors over the noise power. Notably, this computation assumes, without loss of generality, that the noise power is the same for all users.

The sum co-channel interference, evaluated as the total interference-to-noise ratio $INR_T$, can be assumed to represent a figure of merit of the overall performance and satisfies the following definition $$INR_T = \sum_{i=1}^{N} INR(i) = \sum_{i=1}^{N} \sum_{j=1}^{N} x(i, j)q(i, j). \quad (23)$$

In matrix form, the total interference-to-noise ratio $INR_T$ can be written in different equivalent forms (in line with reference literature 1), $$INR_T = 1^T(Q \odot X)1 = tr(C^T QC) = [vec(C)]^T(I \otimes Q)vec(C), \quad (24)$$

where the (N×1) vector 1 has all unit entries, vec(C) is the vectorization of the matrix C into a column vector and ⊗ indicates the Kronecker product.

The last equality in Eq. (24) suggests to describe the resource management problem as a MIQP problem of the form $$\text{minimize} \quad [vec(C)]^T(I \otimes Q)vec(C) \quad (25)$$
$$\text{subject to} \quad \sum_{k=1}^{C} c(i, k) = 1, \ c(i, j) \in \{0, 1\}, \ i = 1, \ldots, N, \ k = 1, \ldots, C.$$

Several techniques have been proposed for solving MIQP problems in exact or sub-optimal manner. An efficient heuristic approach for addressing the present general problem will be described in the following sections.

III.A. Heuristic RRM

In this section, a method of determining a radio resource mapping will be described. The radio resource mapping assigns a plurality of users (user terminals) to a set of radio resource blocks (e.g., colors, color slices, or frames of a superframe, for example), for performing wireless communications between a hub station and the plurality of users.

This method may be based, as input, on a set of quantities indicating mutual radio interferences between pairs of users among the plurality of users. Assuming a particular assignment of one or more users to a set of colors (as examples of radio resource blocks), this input can be used for determining indications of aggregated (co-channel) radio interferences that would be received by any non-assigned users if assigned to a respective color, from any users already assigned to the respective color. The matrix A defined below is one example of a set of indications of aggregated (co-channel) radio interferences. Its determination will be described next.

First, the auxiliary co-channel interference matrix A of size (N×C) is introduced as $$A = \begin{bmatrix} a(1,1) & \dots & a(1,C) \\ \vdots & & \vdots \\ a(N,1) & \dots & a(N,C) \end{bmatrix}, \quad (26)$$

defined by $$A = QC, \quad (27)$$

such that a(i,k) represents the aggregated co-channel interference on user i due to the co-frequency interference of users in color k. The element a(i,k) can be written as the product of the i-th row vector $$q_i^R$$

of the matrix Q times the k-th column vector $$c_k^c$$

of the matrix $$Ca(i,k) = q_i^R c_k^c.$$

Here, the matrix Q is an example of a set of quantities indicating mutual radio interferences between pairs of users. Further, the matrix C is an example of a radio resource mapping, in that it assigns users to colors (as examples of radio resource blocks).

It is worth noting that the matrix A contains an excess of information as each of the entries of the i-th row reports the interference on the i-th user as if it would be associated to the k-th color, with a number of entries equal to the number of colors k=1, . . . , C.

Left-multiplying the matrix A by $C^T$ yields a square matrix of size (C×C) with entry elements $$[C^T A](l,k) = (c_l^C)^T a_k^C, \quad (29)$$

which sums up the interference of users assigned to color l that they would experience from users in color k. Evidently, these quantities make sense primarily when the indices l and k coincide. It this respect the diagonal elements $[C^T A](k,k)$ represent the sum interference for color k. The sum-interference $INR_T$ can be finally obtained by summing all diagonal elements, $$INR_T = tr\{C^T A\} = tr\{C^T QC\}. \quad (30)$$

The richness of information offered by the matrix A can be exploited in a constructive way to assign color to users in a heuristic sequential way.

The proposed method of determining the radio resource mapping may be an iterative method. Specifically, the radio resource mapping (e.g., coloring matrix) may be determined in one or more iterations, by successively updating an intermediate radio resource mapping (e.g., intermediate or temporary coloring matrix) $C^{(n)}$. At each stage or iteration, the constraint may be applied that each user is assigned to at most one among the available colors.

For example, assuming that a number of users has already been assigned to a color at the n-th iteration, such that the temporary coloring matrix $C^{(n)}$ satisfies $$\sum_{k=1}^{C} c^{(n)}(i,k) = \begin{cases} 1 & \text{if the } i-th \text{ user has a color assigned} \\ 0 & \text{otherwise} \end{cases}, \quad (31)$$

the information provided by $A^{(n)}=QC^{(n)}$ allows to select, from the non-assigned users, the one user (i.e., row) with worst interference and for it the least interfering color (within the row). Using the concepts above, an example of pseudocode for the first coloring iteration is described in Algorithm 1. In doing so, priority is given to the most interfered users in picking up the least interfering color. This is the key strategy beyond the proposed heuristic approach, which can be easily implemented in software by virtue of the matrix formulation. As per the pseudocode, the first user selected and assigned to color 1 (e.g., in a first iteration) may be the one showing the highest interference from any other user.

In the evaluation of $A^{(n)}=QC^{(n)}$ it can be observed that $A^{(n)}$ needs to be evaluated only for the non-assigned users, $user_{flag(i)}=0$, considering that the interference comes only from the assigned users, $user_{flag(i)}=1$. This allow to dynamically optimize the size of the involved matrices to the smallest dimension with relevant multiplicative complexity saving.

For the described algorithm, the combinatorial complexity remains strictly linear O(N).

Notably, since any radio resource mapping can be implemented by a mapping matrix, any of the statements made above with regard to the coloring matrix C can be readily extended to generalized radio resource mappings.

It is further understood that the above assignment of users and colors to rows and columns, respectively, of the A and C matrices is an arbitrary choice and might be reversed in some implementations, with appropriate adaptations to respective matrix calculations.

Figure 7:
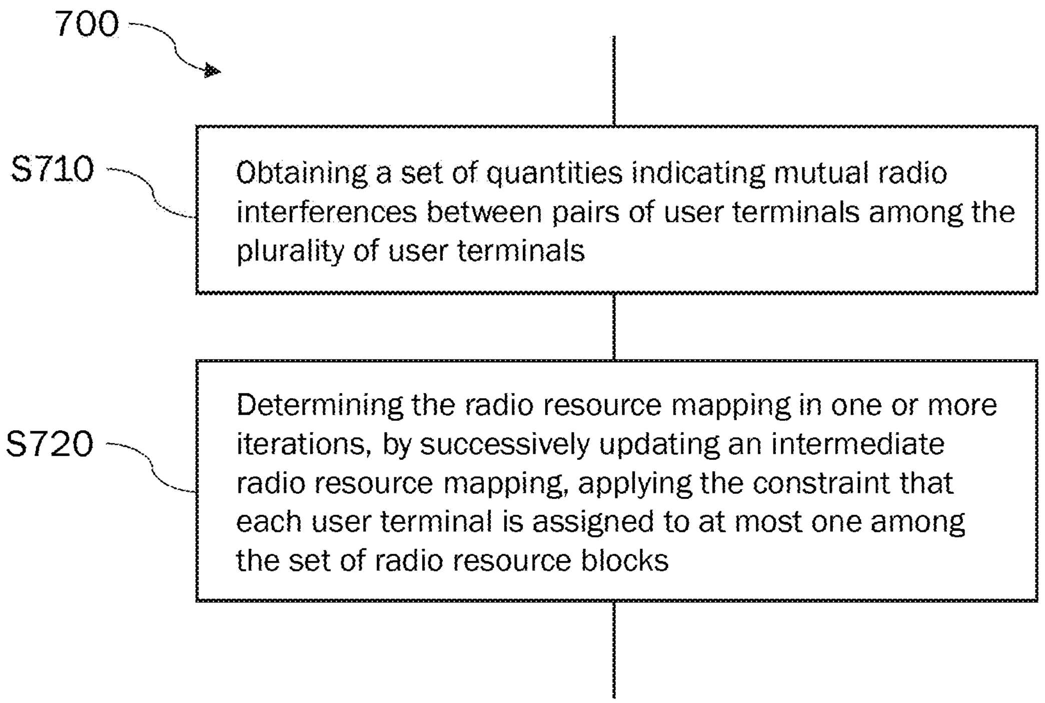
FIG. 7 is a flowchart illustrating an example of a method of determining a radio resource mapping according to embodiments of the disclosure.

An example of a general method 700 of determining a radio resource mapping that uses the concepts described above is illustrated in the flowchart of FIG. 7. As noted above, the radio resource mapping assigns a plurality of users (user terminals) to a set of radio resource blocks (e.g., colors (color slices), such as time slots, frequency slots, pseudo-random spreading sequences, polarization modes, frames of a superframe, or combinations thereof, for example), for performing wireless communications between a hub station and the plurality of users. In the resulting radio resource mapping, each user terminal may be assigned to at least one (e.g., exactly one) radio resource block. One example of the radio resource mapping is a color mapping. The color mapping may be implemented, for example, by a coloring matrix, such as coloring matrix C. Method 700 comprises steps S710 and S720 described below.

At step S710, a set of quantities indicating mutual radio interferences between pairs of user terminals among the plurality of (active) user terminals is obtained. An example of this set of quantities is given by the entries $q_{ij}$ of the interference matrix Q, or equivalently, the off-diagonal entries of the power transfer matrix S.

Here, obtaining the set of quantities indicating mutual radio interferences between pairs of (active) user terminals may comprise obtaining the N×N interference matrix Q (e.g., as defined above) that indicates mutual radio interferences between pairs of user terminals, where N is the number of (active) user terminals. It is understood that the relevant entries of the interference matrix Q may also be determined via determination of the power transfer matrix S. As explained above, an entry $q_{ij}$ of the interference matrix Q may indicate the power that is transmitted for the i-th user but received by the j-th user.

In a generalized framework described for example in Appendix B, obtaining the set of quantities indicating mutual radio interferences between pairs of user terminals may comprise obtaining a CN×CN generalized interference matrix $\tilde{Q}$ that indicates mutual radio interferences between pairs of user terminals among the plurality of user terminals. Here, it is assumed that a first user terminal uses one of the radio resource blocks of C radio resource blocks, and a second user terminal uses another one of the radio resource blocks of C radio resource blocks.

Further to the above, several options for determining the set of quantities indicating mutual radio interferences between pairs of user terminals at step S710 are feasible, depending on use cases and implementations.

In one preferred embodiment, the set of quantities indicating mutual radio interferences between pairs of user terminals may be determined based on an independent determination of the antenna power beam pattern for each (active) user terminal.

Alternatively, the set of quantities indicating mutual radio interferences between pairs of user terminals may be approximated based on mutual distances on ground between the user terminals of the pairs. This determination may proceed based on a Gaussian beam shape $g_0$, for example, so that radio interference q(i,j) would be given by $q(i,j)=|g_0(u_i-u_j)|^2$ (e.g., as per Eq. (40) below), where $u_i$ and $u_j$ are the locations on ground of the i-th and j-th user terminals, respectively.

In yet another example (see for example Appendix B.III.), the set of quantities indicating mutual radio interferences between pairs of user terminals may be determined based on a channel matrix representing a complex transfer function between an antenna array of the hub-station array and the plurality of user terminals.

At step S720, the radio resource mapping (e.g., a color mapping implemented by coloring matrix C) is determined in one or more iterations, by successively updating an intermediate radio resource mapping (e.g., an intermediate/temporary color mapping implemented by intermediate/temporary coloring matrix $C^{(n)}$), applying the constraint that each user terminal is assigned to at most radio resource block among the set of radio resource blocks (e.g., colors).

It is understood that one iteration may be performed for each user terminal that is to be assigned to a radio resource block.

Figure 8:
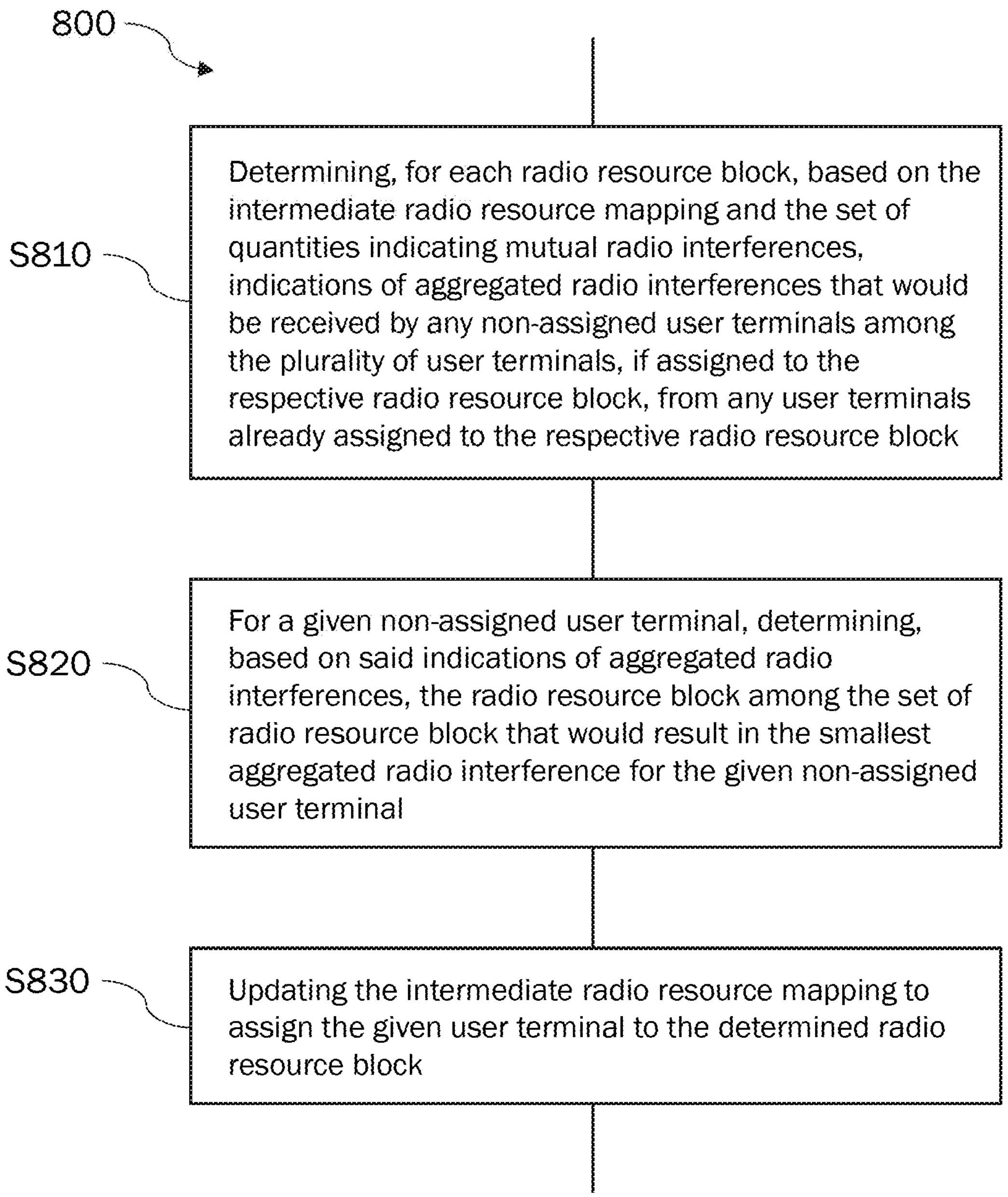
FIG. 8 is a flowchart illustrating an example implementation of a step in the method of FIG. 7, FIGS. 9A and 9B schematically illustrate effects of the Reverse Cuthill-McKee algorithm in the context of the present disclosure.

An example of a method 800 that may be performed at each iteration of step S720 is illustrated in the flowchart of FIG. 8. Method 800 comprises steps S810 to S830.

At step S810, for each radio resource block, based on the intermediate radio resource mapping and the set of quantities indicating mutual radio interferences, indications are determined of aggregated radio interferences that would be received by any non-assigned user terminals among the plurality of user terminals, if assigned to the respective radio resource block, from any user terminals already assigned to the respective radio resource block.

Therein, determining the indications of aggregated radio interferences may comprise determining the N×C aggregated interference matrix A. This may be done, e.g., as per Eq. (27), by a matrix multiplication based on the interference matrix Q and the N×C (intermediate) radio resource mapping matrix C (or $C^{(n)}$), where C is the number of radio resource blocks. As noted above, the matrix entries $a_{ij}$ of the aggregated interference matrix A may indicate an aggregated radio interference that an i-th user terminal would receive if assigned to a j-th radio resource block. In a given iteration n, the relevant (intermediate/temporary) aggregated interference matrix $A^{(n)}$ may be determined via $A^{(n)}=QC^{(n)}$, where $C^{(n)}$ is the intermediate/temporary radio resource mapping matrix (e.g., coloring matrix), as noted above. As has also been noted above, the radio resource mapping matrix C may be a binary matrix that implements the intermediate radio resource mapping, with (binary) matrix entries $c_{ij}$ indicating whether or not the i-th user terminal is assigned to the j-th radio resource block.

In a generalized framework (see for example Appendix B), determining the indications of aggregated radio interferences may comprise determining an N×C aggregated interference matrix $\tilde{A}$ by a reordering of a matrix multiplication based on the generalized interference matrix $\tilde{Q}$ and a vectorization of a N×C intermediate radio resource mapping matrix C (or $C^{(n)}$), where C is the number of radio resource blocks, with matrix entries $a_{ij}$ of the aggregated interference matrix $\tilde{A}$ indicating an aggregated radio interference that an i-th user terminal would receive if assigned to a j-th radio resource block.

At step S820, for a given non-assigned user terminal $i^{(n)}$, based on said indications of aggregated radio interferences, the radio resource block is determined among the set of radio resource blocks that would result in the smallest aggregated radio interference for the given non-assigned user terminal. According to the above example, this would amount to selecting that color (as an example of a radio resource block) among the available colors that has associated therewith the smallest aggregated interference in the row of matrix A that corresponds to the given non-assigned user $i^{(n)}$ (e.g., the $i^{(n)}$-th row of matrix A). This amounts to selecting the color index $k^{(n)}$ that minimizes the matrix entry $a(i^{(n)}, k^{(n)})$ in the $i^{(n)}$-th row (corresponding to the given non-assigned user terminal $i^{(n)}$).

At step S830, the intermediate radio resource mapping is updated to assign the given non-assigned user terminal $i^{(n)}$ to the determined radio resource block. For example, the intermediate/temporary coloring matrix $C^{(n)}$ may be updated so that the updated coloring matrix $C^{(n+1)}$ assigns user terminal $i^{(n)}$ to color $k^{(n)}$, in addition to any assignments of other users from previous iterations. This may amount to setting $c(i^{(n)}, k^{(n)})$ to from zero to one, $c(i^{(n)}, k^{(n)})\leftarrow 1$.

For a first iteration, n=1, the user terminal that has the largest mutual radio interference among the mutual radio interferences may be selected as the given non-assigned user terminal. This may amount to selecting the user terminal $i^{(1)}$ so that $q(i^{(1)}, j)$ is the largest entry of the interference matrix Q for some j=1, . . . , N. The intermediate radio resource mapping may then be initialized to assign the selected user terminal $i^{(1)}$ to a radio resource block among the set of radio resource blocks. This radio resource block may be an arbitrary radio resource block, such as a first radio resource block $k^{(1)}=1$ in a chosen numbering of radio resource blocks. Updating/initializing the radio resource mapping matrix (e.g., coloring matrix) may then amount to setting $c(i^{(1)}, k^{(1)}) \leftarrow 1$.

After the first iteration n=1, which may be said to correspond to an initialization of the iterative determination of the radio resource mapping, said iterative determination may include one iteration for each of the remaining user terminals among the plurality of user terminals.

Further, after the first iteration, several options for selecting the given non-assigned user terminal at step S820 are feasible, depending on use cases and implementations.

For example, in line with the above, each iteration after the first iteration may involve determining, based on the indications of aggregated radio interferences (e.g., based on the aggregated interference matrix A), a non-assigned user terminal that would receive the largest aggregated radio interference among the non-assigned user terminals for any of the radio resource blocks. This may amount to selecting, based on said indications, the non-assigned user terminal that has the largest aggregated radio interference. Specifically, said indications specify a non-assigned user terminal and a potential assignment of this non-assigned user terminal to a radio resource block that would result in the largest aggregated radio interference among the aggregated radio interferences indicated by said indications. In yet other words, for each user terminal, that radio resource block is considered that would result in the maximum aggregated radio interference for the respective user terminal, and subsequently, the user terminal is selected that has the largest maximum aggregated radio interference. This non-assigned user terminal is then selected. In terms of the aggregated interference matrix A, this may mean finding the largest entry in any of the rows of matrix A corresponding to non-assigned users (the remaining rows may be neglected for the determination, as noted above), and selecting the user terminal corresponding to the row in which this largest entry has been found. The determined non-assigned user terminal may then be selected as the given non-assigned user terminal for the current iteration. Which rows of matrix A need to be considered for the selection of the given non-assigned user terminal may be governed by non-assigned user flags, $user_{flag(i)}$, as explained above.

Alternatively, in a scenario in which a user terminal newly becomes active and/or newly requests wireless communication with the hub station, this user terminal may be selected as the given non-assigned user terminal. Thereby, newly active user terminals can be seamlessly added to an existing communication system.

It is understood that in any matrix manipulations (e.g., multiplications) that are required in the context of examples of methods 700 and/or 800, all those columns and rows of the matrix Q that relate to already assigned users may be omitted, along with corresponding rows (or columns, depending on the column/row assignment) of the matrix C. Whether or not a user has already been assigned may be indicated by the aforementioned flags $user_{flag(i)}$.

An example of H-RRM in a generalized framework will be described in Appendix B.II.

Algorithm 1
Algorithm 1 Heuristic User Coloring

Inputs:
S, Power transfer matrix ▷ s(i,j), i, j = 1 ... N
C, Number of colors
N, Total number of users (i.e. in all colors) ▷ Can be derived from the size of S
Outputs:
C, Coloring matrix ▷ c(i, k), i = 1 ... N, k = 1 ... C
Initialize:
$Q \leftarrow S$,
$q(i, i) \leftarrow 0$, i = 1 ... N, ▷ Null diagonal
$c(i,k) \leftarrow 0$, i = 1 ... N, k = 1 ... C
user_flag (i) ← 0, i = 1 ... N ▷ 1 if user is assigned $i^{(1)} \leftarrow \underset{i}{\operatorname{argmax}}\left[\underset{k}{\operatorname{argmax}}\ q(i, k)\right]$ ▷ Find user with worst single-entry interference $k^{(1)} \leftarrow 1$ ▷ Color 1 to first user
$c(i^{(1)}, k^{(1)}) \leftarrow 1$ ▷ Assigns color $k^{(1)}$ to user $i^{(1)}$
user_flag ($i^{(1)}$) ← 1 ▷ Removes user $i^{(1)}$ from the list while $\sum_{i=1}^{N} \text{user\_flag}(i) \neq N$ do $A \leftarrow QC$ ▷ Evaluates A(n)
▷ A = Q(user_flag = 0, user_flag =1) C(user_flag = 1,:)

$i^{(n)} \leftarrow \underset{i, user\_flag(i)=0}{\operatorname{argmax}}\left[\underset{k}{\operatorname{argmax}}\ a(i, k)\right]$ ▷ Find user with worst aggregated interference $k^{(n)} \leftarrow \underset{k}{\operatorname{argmax}}\ a(i^{(n)}, k)$ ▷ Find color with least aggregated interference -continued

| Algorithm 1<br>Algorithm 1 Heuristic User Coloring | |
|---|---|
| $c(i^{(n)}, k^{(n)}) \leftarrow 1$ | ▻ Assigns color $k^{(n)}$ to user $i^{(n)}$ |
| $user\_flag(i^{(n)}) \leftarrow 1$ | ▻ Removes user $i^{(n)}$ from the list |
| end while | |

| Algorithm 2<br>Algorithm 2 Heuristic User Coloring | |
|---|---|
| Inputs: | |
| S, Power transfer matrix | ▻ s(i,j), i, j = 1 ... N |
| C, Number of colors | |
| N, Total number of users (i.e. in all colors) | ▻ Can be derived from the size of S |
| Outputs: | |
| C, Coloring matrix | ▻ c(i, k), i = 1 ... N, k = 1 ... C |
| Initialize: | |
| $Q \leftarrow S$, | |
| $q(i, i) \leftarrow 0$, i = 1 ... N, | ▻ Null diagonal |
| $c(i,k) \leftarrow 0$, i = 1 ... N, k = 1 ... C | |
| $a(i,k) \leftarrow 0$, i = 1 ... N, k = 1 ... C | |
| $user\_flag\ (i) \leftarrow 0$, i = 1 ... N | ▻ 1 if user is assigned |
| $user\_counter \leftarrow 0$ | ▻ Counter of assigned users |
| $i^{(1)} \leftarrow \underset{i}{\operatorname{argmax}}\left[\underset{k}{\operatorname{argmax}}\ q(i, k)\right]$ | ▻ Find user with worst single-entry interference |
| $k^{(1)} \leftarrow 1$ | ▻ Color 1 to first user |
| $c(i^{(1)}, k^{(1)}) \leftarrow 1$ | ▻ Assigns color $k^{(1)}$ to user $i^{(1)}$ |
| $user\_flag\ (i^{(1)}) \leftarrow 1$ | ▻ Removes user $i^{(1)}$ from the list |
| $a(j, k^{(1)}) \leftarrow q(j, i^{(1)})$, j = 1 ... N | ▻ $A^{(1)} = \Delta A^{(1)}$<br>▻ $A(:, k^{(1)}) = Q(:, i^{(1)})$ |
| $user\_counter \leftarrow 1$ | |
| while $user\_counter \neq N$ do | |
| $i^{(n)} \leftarrow \underset{i, user\_flag(i)=0}{\operatorname{argmax}}\left[\underset{k}{\operatorname{argmax}}\ a(i, k)\right]$ | ▻ Find user with worst aggregated interference |
| $k^{(n)} \leftarrow \underset{k}{\operatorname{argmax}}\ a(i^{(n)}, k)$ | ▻ Find color with least aggregated interference |
| $c(i^{(n)}, k^{(n)}) \leftarrow 1$ | ▻ Assigns color $k^{(n)}$ to user $i^{(n)}$ |
| $user\_flag(i^{(n)}) \leftarrow 1$ | ▻ Removes user $i^{(n)}$ from the list |
| $a(j, k^{(n)}) \leftarrow a(j, k^{(n)}) + q(j, i^{(n)})$, j = 1 ... N | ▻ $A^{(n+1)} = A^{(n)} + \Delta A^{(n)}$<br>▻ $A(:, k^{(n)}) = A(:, k^{(n)}) + Q(:, i^{(n)})$ |
| $user\_counter \leftarrow user\_counter + 1$ | |
| end while | |

III.B. Fast Heuristic RRM

The heuristic coloring algorithm has been described and implemented in Algorithm 1 with a matrix notation pivoted in the iterative evaluation of the user interference by means of the matrix multiplication $A^{(n)}=QC^{(n)}$. This matrix multiplication dominates the computational complexity of the algorithm with a multiplicative complexity of order $\mathcal{O}(N^2C)$. Therein, the dominant element is the matrix multiplication A=QC, where for Q of size (N×N) and C of size (N×C) the number of real multiplications is equal to $(N^2C)$.

Figure 9A:
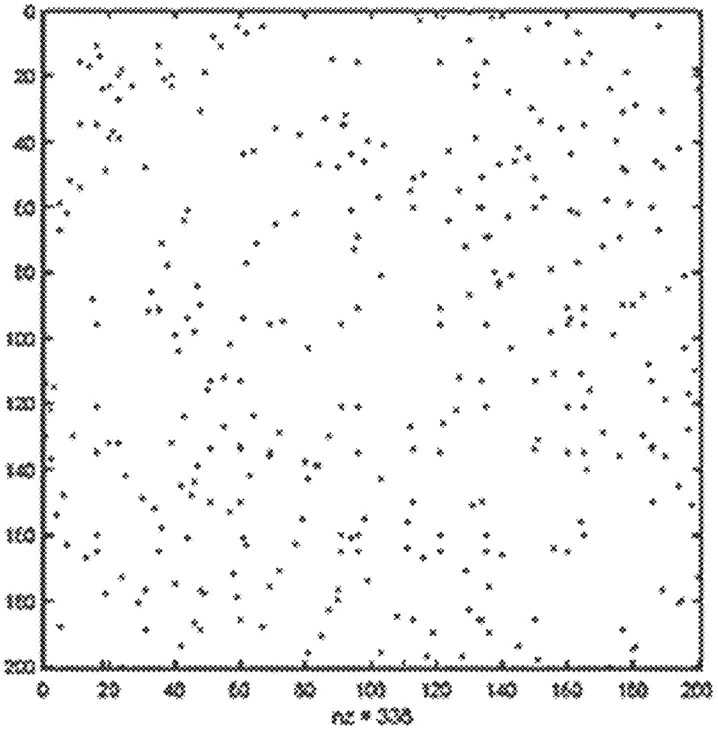
Figure 9B:
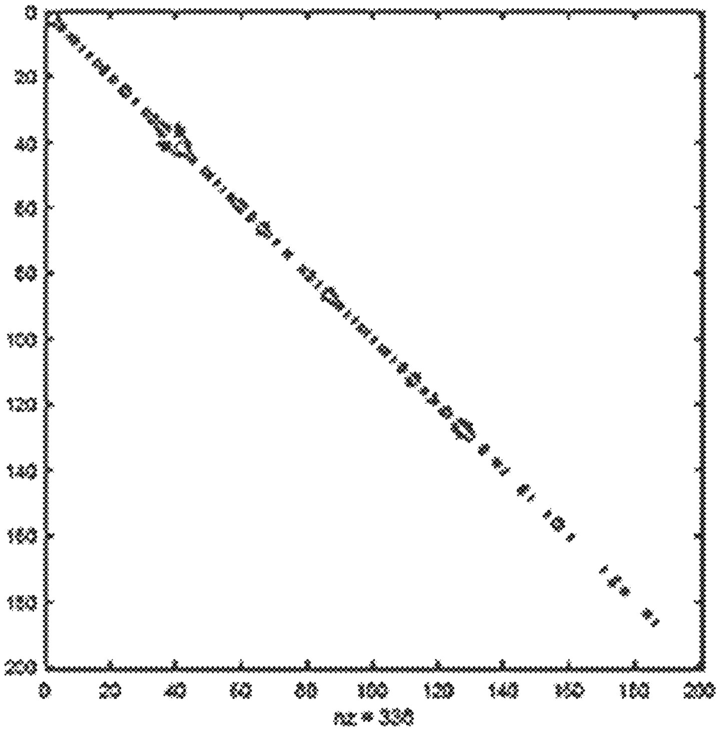

A number of improvements on the data structure and data manipulations can be implemented to increase the efficiency of the evaluation of the matrix product:

- Considering the binary nature of the matrix $C^{(n)}$, the matrix multiplication may be interpreted as a selective sum with the indexes of the elements to sum defined by the entries of the column vectors of the matrix $C^{(n)}$. This can lead to computational improvements due to the avoidance of multiplications.
- Exploiting the sparse nature of the interference matrix Q, which is due to the decaying nature of the radiation patterns, a data structure based on lists of non-null elements, instead of a matrix structure, could be more effective. This approach may be well-established in graph theory literature which addresses similar combinatorial computational problems. The matrix Q can be interpreted as a weighted adjacency matrix which can be efficiently represented by its adjacency list.
- Alternatively, a similar improvement in the matrix multiplication can be obtained with sparse matrix representation techniques. The matrix Q can be reordered into a band matrix Q' (i.e., a matrix whose only nonzero elements lie on diagonal bands above and/or below the main diagonal) of limited bandwidth (i.e., limited number of nonzero diagonals below and above the main diagonal) by means of matrix bandwidth reduction techniques, such as the Cuthill-McKee algorithm, or its reverse version. The reordering of Q into Q' has a limited combinatorial complexity $\mathcal{O}(N^2)$ and needs to be performed only at the beginning of the heuristic user coloring routine. The effect of the application of the reverse Cuthill-McKee algorithm the for a population of N=200 users generated according to a random uniform distribution in the coverage area is shown in the example of FIGS. 9A and 9B. The graph in FIG. 9A shows the distribution of the non-negligible elements (i.e., below a given threshold) of the approximated power transfer matrix. FIG. 9B shows the reordered bandwidth limited matrix. The matrix multiplication $A'^{(n)}=Q'C'^{(n)}$ can be performed limiting the running indexes of the entry-wise row-column multiplication to non-null elements within the identified bandwidth of Q'.

The elements above address possible data structures that can be exploited to improve the efficiency of the matrix multiplications A=QC. Nevertheless, alternatively or in addition, a dramatic reduction of the computational complexity can be obtained by analyzing details of the operations involved in the transition between two iterations. For example, the result of iteration (n) which is used as starting point for the matrix multiplication at the following iteration (n+1) may be considered $$A^{(n+1)} = QC^{(n+1)}. \tag{32}$$

The binary coloring matrix $C^{(n+1)}$ is the result of an update of the coloring matrix $C^{(n)}$, which is the input of iteration (n) with the assignment of color $k^{(n)}$ to user $i^{(n)}$ during iteration (n). This corresponds to setting the element of $C^{(n+1)}$ with row and column indexes $i^{(n)}$, $k^{(n)}$ to one, $$\begin{aligned} C^{(n+1)} &= C^{(n)} + \begin{bmatrix} & 0 & \\ & c^R_{i(n)} & \\ & 0 & \end{bmatrix} \leftarrow i^{(n)} \\ & \quad\quad\quad\; k^{(n)} \\ & \quad\quad\quad\;\; \downarrow \\ &= C^{(n)} + \begin{bmatrix} 0 & 0 & 0 \\ 0 & 1 & 0 \\ 0 & 0 & 0 \end{bmatrix} \leftarrow i^{(n)} \\ &= C^{(n)} + \Delta C^{(n)}. \end{aligned} \tag{33}$$

The evaluation of the new auxiliary co-channel interference matrix $A^{(n+1)}$ can be thus reduced to an update of the matrix $A^{(n)}$, $$\begin{aligned} A^{(n+1)} &= QC^{(n+1)} = Q\left(C^{(n)} + \Delta C^{(n)}\right) \\ &= A^{(n)} + Q\Delta C^{(n)} = A^{(n)} + \Delta A^{(n)} \end{aligned}. \tag{34}$$

Considering the structure of $\Delta C^{(n)}$, the matrix multiplication $\Delta A^{(n)}=Q\Delta C^{(n)}$ corresponds to selecting the $i^{(n)}$-th column of Q, i.e., $$q^C_{i(n)},$$

and placing it as the $k^{(n)}$-th column of the difference matrix $\Delta A^{(n)}$, $$\Delta A^{(n)} = \begin{bmatrix} 0 & q^C_{i(n)} & 0 \end{bmatrix}. \quad \uparrow k^{(n)} \tag{35}$$

This result corresponds to the fact that with the assignment of the color $k^{(n)}$ to the user $i^{(n)}$, its interference (i.e., $$q^C_{i(n)})$$

must be added to the relevant color column (i.e., $k^{(n)}$) of the auxiliary co-channel interference matrix $A^{(n)}$. This allows to reduce the evaluation of $A^{(n+1)}$ to an update of the matrix at the previous iteration, $A^{(n)}$, adding the interference of the newly assigned user to the column of the selected color, $\Delta A^{(n)}$, with a computational complexity of N real additions in the worst case. In this respect, a representation of the matrix Q as a re-ordered band-limited matrix or with an adjacency list would allow to further reduce the number of additions either to the number of non-null entries per column or to the vertical band of the matrix, respectively.

An example of a fast version of Algorithm 1 which exploits the iterative update of the auxiliary co-channel interference matrix is shown in Algorithm 2. It is worth noting that for economy of operations, also the completion condition of the while loop is expressed with an iteratively updated counter in both algorithms.

It is further to be noted that the above improvements in computational efficiency may be likewise applied to methods 700 and 800 described above.

III.C. Approximated Power Transfer Matrix

It is assumed that a location of an i-th user (e.g., on the Earth surface) as seen from a satellite (or hub station in general) can be described either by angular coordinates, such as azimuth and polar angles $\vartheta_i$, $\phi_i$, or by cartesian coordinates, such as $u_i$, $v_i$. These coordinates may be related to each other via $$u_i = \sin(\vartheta_i)\cos(\phi_i), \quad v_i = \sin(\vartheta_i)\sin(\phi_i),$$

$$\vartheta_i = \sqrt{u_i^2 + v_i^2}, \; \phi_i = \tan^{-1}\left(\frac{v_i}{u_i}\right).$$

These coordinates may be used in the remainder of the present disclosure.

Depending on the beamforming/precoding approach, the matrix Q, which collects the mutual interference terms, can be evaluated in an approximated or detailed (e.g., exact) manner. An a-priori evaluation of the interference matrix Q based on the mutual distance is possible and may be proposed as an alternative solution to the resource management problem, although the use of the real antenna beam pattern (if available) may be highly recommended.

Considering that main contributions for the interference are due to the main beam, a Gaussian shaped beam $g_0(u,v)$ of beam-width comparable with the expected antenna beamwidth can be used as reference prototype beam, $$g_0(u, v) = \exp\left[-\frac{1}{2\sigma^2}(u^2 + v^2)\right]. \tag{36}$$

The parameter σ can be adjusted to match the main beam of the antenna under assessment, which for example may be a square array of size $D_A$ (see, for example, reference literature 1). For simplicity, without intended limitation, the expression of the equivalent continuous square aperture $g_s(u,v)$ may be used, $$g_S(u, v) = \frac{\sin\left(\pi u\frac{D_A}{\lambda}\right)}{\pi u\frac{D_A}{\lambda}}\frac{\sin\left(\pi v\frac{D_A}{\lambda}\right)}{\pi v\frac{D_A}{\lambda}}. \quad (37)$$

Equating the two expressions at the point $$t\frac{1}{2}\frac{\lambda}{D_A},$$

(e.g., at $$u = \frac{1}{2}\frac{\lambda}{D_A},$$

v=0)

$$g_0\left(\frac{1}{2}\frac{\lambda}{D_A}\right) = \exp\left[-\frac{1}{8\sigma^2}\left(\frac{\lambda}{D_A}\right)^2\right] = g_S\left(\frac{1}{2}\frac{\lambda}{D_A}\right) = \frac{\sin\left(\frac{\pi}{2}\right)}{\frac{\pi}{2}}, \quad (38)$$

yields $$\frac{1}{\sigma^2} = -8\ln\left[\frac{\sin\left(\frac{\pi}{2}\right)}{\frac{\pi}{2}}\left(\frac{D_A}{\lambda}\right)^2\right] \approx 3.61\left(\frac{D_A}{\lambda}\right)^2, \quad (39)$$

and eventually $$\sigma \approx \frac{1}{\sqrt{361}}\frac{\lambda}{D_A}. \quad (40)$$

The Gaussian beam pattern approximation has a 4 dB beamwidth corresponding to the array of size $$\frac{D_A}{\lambda}.$$

Figure 10:
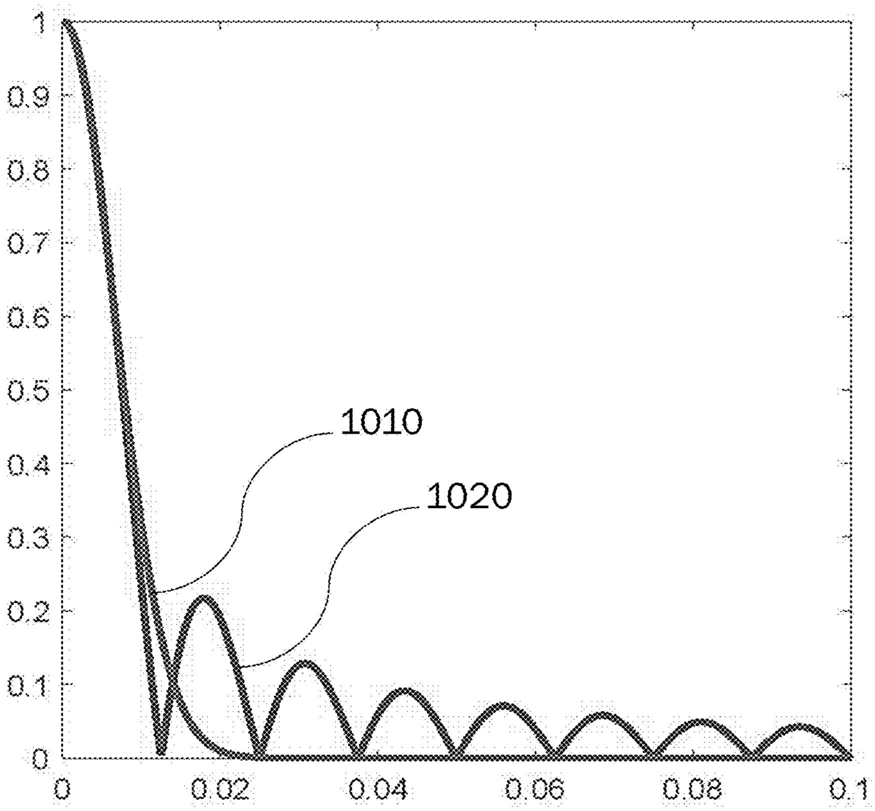
FIG. 10 is a graph schematically illustrating different beam shapes, FIG. 11 schematically illustrates an example of a uniformly random user distribution, FIG. 12 and FIGS. 13A-13D schematically illustrate an example of a possible color assignment for the user distribution of FIG. 11, FIG. 14 and FIG. 15 are graphs illustrating examples of dependency of Diggle's G-function on the number of users and colors, respectively.

An example of a comparison of the two patterns under the main-beam matching condition is shown in the graph of FIG. 10, in which curve 1010 indicates $g_0$ and curve 1020 indicates $g_s$.

The normalized interference term q(i,j) can be thus evaluated as $$q(i, j) = |g_0(u_i - u_j, v_i - v_j)|^2 = |g_0(u_i - u_j)|^2. \quad (41)$$

In general, using the full antenna beam pattern would provide the most accurate RRM solution with affordable complexity. Nevertheless, it is understood that also use of approximations of the beam patterns is envisaged by the present disclosure.

III.D. Heuristic RRM Algorithm Exemplary Results

Figure 11:
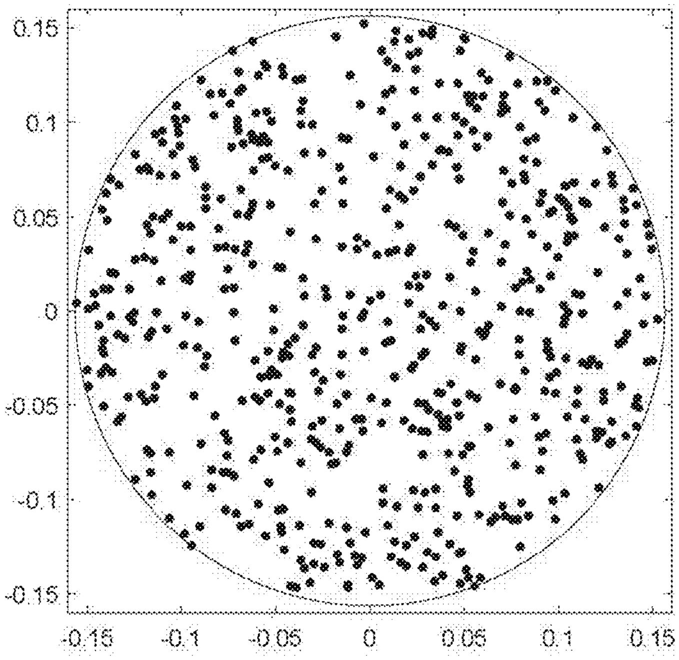
Figure 12:
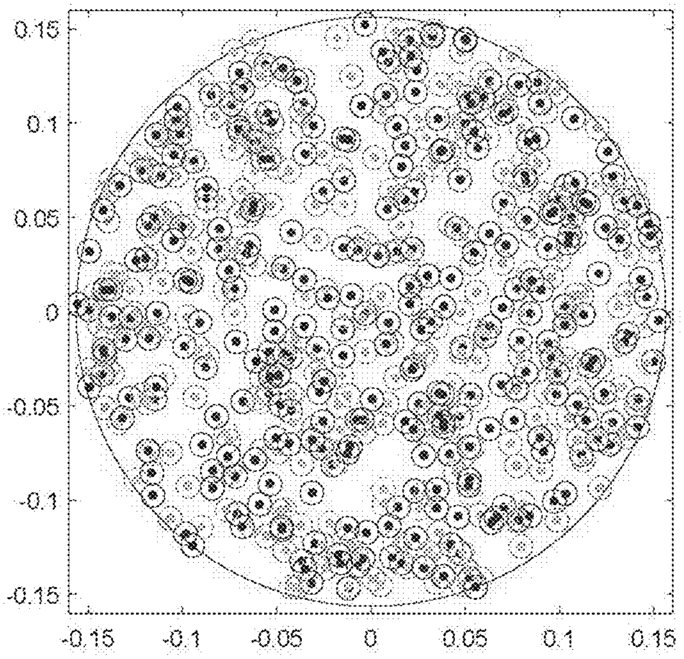
Figure 13A:
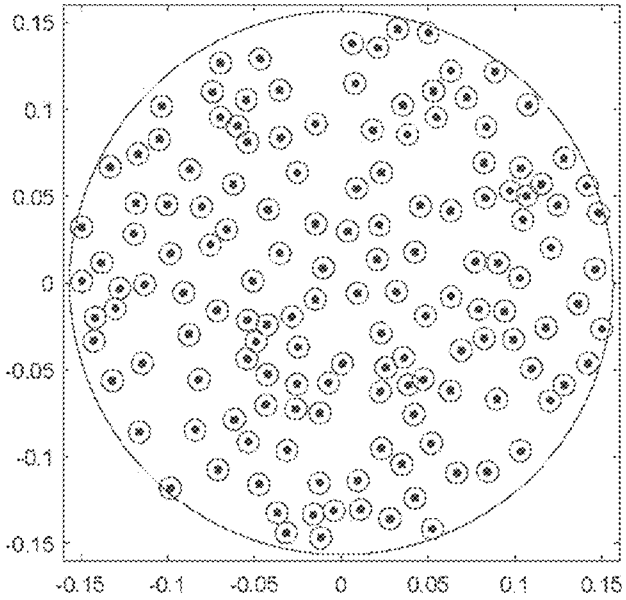
Figure 13B:
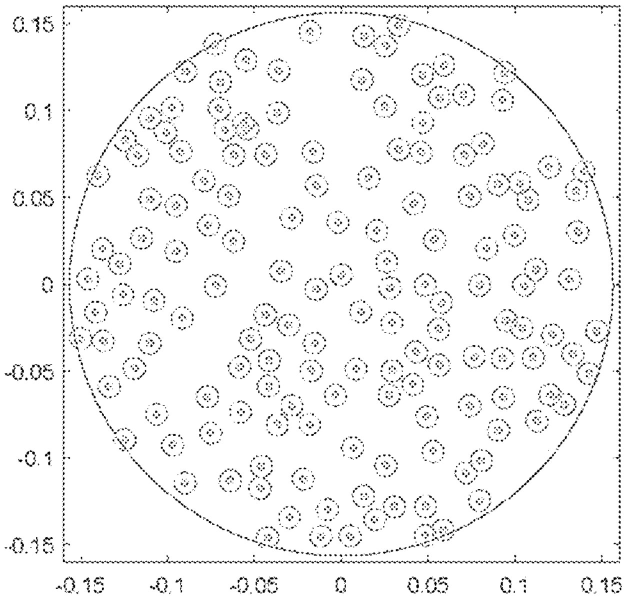
Figure 13C:
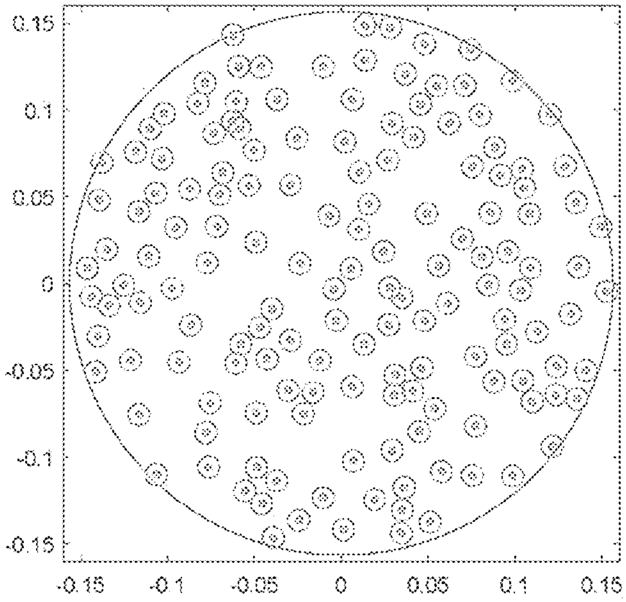
Figure 13D:
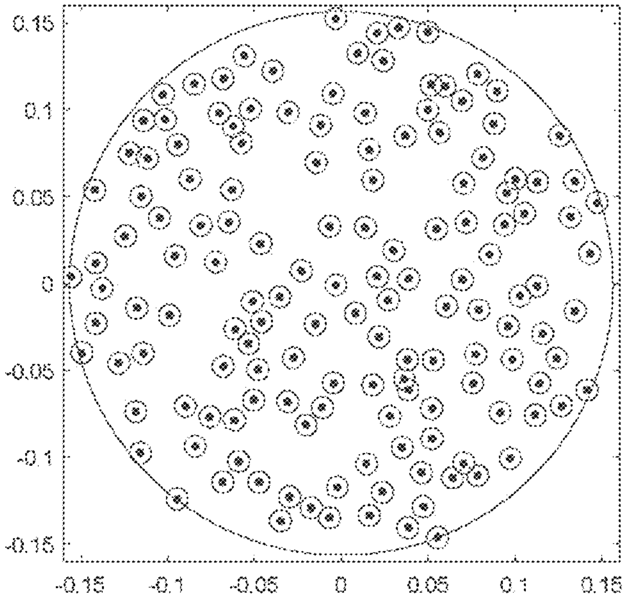

This section provides results for an exemplary application of heuristic user coloring algorithms according to embodiments of the disclosure. It is worth noting that Algorithm 1 and Algorithm 2, respectively, have the same combinatorial decision structure and (apart from negligible numerical error propagation effects) should provide the same outputs for the same inputs. The heuristic user coloring algorithms have been applied to a uniformly random distribution of N=600 users within the (u,v) circle defined by the Earth as seen from a Geostationary satellite. An example of a uniformly random user distribution of N=600 users is shown in FIG. 11. Application of Heuristic User Coloring (e.g., Algorithm 1 or Algorithm 2, or methods 700, 800) leads to the coloring shown in FIG. 12 (N=600, C=4, $D_A$=1.2 m, f=20 GHz), with the individual color slices shown in FIGS. 13A-13D. Therein, FIGS. 13A-13D relate to color index k=1, 2, 3, 4, respectively. The small circles indicate 4 dB beam-width contour plots for an uniformly illuminated square antenna of size $D_A$=1.2 m at f=20 GHz. It can be observed that the populations of users per color have an increased average separation. Similarly, it can be inferred that application of further refinement steps does not substantially improve any first assignment results. Quantitative evidence is provided in the following sections.

III.E. Heuristic RRM Algorithm Stochastic Analysis

Insightful information on the performance of the H-RRM technique can be gained by analyzing it from a stochastic geometry perspective. In mathematics, stochastic geometry is the discipline studying spatial patterns and has been extensively applied to modelling of terrestrial wireless networks performances.

A spatial point pattern can be defined as a set of point locations within a Region of Interest (ROI). Each point, also indicated as event, is identified by its coordinates. For the present purpose, the user distribution in the u, v plane can be considered as a point pattern. Application of the H-RRM technique results in a number of slices, one per color (or resource block in general), and the geometrical properties of the slices can be analyzed to gain insight on performance trends.

The benchmark model for spatial point patterns is the Poisson Point Process (PPP) (as described in Appendix A.I.) which exhibits Complete Spatial Randomness (CSR). In this model the points follow a Poisson Process over the study region which results in a uniform probability density function of intensity ρ, where ρ is the mean number of points per unit area.

As observed in reference literature 1, optimal throughput performance can be achieved when the user distribution satisfies a nearest neighbor minimum distance (referred to as Poisson Disk Process (PDP) distribution, as described in Appendix A.II.) roughly equal to the antenna pattern resolution. Thus, attention may be focused on first-order statistics of the slice point pattern, in particular on the statistical distribution of nearest-neighbor event-event distances.

The nearest-neighbor distance distribution function $\hat{G}(r)$, known as Diggle's G-function, describes the cumulative distribution of the distance of a random point to the nearest point (event-to-event) in the point pattern. A comparison of the empirical distribution function of the point pattern under analysis to the theoretical distribution of the PPP with the same density of points (details of the normalization rescaling are described in Appendix A) offers a summary of effects that the RRM induces on the distancing of the points of a same slice.

Figure 14:
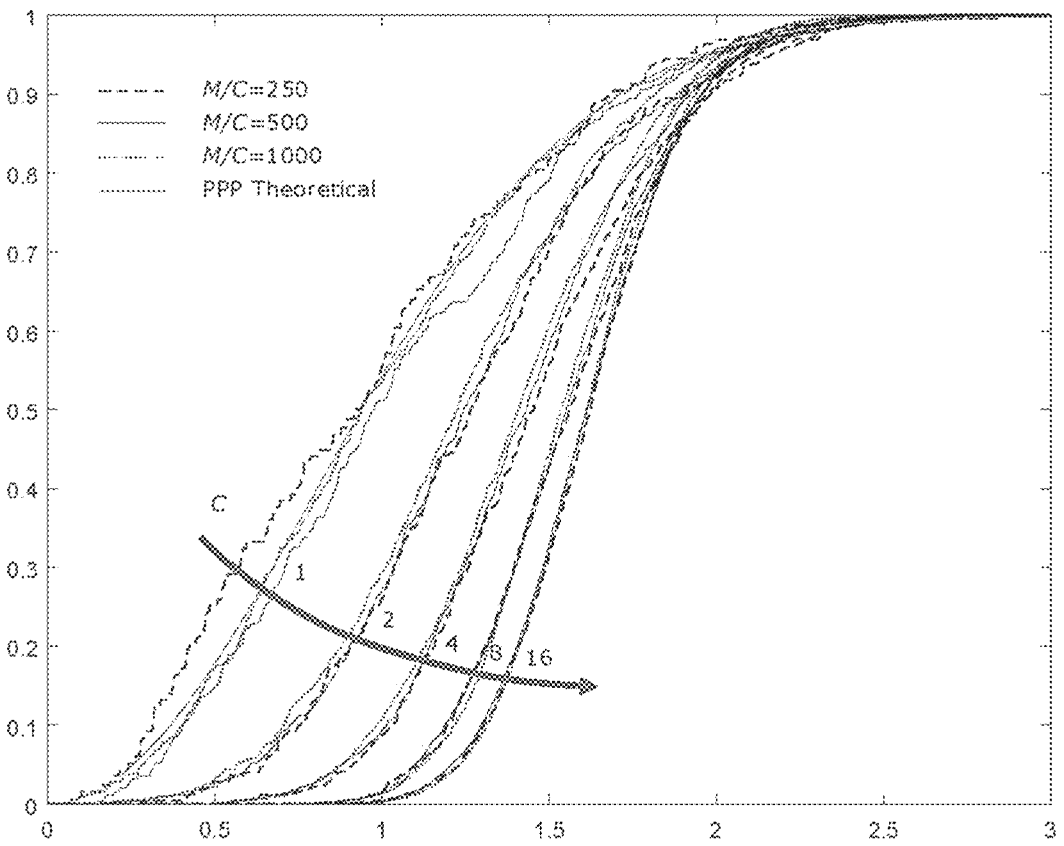

FIG. 14 shows an example of the dependency of the empirical distributions of nearest-neighbor distances for different sizes of populations per slice $$\left(\frac{N}{C} = 250,\ 500,\ \text{and}\ 1000\right)$$

and different number of slices (e.g., colors, or radio resource blocks in general). The re-scaling of the empirical distributions to a normalized density evidences that the effects of the H-RRM are substantially independent of the size of the population and mainly depend on the number of slices (e.g., colors).

Figure 15:
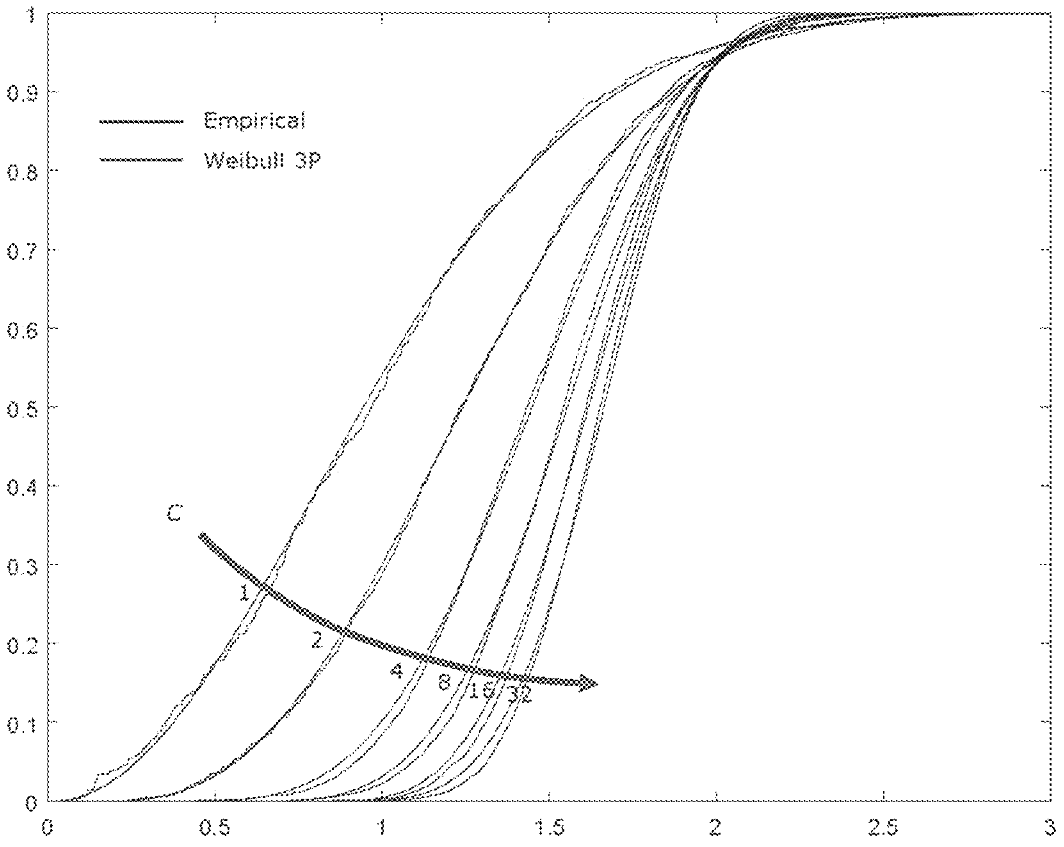

The asymptotic effects of the number of slices (e.g., colors, or radio resource blocks in general) on the distributions of nearest-neighbor distances can be seen from FIG. 15, in which a saturation effect can be observed. This figure also shows a best fitting of the empirical distributions to the cumulative distributions of Weibull three-parameters PDFs. The best fitting parameters have been obtained by Maximum-Likelihood Estimation.

Additionally, the following aspects are worth of note:

Algorithms 1 and 2 have been described as applied to the full user population. Tailored versions of them can be used to assign color to new users entering in the active population, or to reassign resources freed by users that become inactive.

It can be noted from the exemplary results that the minimum distance (i.e., disks not intersecting) cannot be guaranteed in all the cases when a given user population and number of colors are assigned. This can be justified by the observation that when applying a moving spatial filter of the size of the antenna disk, spatial locations counting a number of users within said disk higher than the number of colors will not be resolvable.

Equalization of the number of users assigned per color is not a direct target of the algorithm. Nevertheless, recalling that $INR_T = tr(C^TQC)$ and that the diagonal entries of the matrix $C^TQC$ of size (C×C) represent the sum-interference per color, it can be observed that the heuristic algorithm tends to equalize the value of these diagonal entries and, as secondary effect, obtains a balanced number of users with a small deviation. This conjecture finds confirmation by simulation.

III.F. Virtual Distancing Techniques

In order to enhance the previously described H-RRM algorithms, some area of improvement has been identified in addressing the users' beam assignment worst-cases.

The virtual distancing techniques described in the following sub-sections are based on the observation that once the colors are assigned, the beam positions determine the useful gains and unwanted interference for all users in the resource slot (e.g., color) under consideration. An optimization of the beam positions that guarantees a useful gain for the wanted user while reducing the interference to the users in the same slot may obtain an improvement in the overall throughput.

Considering that the main-lobe interference is mainly dependent on the distance of the beam position to the interfered user positions, the beam positions optimization can be seen as a distancing of the beams from the nearest-neighbor users. In this manner the distance between the users is "virtually" increased.

Two different approaches will be described in the following sub-sections and their performances will be analyzed in Section IV:

Virtual Distancing (VDI)—based on the optimization of the beam positions as continuous bi-dimensional variables Quantized Virtual Distancing (QVD)—where the possible beam positions are discrete points of a bidimensional lattice which may have payload simplification effects (as described for example in reference literature 1)

Both approaches benefit from a form of uplink-downlink duality that allows to individually optimize the beam positions, thereby reducing the overall complexity of the problem.

This can be made more explicit observing that the sum-interference $INR_T$ can be expanded in the sum of the elements of the main diagonal of the matrix $C^TQC$ $$INR_T = tr\{C^TQC\} = \sum_{k=1}^{C}(c_k^C)Qc_k^C = \sum_{k=1}^{C}1^TQ_k1. \tag{42}$$

The square matrices $$Q_k = (c_k^C)^T Qc_k^C$$

are sub-matrices (i.e., matrices obtained by deleting one or more of the rows and/or columns of a matrix) of Q for color k. They are obtained retaining the rows and columns of Q corresponding to the active users for color k. Left and right multiplication respectively by $1^T$ and 1 (where vector 1 has all unit entries), returns the sum of all the matrix entries of $Q_k$ (since the matrix entries are positive, this also corresponds to the $L_1$ matrix norm).

The associative property of matrix multiplication, $1^TQ_k1 = 1^T(Q_k1) = (1^TQ_k)1$, allows to interpret each color contribution to $INR_T$ either as a sum of downlink interference $Q_k1$ or uplink interference $1^TQ_k$. To better understand the difference, for simplicity the case of a single color is considered where $Q_k$ can be read as Q. The downlink and uplink interpretations are as follows.

Downlink Interpretation

The column vector Q 1 has row entries $$[Q\ \ 1](i) = q_i^R 1 = \sum_j q(i, j), \tag{43}$$

which correspond to the sum of the interference of users j on user i sharing the same color. Thus, each row element of the column vector Q 1 can be interpreted as a downlink interference per user; all the users of color k contribute to the interference experienced by user i.

Uplink Interpretation

The row vector $1^TQ$ has column entries $$[1^TQ](j) = 1^Tq_j^C = \sum_i q(i, j). \tag{44}$$

Each column element of the row vector $1^T Q$ can be interpreted as the aggregated interference generated by user j on all the other users. Similarly to the uplink case, the user j is interfered by all the users sharing the same color.

Representing the i-th user position in the u,v-plane with $u_i$ and assuming that the j-th beam is pointing at $s_j$, where $$u_i = \begin{bmatrix} u_i \\ v_i \end{bmatrix},\ s_j = \begin{bmatrix} s_{xj} \\ s_{yj} \end{bmatrix}, \tag{45}$$

and $s_{x\,j}$ and $s_{y\,j}$ are the u and v coordinates of the beam pointing direction (beam position), respectively, the interference generated by user j on user i can be considered to be mainly determined by the spatial response of the j-th beam array factor $$q(i, j) = |g_A(u_i - s_{xj}, v_i - s_{yj}|^2 = |g_A(u_i - s_j)|^2, \tag{46}$$

where $g_A$ is the nadir-pointing array factor.

Exploiting the uplink interpretation, the minimization of the sum-interference can be translated into the independent optimization of the beam positions $s_j$ such that, for each beam, the aggregated interference, $$\sum_i q(i, j) = \sum_{i \neq j} |g_A(u_i - s_j)|^2, \tag{47}$$

is minimized. Therein, beam $s_j$ serves user $u_j$. To limit the gain loss due to the beam displacement from the optimal gain position, the optimization search space must be constrained to a maximum gain loss $\Delta G_{max}$ $$|g_A(0)|^2 - |g_A(u_j - s_j)|^2 \leq \Delta G_{max}. \tag{48}$$

Considering that the un-steered array factor $g_A(\cdot)$ has a maximum and stationary point in 0, the constraint on the maximum gain loss can be translated into a constraint on the maximum displacement radius of the beam pointing direction $s_j$ $$|s_j - u_j| \leq r_{max}. \tag{49}$$

Algorithms for continuous or quantized optimization of the beam positions are described in the following subsections. To simplify the lexicographic use of the indices involved in the description of the optimization algorithms, the running index of the beam under optimization will be denoted as i.

III.F.1 Virtual Distancing (VDI) Technique

Optimization of the i-th beam position (beam pointing direction, or beam steering direction) $s_i$ can be translated into the analog problem of optimally distancing beam $s_i$ from the position of the co-channel users $u_j$ while limiting the gain loss for the served user $u_i$. Notably, here and in the following, the terms user position and user (user terminal) may be used synonymously. Further, also the terms beam pointing direction and beam may be used synonymously.

Figure 16:
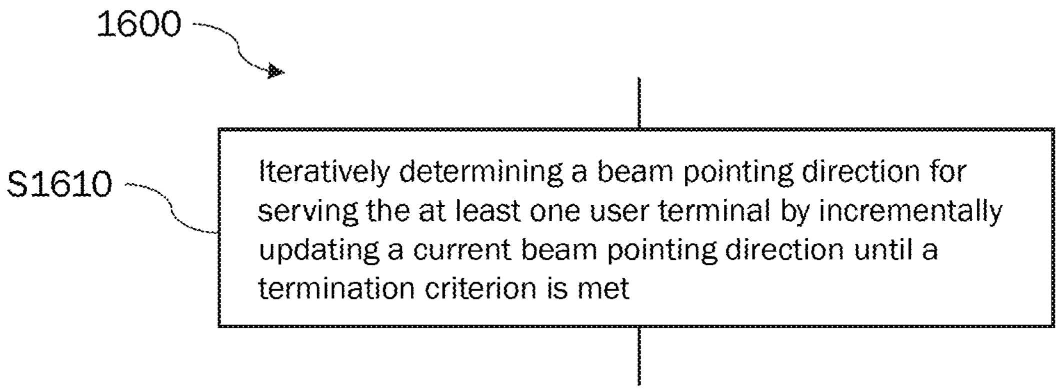
FIG. 16 is a flowchart illustrating an example of a method of determining beam pointing directions according to embodiments of the disclosure, FIGS. 17A-17D schematically illustrate examples of user positions and beam pointing directions in the context of the method of FIG. 16.

A corresponding method 1600 for virtual distancing according to embodiments of the present disclosure is illustrated in the flowchart of FIG. 16. Method 1600 is a method of determining beam pointing directions (beam positions) for performing wireless communications between a hub station and a plurality of user terminals (users). It comprises step S1610 that is performed for at least one user terminal of the plurality of user terminals (or beams) and that is a step of iteratively determining a beam pointing direction for serving the at least one user terminal u; by incrementally updating an intermediate beam pointing direction (temporary/current beam pointing direction)

$$s_i^{(n)}$$

until a termination criterion is met. Therein, for each iteration, the intermediate pointing direction $$s_i^{(n)}$$

is incrementally updated such that the value of a cost function is optimized (e.g., minimized) under the constraint that a gain towards the at least one user terminal $u_i$ for the intermediate pointing direction $$s_i^{(n)}$$

exceeds (or at least, is not less than) a predefined minimum gain (e.g., minimum gain $|g_A(0)|^2 - \Delta G_{max}$). The cost function is designed to penalize aggregated interference that a beam pointing in the intermediate beam pointing direction $$s_i^{(n)}$$

would cause for the remaining user terminals $u_j$, j≠i, among the plurality of user terminals. Thereby, optimization of the value of the cost function will optimize (e.g., reduce or minimize) the aggregated interference.

In the above, the constraint that the gain towards the at least one user terminal u; for the current beam pointing direction $$s_i^{(n)}$$

exceeds the predefined minimum gain may translate into a constraint that the intermediate beam pointing direction $$s_i^{(n)}$$

differs from a direction pointing towards the user terminal $u_i$ to be served by less than a predefined amount (e.g., $r_{max}$). Enforcing this constraint may trigger the aforementioned termination criterion, i.e., an iteration in which the constraint needs to be enforced may be the terminal iteration for the (served) user terminal at hand. Further, the repeated incremental updating of the intermediate beam pointing direction $$s_i^{(n)}$$

may eventually valorize gain toward the (served) at least one user terminal $u_i$ for the respective intermediate beam pointing direction $$s_i^{(n)}.$$

Figure 17A:
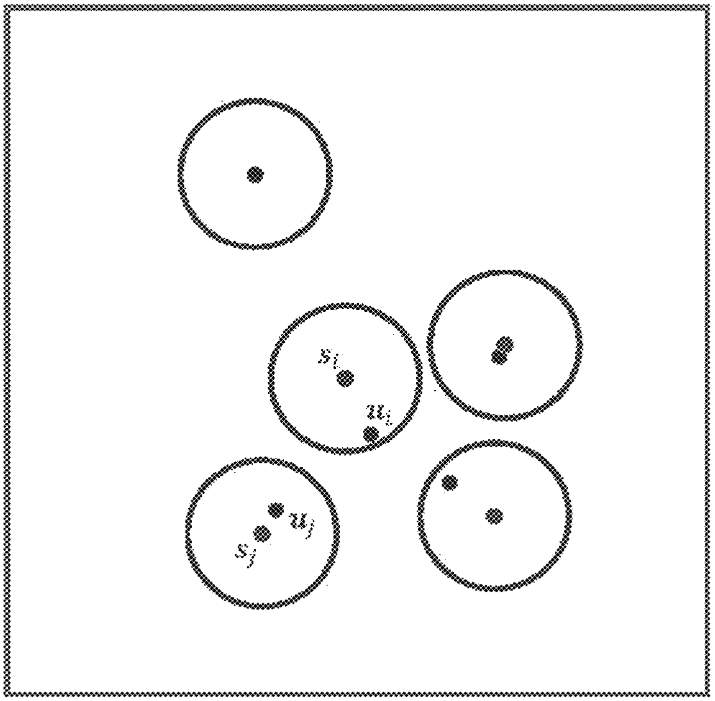

At initialization, the beam positions may correspond to the user positions (as shown for example in FIG. 17A)

$$s_i^{(0)} = u_i. \tag{50}$$

In one implementation, the virtual distancing technique (virtual distancing algorithm) may exploit analogies with molecular dynamics. In line with these analogies, beam and user positions may be considered as a system of particles. While beams are free to move, users remain fixed.

In this case, each of the aforementioned iterations at step S1610 may involve incrementally updating the intermediate beam pointing direction (current/temporary beam pointing direction)

$$s_i^{(n)}$$

such that the value of the cost function is optimized (e.g., minimized) under the constraint that a difference between the intermediate beam pointing direction $$s_i^{(n)}$$

and a direction pointing towards the at least one user terminal $u_i$ does not exceed a predefined maximum difference. Further in this case, the cost function may be designed to penalize closeness between the intermediate beam pointing direction $$s_i^{(n)}$$

and respective directions pointing towards the remaining user terminals $u_j$, j≠i, among the plurality of user terminals if differences between the intermediate beam pointing direction $$s_i^{(n)}$$

and the respective directions pointing towards the remaining user terminals $u_j$, j≠i, are less than a predefined threshold.

Further, for any of the remaining user terminals $u_j$, j≠i, the respective penalty may increase as the difference between the intermediate beam pointing direction $$s_i^{(n)}$$

and the direction pointing towards the respective user terminal among the remaining user terminals $u_j$, j≠i, decreases.

Figure 17B:
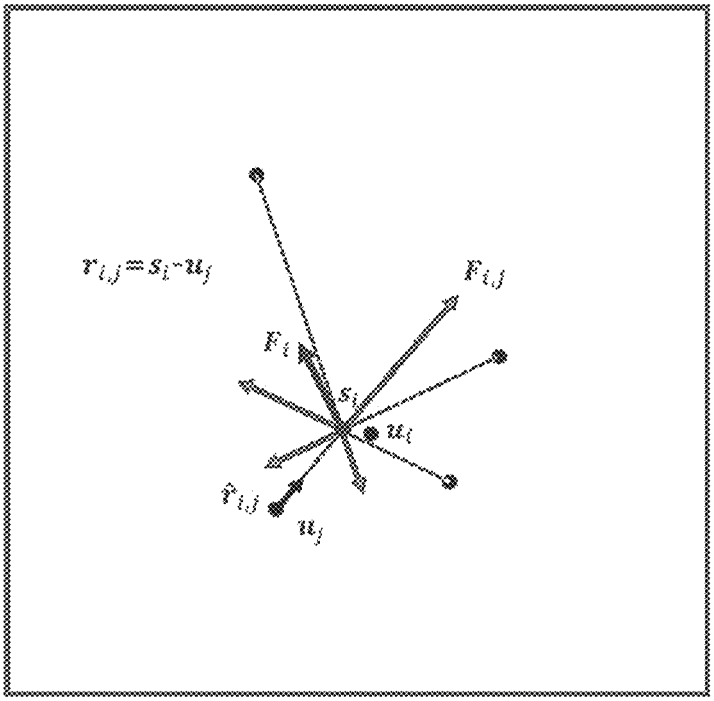

During optimization, the beam center $s_i$ (e.g., the intermediate beam pointing direction) moves according to repulsive forces between the beam center $s_i$ and the co-channel user positions $u_j$, j≠i[1] (as shown in FIG. 17B). The force on $s_i$ due to the interaction with $u_j$ is denoted by $F_{i,j}$. This force has a direction corresponding to the unit vector $\hat{r}_{i,j}$ and amplitude (magnitude) $F_{i,j}$, where $$r_{i,j} = s_i - u_j, \quad r_{i,j} = |r_{i,j}|, \quad \hat{r}_{i,j} = \frac{r_{i,j}}{r_{i,j}}. \tag{51}$$

Figure 18:
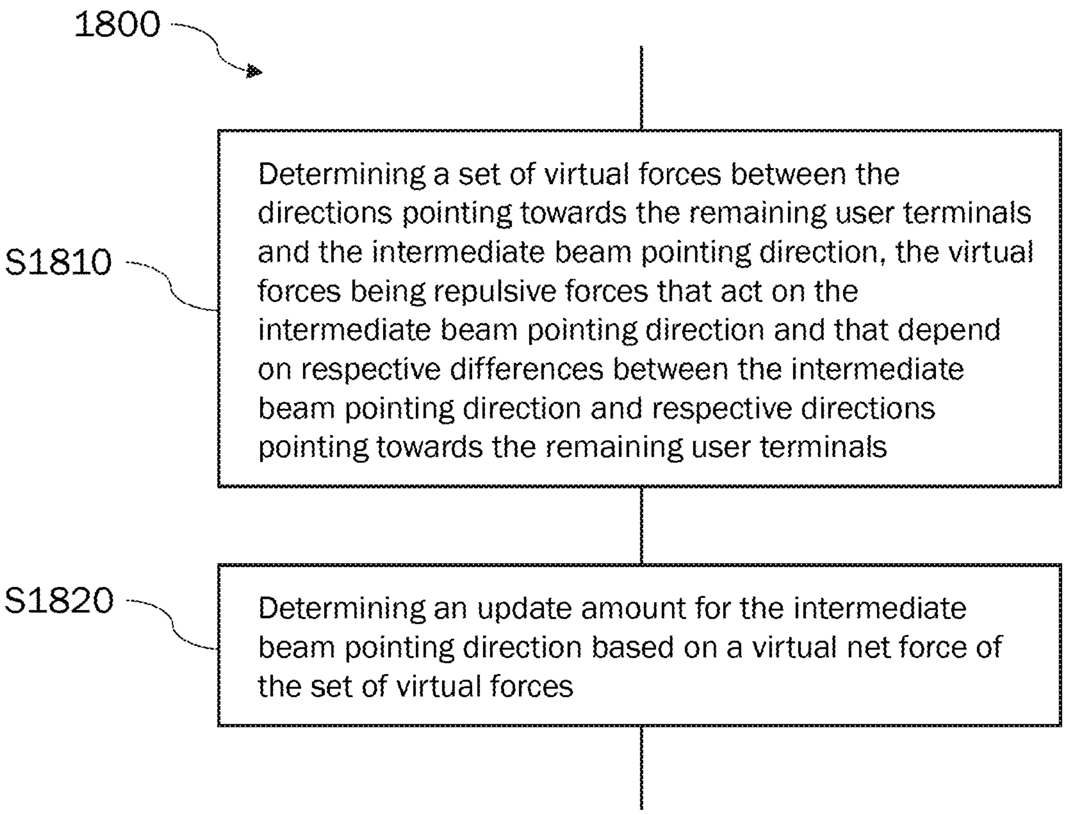
FIG. 18 is a flowchart illustrating an example implementation of a step in the method of FIG. 16, FIG. 19 and FIG. 20 schematically illustrate examples of initial and final beam positions, respectively, for a given user distribution when using the method of FIG. 16, FIG. 21 schematically illustrates examples of trajectories of beam pointing directions for the given user distribution when using the method of FIG. 16.

An example of a method 1800 that may be performed for each iteration at step S1610 is shown in the flowchart of FIG. 18. Method 1800 comprises steps S1810 and S1820.

[1]This had been $u_i$, i≠j in the IEEE draft. Please correct if necessary.

For example, optimization of the value of the cost function in each iteration at step S1610 may involve step S1810 of determining a set of (virtual) forces between the directions pointing towards the remaining user terminals $u_j$, j≠i, and the intermediate beam pointing direction $$s_i^{(n)}.$$

These (virtual) forces may be repulsive forces that act on the intermediate beam pointing direction $$s_i^{(n)}$$

and that depend on respective differences between the intermediate beam pointing direction $$s_i^{(n)}$$

and respective directions pointing towards the remaining user terminals $u_j$, j≠i.

The force magnitude of the (virtual) forces may be modelled, for example, accordingly to a (modified) Hooke's elastic law. To ensure a reasonable trade-off between the gain towards the user terminal $u_i$ to be served (which should be as large as possible) and the interferences caused for the remaining user terminals $u_j$, j≠i (which should be as small as possible), the (virtual) forces may have one or more of the following properties:

the virtual forces may be modeled to be zero if the respective differences between the intermediate beam pointing direction $$s_i^{(n)}$$

and respective directions pointing towards the remaining user terminals $u_j$, j≠i exceed the aforementioned predefined threshold (e.g., threshold distance $d_{min}$ mentioned below).

the virtual forces may be modeled to be discontinuous at the predefined threshold for respective differences between the intermediate beam pointing direction $$s_i^{(n)}$$

and respective directions pointing towards the remaining user terminals $u_j$, j≠i. That is, the virtual forces may be modeled to be strictly non-zero for distances smaller than the predefined threshold, i.e., $r_{i,j}<d_{min}$.

In one example, the force magnitude of the (virtual) forces may be modelled according to the following modified Hooke's elastic law $$F_{i,j} = \begin{cases} -\alpha(r_{i,j} - \beta d_{min}) & r_{i,j} \le d_{min} \\ 0 & r_{i,j} > d_{min} \end{cases}, \tag{52}$$

where $r_{i,j}$ is the Euclidean distance between two points in the u, v plane, $d_{min}$ is the target minimum separation between the beam and the users. It can be expressed, for example, as the product of a normalized minimum distance between users, $\rho_{min}$, times the approximated array beam-width $$\frac{\lambda}{D_A}$$

(as u, v diameter), $$d_{min} = \rho_{min}\frac{\lambda}{D_A}. \tag{53}$$

α is the spring constant. For the present purpose, it can be assumed to be unitary, α=1, for example $\beta d_{min}$ is the spring rest length. The constant β≥1 is introduced to have a non-negligible force for $r_{i,j}$ approaching $d_{min}$. The results described below have been obtained for the example value β=1.1

The elastic force of Eq. (52) is truncated to the repulsive side (i.e., $F_{i,j}\ge 0$ for $r_{i,j}\le d_{min}$) so that a beam at a distance greater than $d_{min}$ from a user is not subject to any force.

The total force $F_i$ acting on beam $s_i$ can be obtained by linear superposition of the individual interaction forces, $$F_i = \sum_{j\neq i} F_{i,j}. \tag{54}$$

In line with the above, optimization of the value of the cost function in each iteration at step S1610 thus may further involve step S1820 of determining an update amount for the intermediate beam pointing direction $$s_i^{(n)}$$

based on a (virtual) net force (e.g., net force $F_i$) of the set of virtual forces (e.g., forces $F_{i,j}$). Here, the update amount may indicate an update direction and an update magnitude. Said update amount may be determined by numeric integration, for example. The aforementioned constraint on minimum gain and/or maximum distance may be implemented by a hard cut-off for the update amount of the current beam pointing direction $$s_i^{(n)},$$

for example. As noted above, enforcing the hard cut-off may trigger the termination criterion. An example of a possible derivation of the update amount is presented next.

That is, the position at iteration n, $$s_i^{(n)}$$

may be updated by integration of the motion equation in the simplifying hypothesis of zero velocity (high viscosity condition), $$s_i^{(n+1)} = s_i^{(n)} + \gamma F_i^{(n)} = s_i^{(n)} + \Delta s_i^{(n)}, \tag{55}$$

where $$\Delta s_i^{(n)} = \gamma F_i^{(n)}$$

is an example of the update amount. From the mechanical point of view the constant γ covers the effects due to (virtual) particle mass and time interval (e.g., assumed time interval between one iteration and another in the moving particles analogy). For the present purpose, the constant γ can be used as a "dumping constant" that can be tuned and/or made adaptive to control the convergence of the optimization. In general, γ may be a positive constant (with appropriate units).

Once the position difference (displacement, or update amount)

$$\Delta s_i^{(n)}$$

has been derived, the maximum displacement condition (e.g., the aforementioned constraint) may be checked. If $$|s_i^{(n)} + \Delta s_i^{(n)} - u_i| > r_{max},$$

the displacement may be updated such that $$|s_i^{(n+1)} - u_i| > r_{max}.$$

Thereby, a hard cut-off on the position difference $$\Delta s_i^{(n)}$$

is enforced to satisfy the aforementioned constraint.

The algorithm may terminate for example when the position difference $$\Delta s_i^{(n)}$$

is below a defined tolerance. This may include the case that the position difference $$\Delta s_i^{(n)}$$

is reduced to meet the maximum displacement condition.

Figure 17C:
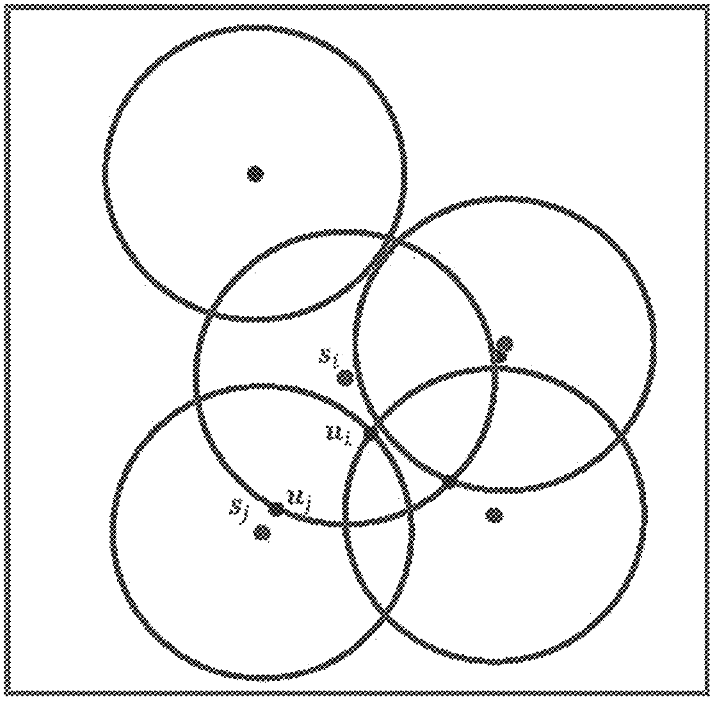
Figure 17D:
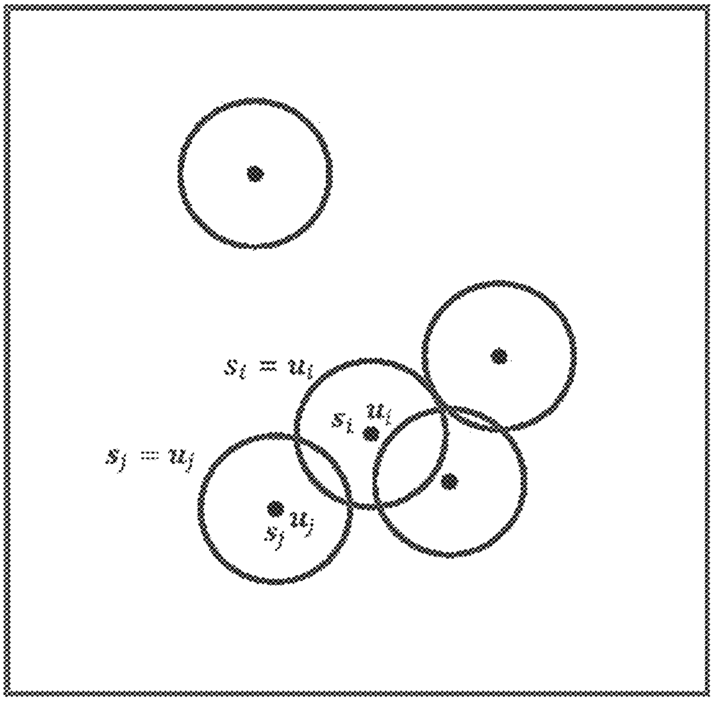

In general, the termination criterion for the algorithm (i.e., for the iterations that are performed for a given user terminal $u_i$ at step S1610) may relate to one or more of:

a total number of iterations for the user terminal $u_i$ a magnitude of an update amount $$\Delta s_i^{(n)}$$

of the intermediate beam pointing direction $$s_i^{(n)}$$

from one iteration to the next (e.g., from iteration n to iteration n+1)

differences between the intermediate beam pointing direction $$s_i^{(n)}$$

and respective directions pointing towards the remaining user terminals $u_j$, j≠i FIG. 17C shows how the VDI algorithm converges to beam positions that fulfill the distancing condition starting from the user positions of panel (a). An example of the final beam layout with representative beam-widths is depicted in FIG. 17D.

Figure 19:
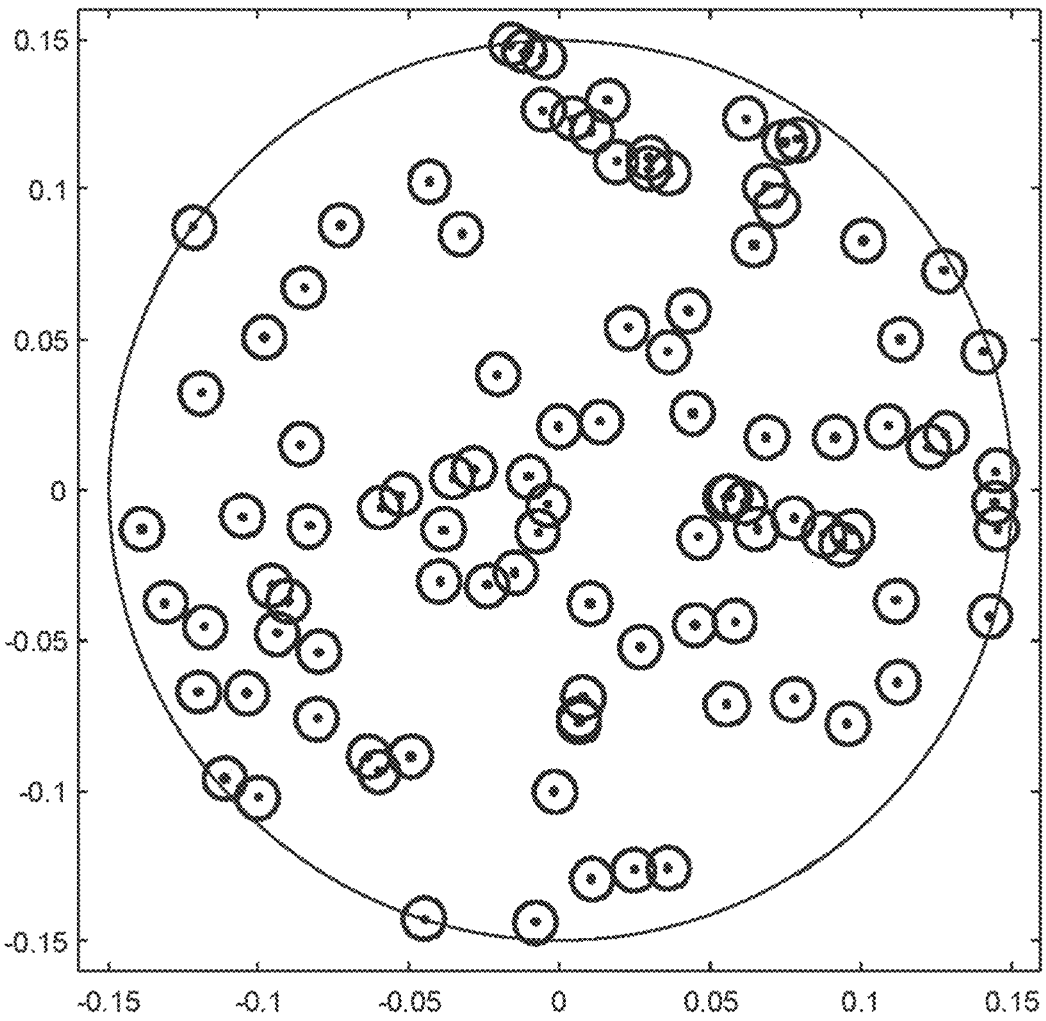
Figure 20:
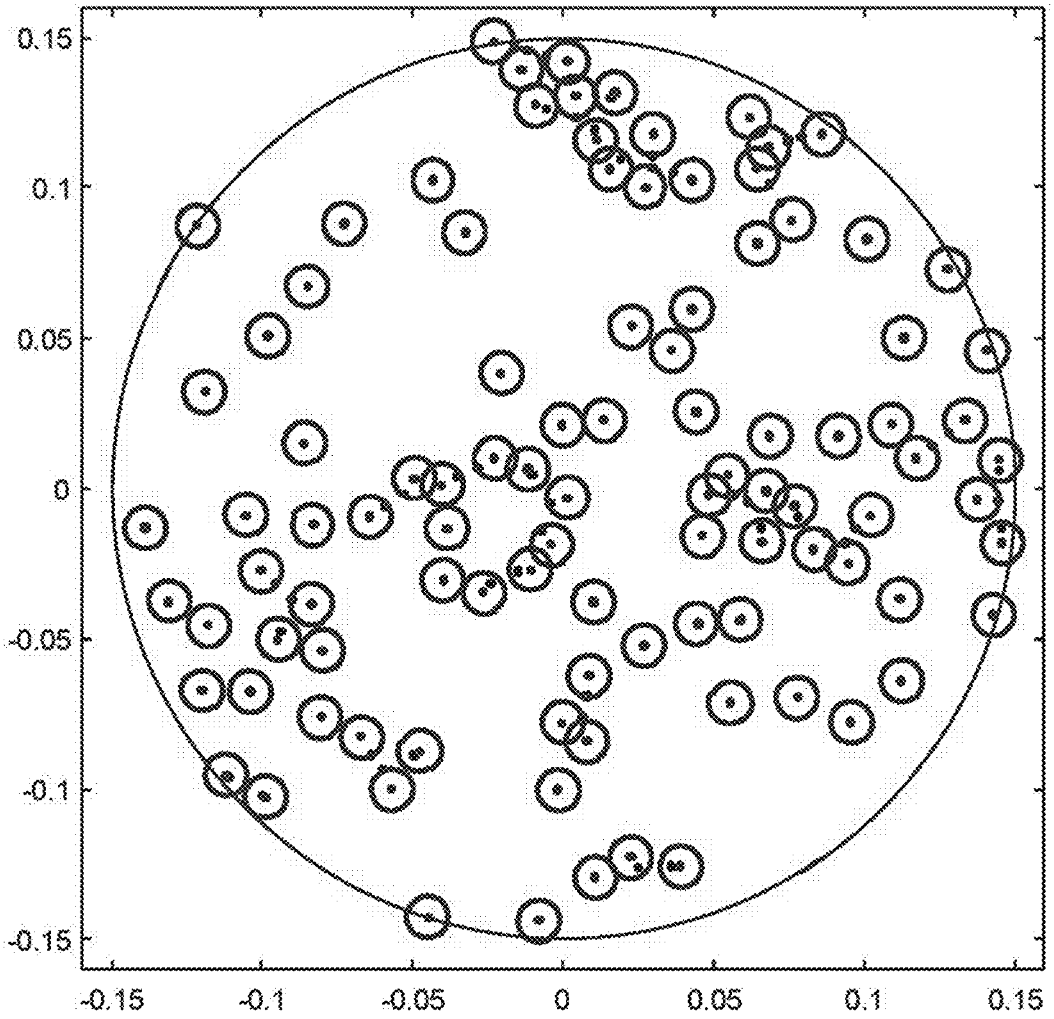
Figure 21:
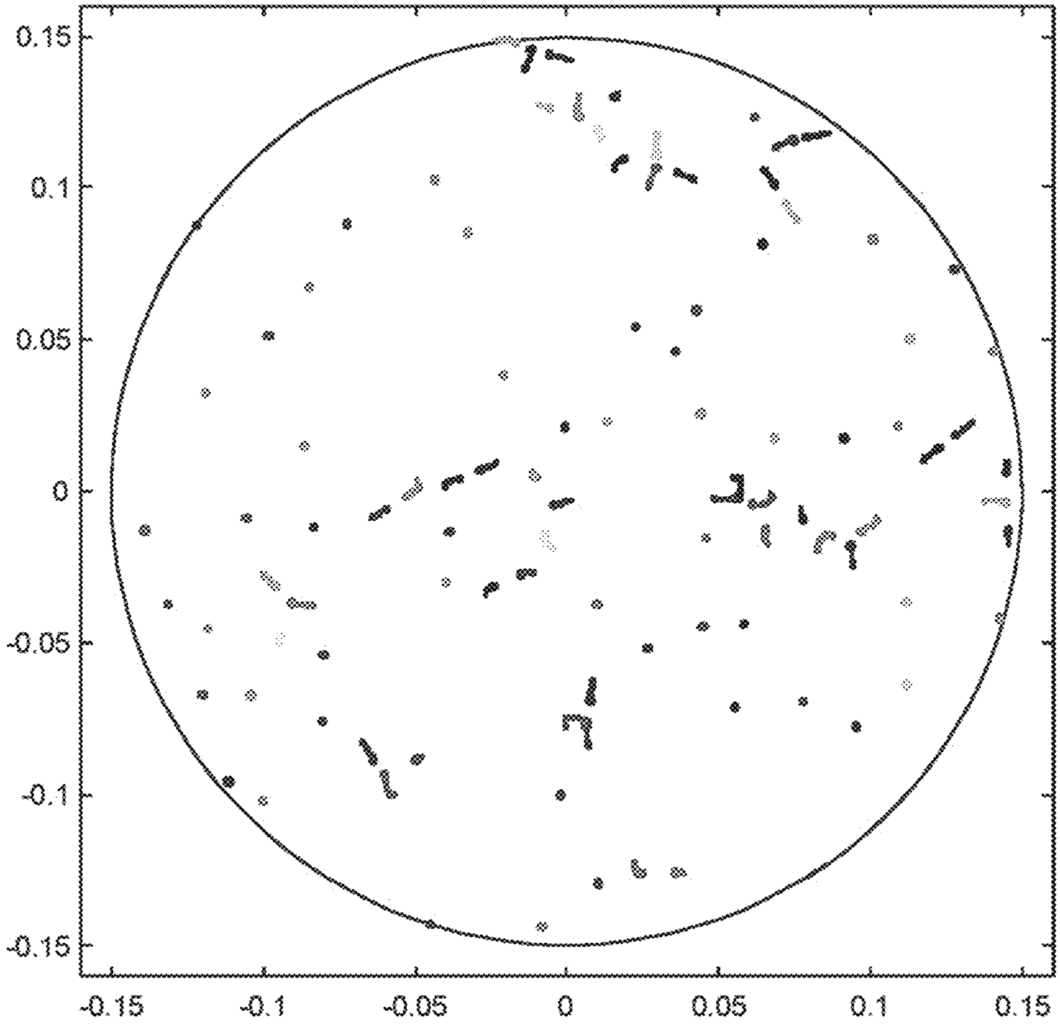

An example of pseudo-code for the VDI algorithm is described in Algorithm 3. Examples of simulation results are shown in FIG. 19, FIG. 20, and FIG. 21. Of these, FIG. 19 shows examples of maximum gain beams for a uniform distribution of users ($N_U$=100) on the visible earth as seen from a geostationary satellite with a square antenna of width $D_A$=1.2 m operating at 20 GHz. An example of the outcome of the VDI algorithm with the user distribution of FIG. 19 is illustrated in FIG. 20 for $\rho_{min}$=1.1 and $$r_{max} = \frac{1}{2\left(\frac{\lambda}{D_A}\right)}.$$

Examples of the trajectories of the beam positions during the optimization are illustrated in FIG. 21.

Algorithm 3
Algorithm 3 Virtual Distancing (VDI)

```
Inputs:
  u_j, User coordinates in u, v plane                         ▷ j = 1 ... N_U
  N_U, Number of users (i.e. in the color under analysis)
  i, index of the the moving beam
  d_min, target minimum distance between beam center and interfered users
  r_max, maximum distance between beam center to served user
  d_tol, Termination tolerance
  N_iter, Maximum number of iterations
  β, Constant to render the elastic force non-negligible close to rest
  (← 1.1)
Outputs:
  s_i, Beam center coordinates in u, v plane
Initialize:
s_i^(0) ← u_i
for n ← 1, N_iter do
  r_i,j = s_i^(n-1) − u_j, j = 1 ... N_U; j ≠ i          ▷ Determines user to beam vectors
  r_i,j ← |r_i,j|; i ≠ j                                 ▷ Determines user to beam distances
  if (r_i,j ≥ d_min, ∀j; i ≠ j) or (|Δs_i^(n-1)|) ≤ d_tol then
    s_i^(n) = s_i^(n-1)                                  ▷ s_i^(n-1) fulfills min distance or tolerance
      break                                              ▷ Exit the for loop
  end if
```

-continued

Algorithm 3
Algorithm 3 Virtual Distancing (VDI)

```
r̂_{i,j} ← r_{i,j}/r_{i,j} , i ≠ j                        ▷ Determines user to beam versors
F_{i,j} = −(r_{i,j} − βd_min) (r_{i,j} ≤ d_min), i ≠ j    ▷ (x ≤ y) is 1 if x ≤ y, 0 otherwise
F_i ← Σ_{j≠1} F_{i,j} r̂_{i,j}, i = 1 … N_U                 ▷ Total force evaluation
γ = 10(1 + n/N_iter)^−1                                    ▷ Empirical adaptive damping coefficient
Δs_i^(n−1) ← γF_i , i = 1 ... N_U                          ▷ Displacement
s_i^(n) ← s_i^(n−1) + Δs_i^(n−1)
if |s_i^(n) − u_i| > r_max then                            ▷ not fulfilling max displacement
  s_i^(n) ← r_max(s_i^(n) − u_i)/|s_i^(n) − u_i| + u_i     ▷ Back-projected on the constraint
  Δs_i^(n) ← s_i^(n) − s_i^(n−1)                           ▷ record deal Δ
end if
end for
s_i = s_i^(n)
```

Algorithm 4
Algorithm 4 Quantized Virtual Distancing (QVD)

```
Inputs:
  s_k, Beam lattice coordinates in u, v plane              ▷ k = 1 ... N_B
  u_k, Generic user j coordinates in u, v plane            ▷ j = 1 ... N_U
  N_U, Number of users (i.e. in the color under analysis)
  N_B, Number of beams in the MB fixed grid
  i, index of the the beam under optimization
  r_max, maximum distance between beam center to served user
Outputs:
  s_i, Beam center coordinates in u, v plane
for i ← 1, N_U do
Initialize:
  beam_idx ← find (|s_k − u_i| ≤ r_max)                    ▷ Find candidate beam centers
  beam_num ← length(beam_idx)                              ▷ Number of candidate
  for n ← 1, beam_num do
    sum_I(n, i) ← Σ_{j=1,j≠1}^{N_U} |g_A(u_j − s_beam_idx(n))|^2   ▷ Determines sum interference for user i
assigned to beam n
    C(n, i) ← |g_A(u_j − s_beam_idx(n))|^2                 ▷ Determines useful power for user j assigned to
beam n
    sum_I_over C(n, i) ← sum_I (n, i)/C(n, i)              ▷ Determines sum interference over useful
power for user i assigned to beam n
  end for
  [~, min_idx] ← min(sum_I_over_C(n, i)                    ▷ Find the index of the minimum
of sum_I_over_C(n, i)
  (s_i − s_beam_idx(min_idx))                              ▷ beam_idx(Min_idx) is the optimum beam index i to be
assigned to user i
end for
```

III.F.2 Quantized Virtual Distancing (QVD) Technique

Reference literature 1 describes a regular sampling of the zone of interest based on a lattice of beam positions. This technique, termed Switchable Fixed Multi-Beam architecture (MB in short), shows significant implementation complexity advantages. According to this technique, a bi-dimensional lattice of beam positions is defined by means of two basis vectors ($s_a$ and $s_b$). The set of all linear combinations of the basis vectors with integer coefficients defines the bidimensional lattice $\Lambda(S)$, where $$s_a = \begin{bmatrix} s_{au} \\ s_{av} \end{bmatrix}, \tag{56}$$

-continued $$s_b = \begin{bmatrix} s_{bu} \\ s_{bv} \end{bmatrix},$$

$$S = [s_a, s_b].$$

Theoretical and implementation aspects of the generation of a periodic lattice of beams from a planar array are addressed in P. Angeletti, Multiple Beams From Planar Arrays, IEEE Transactions on Antennas and Propagation, Vol. 62, No. 4, pp. 1750-1761 April 2014 (reference literature 2) and P. Angeletti, Reconfigurable Beam-Forming-Network Architecture, European Patent EP 2296225, filed 10 Sep. 2009, U.S. Pat. No. 8,451,172, filed 10 Sep. 2010 (reference literature 3).

Figure 23A:
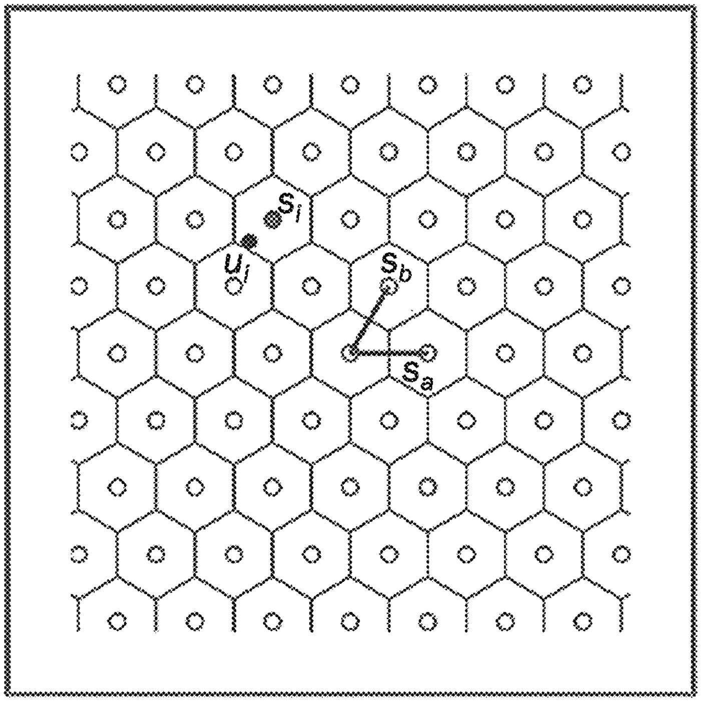

The beam-to-user assignment can be performed according to different criteria. If maximum gain is the selected criterion, the bi-dimensional quantizer is defined by the Voronoi partition of the space into non overlapping cells. An example of such beam-to-user assignment (i.e., maximum gain assignment) is schematically illustrated in FIG. 23A. The i-th user, with position $u_i$ is assigned to the closest beam position $s_i$ via $$s_i = \text{argmin}_k \|s_k - u_i\|^2. \tag{57}$$

Figure 23B:
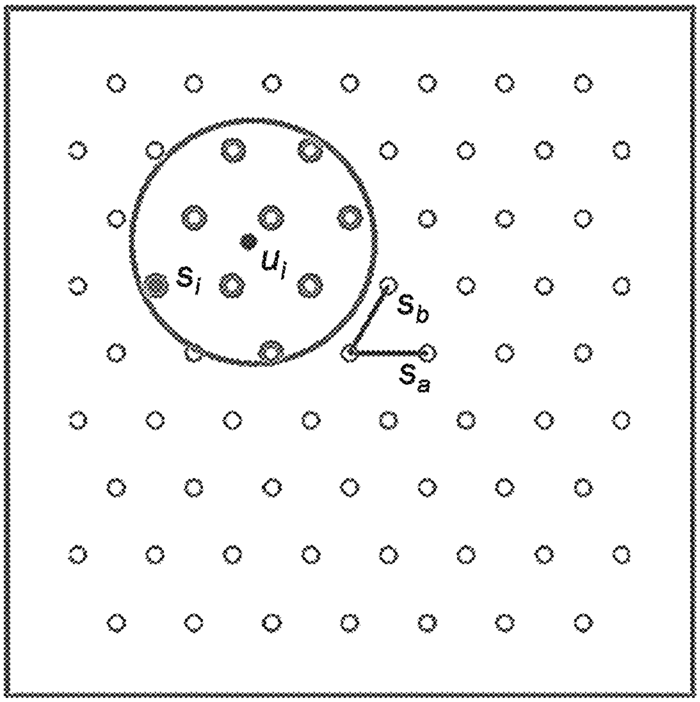

On the other hand, if sum-interference minimization is selected as the criterion for the beam-to-user assignment, based on the uplink interpretation, the selected optimal beam position $s_i$ on the discrete beam lattice Λ(S) should minimize the interference to co-channel users $u_j$, j≠i, while guaranteeing a limited gain loss impact for the served user $u_i$. An example of such minimum interference assignment is schematically illustrated in FIG. 23B.

Figure 22:
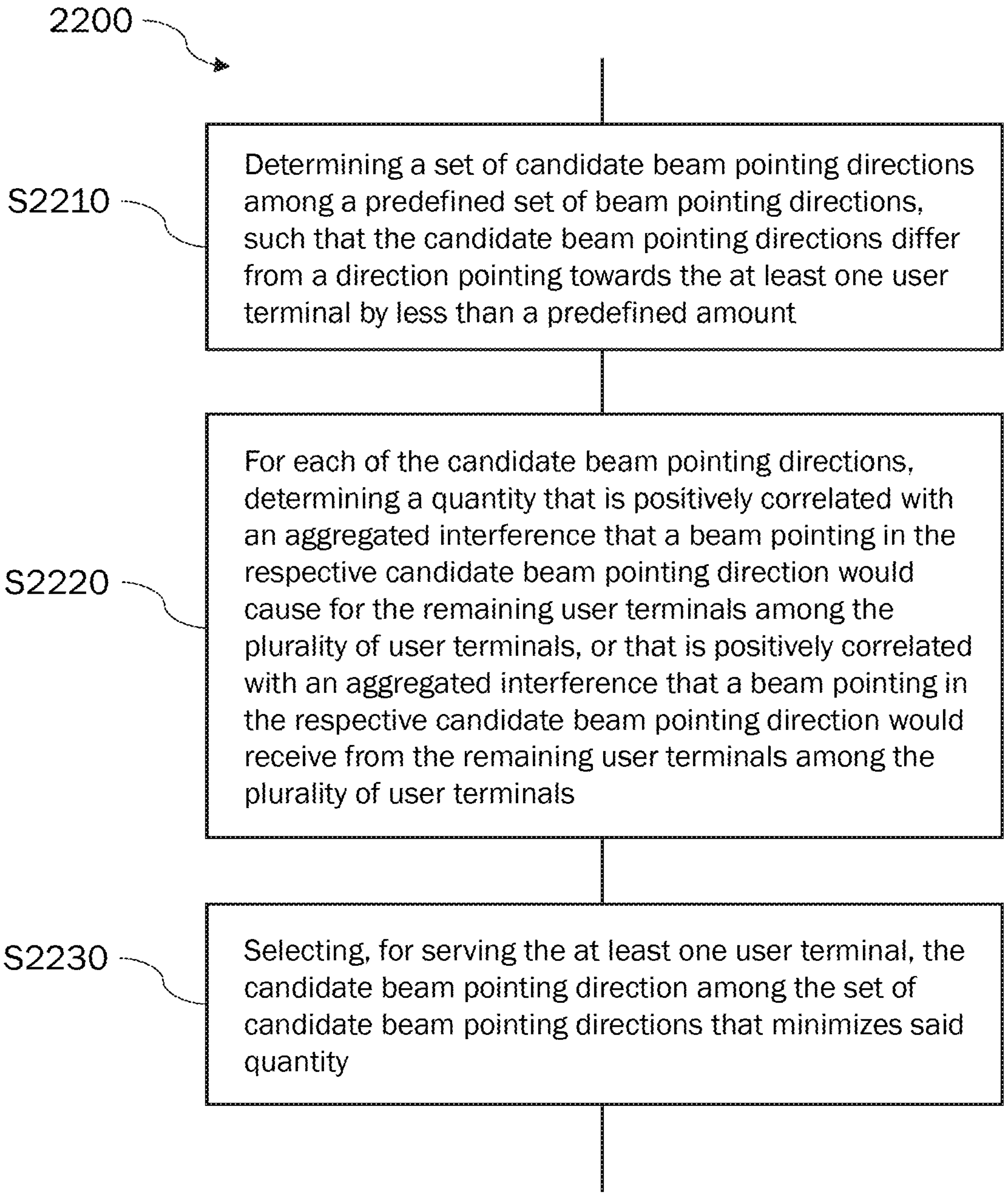
FIG. 22 is a flowchart illustrating an example of a method of determining beam pointing directions according to embodiments of the disclosure, FIGS. 23A and 23B schematically illustrate examples of maximum gain assignment and minimum interference assignment for a user and a given fixed beam pattern.

An example of a corresponding method 2200 of determining beam pointing directions for performing wireless communications between a hub station and a plurality of user terminals $u_k$ is schematically illustrated in the flowchart of FIG. 22. Method 2200 comprises steps S2210 to S2230 that may be performed for at least one user terminal $u_i$ to be served. For example, these steps may be performed for each of the plurality of user terminals. Here, the plurality of user terminals may relate to user terminals that are jointly served within a given radio resource block (e.g., color slice), i.e., they may correspond to co-channel users. Further, the user terminals may be located at (substantially) known locations.

At step S2210, a set of candidate beam pointing directions among a predefined set of beam pointing directions is determined. This is done in such matter that the candidate beam pointing directions differ from a direction pointing towards the at least one user terminal u; by less than a predefined amount (e.g., by less than $r_{max}$ introduced below). It is understood that the predefined set of beam pointing directions may correspond to a plurality of fixed beams, where each beam has a respective beam pointing direction and a respective beam center. Further, the beam centers of the plurality of fixed beams may be arranged at the vertices of a regular lattice (e.g., lattice Λ(S), or lattice $\Lambda(S_{MB})$ described below).

At step S2220, for each of the candidate beam pointing directions, a quantity is determined that is positively correlated with (e.g., proportional to) an aggregated interference that a beam pointing in the respective candidate beam pointing direction would cause for the remaining user terminals $u_j$, j≠i among the plurality of user terminals, or that is positively correlated with (e.g., proportional to) an aggregated interference that a beam pointing in the respective candidate beam pointing direction would receive from the remaining user terminals $u_j$, j≠i among the plurality of user terminals. The two above-mentioned alternatives for the determined quantity may relate to the hub station acting either as a transmit hub station or a receive hub station, respectively. In some implementations, the determined quantity for the given candidate beam pointing direction may be further inversely proportional to a gain, towards the at least one user terminal, of the beam pointing in the given candidate beam pointing direction. For example, the determined quantity may be the quantity defined in Eq. (58).

At step S2230, the candidate beam pointing direction among the set of candidate beam pointing directions that minimizes said quantity is selected for serving the at least one user terminal $u_i$.

Accordingly, in one example the quantity to be minimized is the interference to useful signal power ratio for user i that can be described by the following discrete optimization problem $$\text{minimize} \sum_{j=1, j\neq i}^{N_U} \frac{|g_A(u_j - s_i)|^2}{|g_A(u_i - s_i)|^2} \tag{58}$$

$$\text{subject to } s_i \in \Lambda(S), |s_i - u_i| \le r_{max}.$$

The maximum distance constraint $|s_i - u_i| \le r_{max}$ drastically limits the search space in Λ(S) to the lattice points within the circle of radius $r_{max}$ and center $u_i$. An example of this criterion is schematically illustrated in FIG. 23B, in which the thick-lines circles inside the circle centered on $u_i$ indicate candidate lattice points (candidate beam pointing directions). For such limited number of candidates, the evaluation of the array factor for all the co-channel user locations is of affordable computational complexity.

Similarly to the procedure described in reference literature 1, the lattice of beam positions can be generated, for example, according to a hexagonal lattice base matrix $S_{MB}$ where the beam-to-beam inter-distance is controlled by a normalized beam spacing $$S_{MB}^n$$

referred to the array normalized beam-width $$\frac{\lambda}{D_A},$$

$$S_{MB} = S_{MB}^n \frac{\lambda}{D_A} \begin{bmatrix} 1 & \frac{1}{2} \\ 0 & \frac{\sqrt{3}}{2} \end{bmatrix}. \tag{59}$$

The pre-defined set of beams centers $\{s_k\}$ can be evaluated as the intersection of lattice of points $\Lambda(S_{MB})$ and the ROI in the u,v plane. For example, if the ROI is the disk of radius $\sin[\vartheta_{max}(\alpha_{min})]$, the set of beams centers is given by $$\{s_k\} = \Lambda(S_{MB}) \cap \{|u| \le \sin[\vartheta_{max}(\alpha_{min})]\}. \tag{60}$$

For the i-th user the candidate beams (candidate beam pointing directions) can be found in the subset of $\{s_k\}$ as those beams that (additionally) fulfill the maximum distance constraint $\{|s_k - u_i| \le r_{max}\}$. For each of these candidate beam centers the sum-interference can be evaluated and the minimum of the resulting sum-interferences can be found. An example of pseudocode of the resulting Quantized Virtual Distancing (QVD) technique is described in Algorithm 4.

In the above, the plurality of fixed beams may have a normalized beam spacing $$S_{MB}^{n}$$

between adjacent beams that is smaller than 1, for example.

Figure 24:
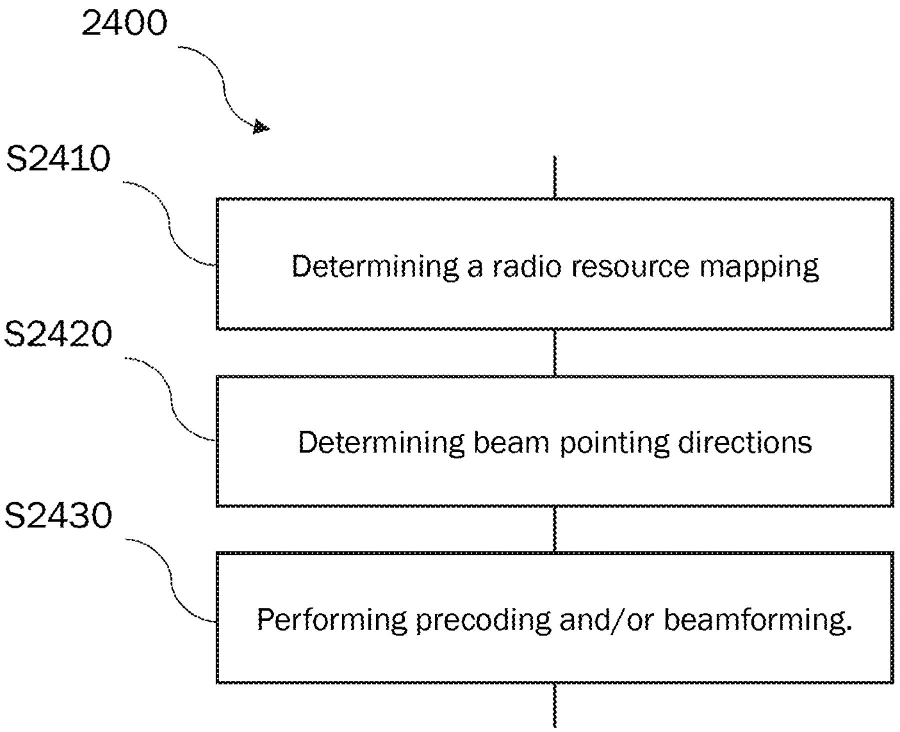
FIG. 24 is a flowchart illustrating an example of a method of performing wireless communication using concepts according to the present disclosure, FIGS. 25A and 25B include two graphs schematically illustrating examples of spectral efficiency achievable according to embodiments of the present disclosure.

Finally, FIG. 24 shows an example of a method 2400 of performing wireless communications between a hub station and a plurality of user terminals. Method 2400 may comprise any one, any two, or all three of steps S2410, S2420, and S2430.

Therein, step S2410 is a step of determining a radio resource mapping according to the techniques described above (e.g., according to methods 700 and/or 800).

Step S2420 is a step of determining beam pointing directions according to the techniques described above (e.g., according to methods 1600 and/or 1800, or method 2200).

Step S2430 is a step of precoding and/or beamforming.

IV. SYSTEM LEVEL PERFORMANCE RESULTS

IV.A. Simulator Description

To analyze the performance of the proposed H-RRM algorithm(s) in a multibeam satellite system context, the M-MIMO satellite multibeam simulator described in reference literature 1 has been evolved to include the required additional functionalities. More specifically. the following features have been introduced:

- TDM frames in the physical layer (notably, in the following the term frame instead of RRM color slice will be used, since according to the physical layer description of Section II.B. color slices are represented by physical layer frames).
- H-RRM algorithms replacing the PDP minimum distance optimum approach.
- Non-uniform traffic generation (as per Section II.C.) in addition to PPP (as per Appendix A), as input to the heuristic MIQP RRM algorithm.

As described above in Section III, the present disclosure does not assume a fixed number of users allocated to each slice $N_U$ anymore, as this parameter fluctuates depending on the specific non uniform traffic realization and consequent RRM users allocation per frame. In the following, the average number of users per frame will be indicated by $\overline{N}_U$.

Although the simulator supports all the H-RRM algorithms (including the virtual distancing algorithms) described above, VDI results will not be reported here as the respective performance was found to be similar or worse than that of QVD, which is simpler to implement in a practical satellite payload.

IV.B. System Level Assumptions

In line with reference literature 1, a Geostationary Satellite (GSO) configuration with the key system parameters reported in Table 3 is assumed for deriving numerical results.

It shall be underlined that except for Section IV.C., all simulation results for Matched Filter (MF) and Minimum Mean Square Error (MMSE) pre-coded M-MIMO also exploit the proposed H-RRM techniques. As a consequence, the throughput performance comparison results refer to the ideal precoded M-MIMO versus non precoded pragmatic Multi Beam (MB) M-MIMO with H-RRM.

IV.C. Results for Array of Size 1.2 m

IV.C.1 Heuristic RRM Versus MIQP RRM

Figure 25A:
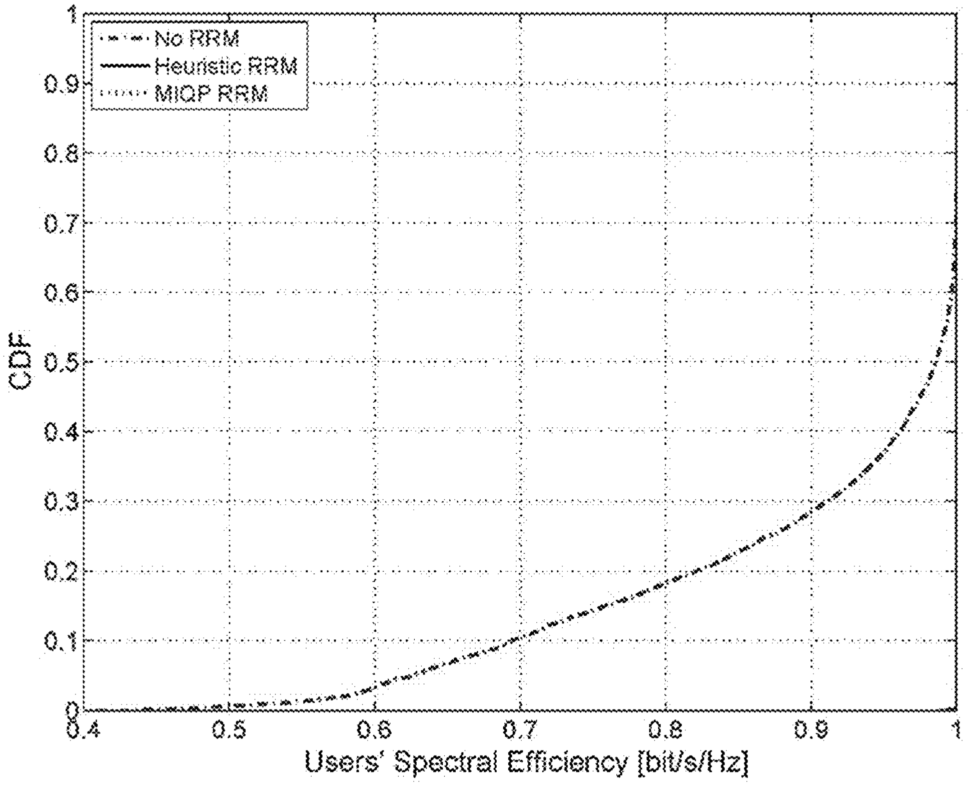
Figure 25B:
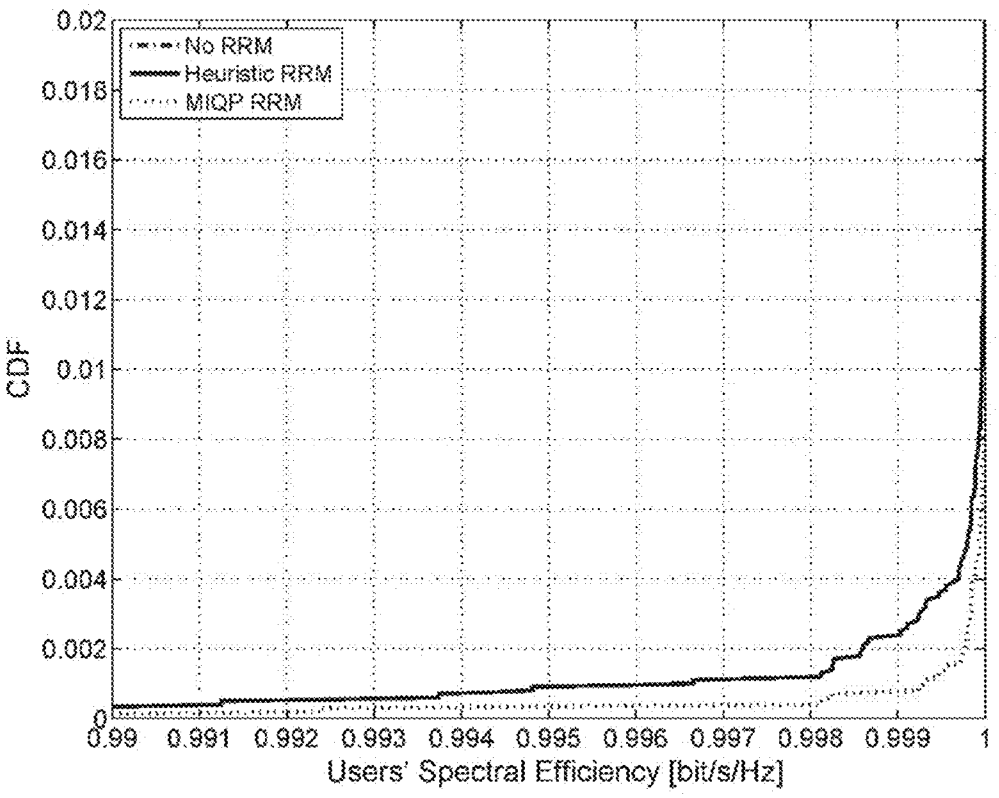

As noted above, the MIQP RRM implementation has high complexity and hence only limited practical use. However, to show the performance of the proposed H-RRM approach a small scale simulation with N=100 users has been run on the system model described above, with an array size $D_A$=1.2 m. For the MIQP implementation a Gurobi optimizer has been used. The users' spectral efficiency CDF simulation results assuming Shannon physical layer performance are shown in FIGS. 25a and 25b (N=100, C=4, $D_A$=1.2 m, f=20 GHz), comparing spectral efficiency without RRM, spectral efficiency with H-RRM, and spectral efficiency with MIQP RRM. FIG. 25A shows the wide performance difference between not using RRM and the almost identical spectral efficiency obtained exploiting MIQP and H-RRM. The negligible MIQP performance advantage can be observed in the zoomed version of the same plot shown in FIG. 25B. In the following, only H-RRM solutions will be considered, as the MIQP computational complexity does not allow for simulations of large numbers of users.

TABLE 3

| Simulation system parameters | | | |
|---|---|---|---|
| Parameter | Symbol | Value | Unit |
| Number of Monte Carlo Trials | $N_{trials}$ | 5-10 | |
| Carrier frequency | $f_0$ | 20.0 | GHz |
| User baud rate | $R_s$ | 500.00 | Msymb/s |
| Total payload RF power per carrier | $P_T^c$ | 1.0-2.0 | kW |
| Minimum ACM physical layer SNIR | $SNIR_{min}$ | −10.00 | dB |
| User minimum spacing coefficient | | 1.0 | |
| Minimum satellite elevation angle | $a_{min}$ | 5.00 | degrees |
| Array size | $D_A$ | 1.2-2.0 | m |
| Array element aperture efficiency | $\eta_E$ | −1 | dB |
| Array elements normalized spacing | $d_A/\lambda$ | 1.4-2.6 | |
| MB normalized beam spacing | $S_{MB}^n$ | 0.2 | |
| Number of array elements | $N_T$ | 1156-3136 | |
| Number of feeds/users ratio | $N_T/\overline{N}_U$ | 2-28 | |
| Aver. No. of simultaneous active users | $\overline{N}_U$ | 42-578 | |
| Normalized MD-MIQP RRM minimum distance | $\rho_{min}$ | 1.0 | |
| Earth radius | $R_E$ | 6378 | km |
| Orbit height | $h_S$ | 35780 | km |
| User terminal antenna gain | $G_R^U$ | 41.45 | dBi |
| User terminal antenna noise temperature | $T_R^U$ | 224.5 | K |

IV.C.2 Impact of Monte Carlo Randomization

As explained in reference literature 1 a certain number of Monte Carlo traffic generation trials $N_{trials}$ are required to achieve meaningful performance results. It has been found experimentally that five trials may be sufficient for achieving good throughput accuracy. As an example, for case 2f of Table 1, the MB throughput for $N_{trials}$=5 amounts to 138.85 Gbps. By increasing $N_{trials}$ to 10 the simulated throughput changes to 138.91 Gbps, showing a negligible impact of the change of $N_{trials}$ from five to ten on the result. When reducing the number of trials to one, the simulated throughput of 138.17 Gbps is still similar. These results have been confirmed for other traffic configurations showing a very small impact on the number of trials on the overall throughput estimation. For this reason, unless stated otherwise, $N_{trials}$=5 has been adopted for the following simulations.

IV.C.3 Impact of the Number of TDM Frames

Figure 26:
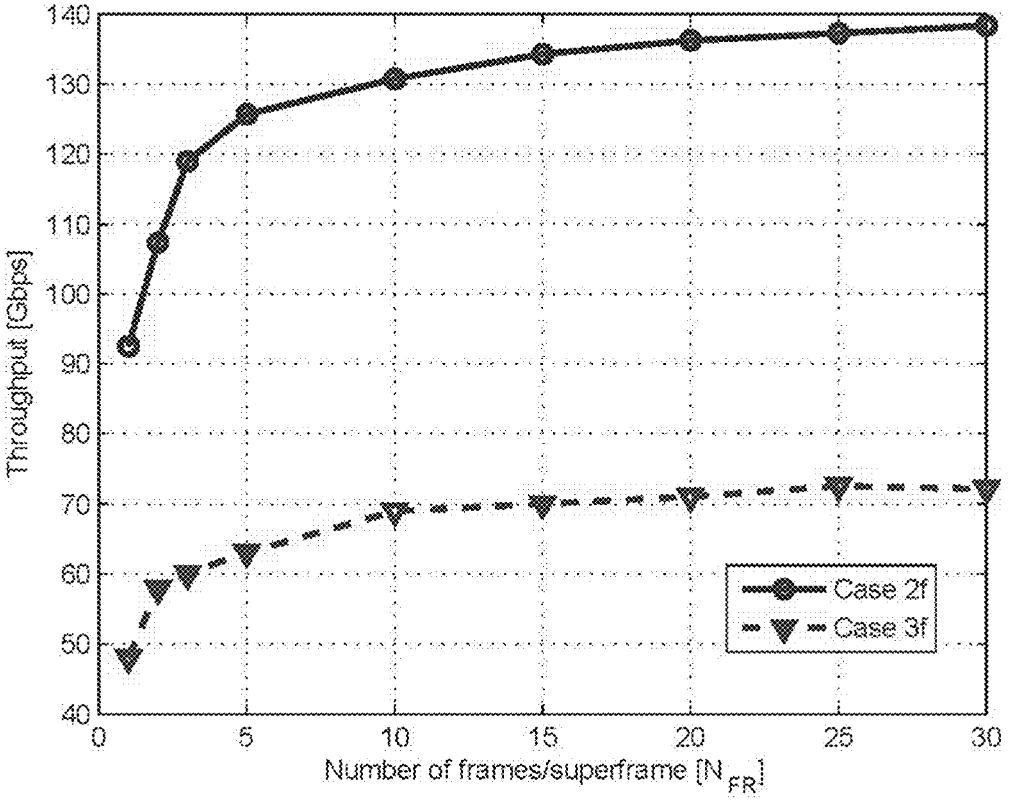
FIG. 26 is a graph schematically illustrating an example of Shannon multibeam throughput achievable according to embodiments of the present disclosure.

As explained in Section II.B, the number of frames within the superframe allows to reorganize the users served at a given time to approximate the MIQP distance distribution. The MIQP algorithm represents a lower bound to the optimum PDP minimum distance users' distribution used in reference literature 1. Intuitively, the greater the number of frames $N_{FR}$, the easier the H-RRM algorithm task will be. However, by increasing $N_{FR}$, the superframe duration, and hence the system latency, is increased. FIG. 26 shows the simulated Shannon MB throughput as a function of the number of frames for traffic cases 2f and 3f of Table 1 and 1.2 m DRA size. In the simulations the optimized $$\frac{N_T}{\overline{N}_U}$$

value given in Table 4 has been used. It can be seen that the throughput dependency on $N_{FR}$ rapidly decays, reaching an almost asymptotic performance for $N_{FR}$>20. This is a good result as it shows that the RRM performance is not very sensitive to the number of frames, so that the system latency can be easily contained. Unless stated otherwise, $N_{FR}$=30 has been adopted for the following simulations. This provides almost asymptotic throughput performance with an acceptable superframe duration. For this number of frames, the throughput variation across the different frames for traffic case 2f was assessed to be less than 1%.

IV.C.4 Impact of the Number of Users Served Per Slice

Figure 27:
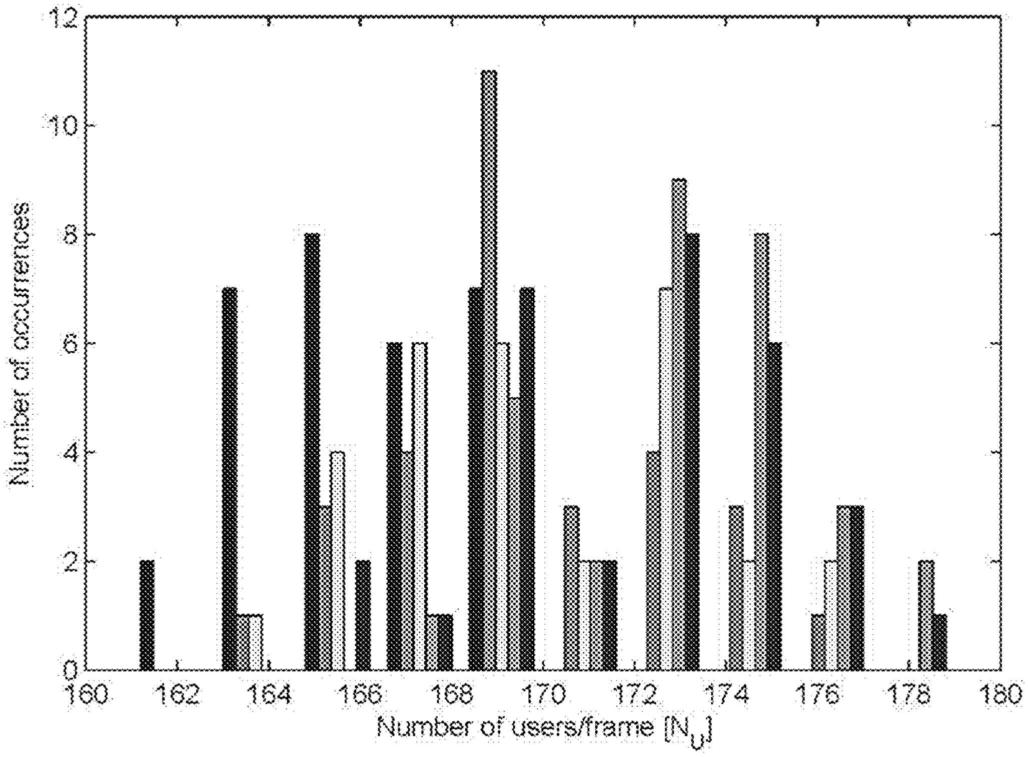
FIG. 27 is a histogram schematically illustrating examples of simulated numbers of users $N_U$ per frame for realizations of the second example case, according to embodiments of the present disclosure.

As explained in Section III, the proposed H-RRM algorithms divide the users to be served among the different frames (or correspondingly, slices) composing the superframe, selecting for each frame a subset of users which can be mapped to beams maintaining a certain level of interference isolation from/to the other active beams. The number of active beams per frame allocated by the H-RRM algorithms is a random variable with an optimum average value $\overline{N}_U$, which depends on the traffic distribution parameters. To exemplify the randomness of the number of users $N_U$ allocated to each frame by the H-RRM algorithm, FIG. 27 illustrates the simulation result for five distinct realization of traffic case 2f for $D_A$=1.2 m. Each trial histogram has a different shade to ease analysis. It is apparent that the H-RRM algorithm allocates a slightly variable number of users per frame (e.g., ±5%) around the average value $\overline{N}_U$.

The most important parameters affecting the $\overline{N}_U$ value are the number of antenna array elements $N_T$ and the traffic over overall potential satellite coverage area $$\frac{S_T}{S_A}$$

ratio. As will be shown in Section IV.C.5, it has been found experimentally that once the $$\frac{N_T}{\overline{N}_U}$$

ratio has been derived for configuration 'a', its value can be extrapolated to another traffic case 'x' by simply scaling it up with the ratio of traffic areas ratio $$\frac{S_T^x}{S_T^a}.$$

Figure 28:
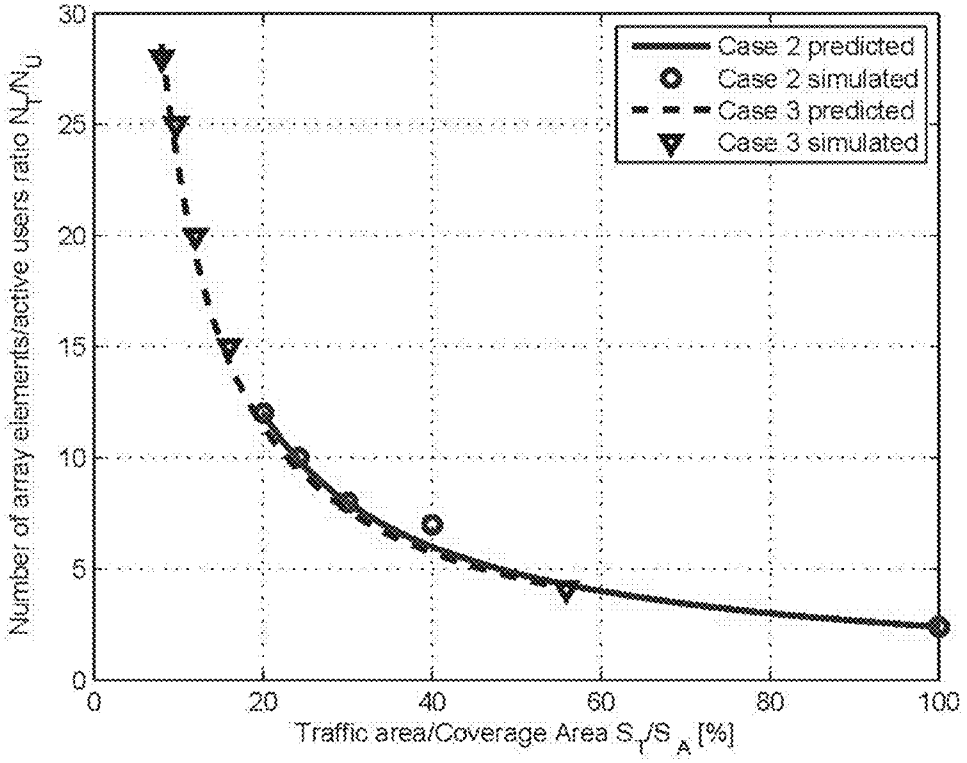
FIG. 28 is a graph schematically illustrating examples of simulated and predicted ratios $$\frac{N_T}{\overline{N}_U}$$

This is shown in FIG. 28, which illustrates the simulated vs predicted $$\frac{N_T}{\overline{N}_U}$$

as function of the traffic area tor cases 2 and 3, for $D_A$=1.2 m. This approach has been used to derive the optimum $$\frac{N_T}{\overline{N}_U}$$

ratios in Table 4 and Table 5 below.

TABLE 4

Shannon throughput results for traffic cases 0 to 3 with H-RRM, $D_A$ = 1. 2 m, uneven traffic spot distribution for cases 2 to 3, $N_{FR}$ = 30

| Case | Predicted $\left[\frac{N_T}{\overline{N}_U}\right]_{opt}$ | Simulated $\left[\frac{N_T}{\overline{N}_U}\right]_{opt}$ | Shannon Throughout (Gbps) /Δvs QVD % MF | MB | QVD | MMSE |
|---|---|---|---|---|---|---|
| 0 | NA | 2.0 | 3.71E+02<br>+2.3 | 3.62E+02<br>−0.2 | 3.62E+02<br>0.0 | 3.84E+02<br>+5.9 |
| 1 | NA | 2.2 | 3.22E+02<br>+1.0 | 3.15E+02<br>−1.0 | 3.19E+02<br>0.0 | 3.47E+02<br>+8.8 |
| 2a | 2.4 | 2.4 | 2.24E+02<br>+2.8 | 2.20E+02<br>+1.0 | 2.18E+02<br>0.0 | 2.36E+02<br>+8.1 |
| 2b | 2.4 | 2.4 | 2.34E+02<br>+2.7 | 2.30E+02<br>+0.9 | 2.28E+02<br>0.0 | 2.47E+02<br>+8.1 |
| 2c | 9.9 | 10.0 | 1.23E+02<br>−2.5 | 1.21E+02<br>−4.2 | 1.26E+02<br>0.0 | 1.41E+02<br>+11.7 |
| 2d | 12.0 | 12.0 | 1.01E+02<br>−1.8 | 9.97E+01<br>−3.5 | 1.03E+02<br>0.0 | 1.16E+02<br>+12.4 |
| 2e | 8.0 | 8.0 | 1.26E+02<br>−0.1 | 1.24E+02<br>−1.9 | 1.26E+02<br>0.0 | 1.42E+02<br>+12.7 |
| 2f | 6.0 | 7.0 | 1.41E+02<br>+0.2 | 1.39E+02<br>−1.6 | 1.41E+02<br>0.0 | 1.58E+02<br>+12.3 |
| 3a | 4.1 | 4.1 | 1.98E+02<br>+0.9 | 1.95E+02<br>−0.9 | 1.96E+02<br>0.0 | 2.16E+02<br>+9.8 |

TABLE 4-continued

Shannon throughput results for traffic cases 0 to 3 with H-RRM, $D_A$ = 1. 2 m, uneven traffic spot distribution for cases 2 to 3, $N_{FR}$ = 30

| Case | Predicted $\left[\frac{N_T}{N_U}\right]_{opt}$ | Simulated $\left[\frac{N_T}{N_U}\right]_{opt}$ | Shannon Throughout (Gbps) /Δvs QVD % MF | MB | QVD | MMSE |
|---|---|---|---|---|---|---|
| 3b | 4.1 | 2.4 | 2.11E+02 | 2.07E+02 | 2.11E+02 | 2.32E+02 |
| | | | 0.0 | −1.8 | 0.0 | +10.0 |
| 3c | 23.7 | 22.0 | 6.04E+01 | 5.93E+01 | 6.34E+01 | 7.00E+01 |
| | | | −4.9 | −6.5 | 0.0 | +10.4 |
| 3d | 28.6 | 28.0 | 4.79E+01 | 4.72E+01 | 4.99E+01 | 5.57E+01 |
| | | | −3.9 | −5.4 | 0.0 | +11.5 |
| 3e | 19.1 | 20.0 | 6.21E+01 | 6.12E+01 | 6.38E+01 | 7.14E+01 |
| | | | −2.6 | −4.1 | 0.0 | +11.9 |
| 3f | 14.3 | 15.0 | 7.37E+01 | 7.25E+01 | 7.45E+01 | 8.35E+01 |
| | | | −1.0 | −2.6 | 0.0 | +12.1 |

TABLE 5

Shannon throughput results for traffic cases 0 to 3 with H-RRM, $D_A$ = 1. 2 m, even traffic spot distribution for cases 2 to 3, $N_{FR}$ = 30

| Case | Predicted $\left[\frac{N_T}{N_U}\right]_{opt}$ | Simulated $\left[\frac{N_T}{N_U}\right]_{opt}$ | Shannon Throughout (Gbps) /Δ vs QVD % MF | MB | QVD | MMSE |
|---|---|---|---|---|---|---|
| 0 | NA | 2.0 | 3.71E+02 | 3.62E+02 | 3.62E+02 | 3.84E+02 |
| | | | +2.3 | −0.2 | 0.0 | +5.9 |
| 1 | NA | 2.2 | 3.22E+02 | 3.15E+02 | 3.19E+02 | 3.47E+02 |
| | | | +1.0 | −1.0 | 0.0 | +8.8 |
| 2a | 2.4 | 2.4 | 2.40E+02 | 2.36E+02 | 2.35E+02 | 2.54E+02 |
| | | | +2.4 | +0.6 | 0.0 | +8.1 |
| 2b | 2.4 | 2.0 | 2.50E+02 | 2.46E+02 | 2.44E+02 | 2.63E+02 |
| | | | +2.5 | +0.6 | 0.0 | +7.7 |
| 2c | 9.9 | 10.0 | 1.36E+02 | 1.34E+02 | 1.42E+02 | 1.58E+02 |
| | | | −3.9 | −5.7 | 0.0 | +11.5 |
| 2d | 12.0 | 12.0 | 1.11E+02 | 1.09E+02 | 1.15E+02 | 1.28E+02 |
| | | | −3.5 | −5.2 | 0.0 | +11.6 |
| 2e | 8.0 | 9.0 | 1.35E+02 | 1.33E+02 | 1.39E+02 | 1.56E+02 |
| | | | −2.3 | −4.0 | 0.0 | +12.3 |
| 2f | 6.0 | 7.0 | 1.53E+02 | 1.50E+02 | 1.54E+02 | 1.73E+02 |
| | | | −1.0 | −1.6 | 0.0 | +12.3 |
| 3a | 4.1 | 4.1 | 2.06E+02 | 2.02E+02 | 2.05E+02 | 2.24E+02 |
| | | | +0.7 | −1.2 | 0.0 | +9.6 |
| 3b | 4.1 | 4.1 | 2.27E+02 | 2.23E+02 | 2.29E+02 | 2.52E+02 |
| | | | −0.8 | −2.8 | 0.0 | +10.1 |
| 3c | 23.7 | 25.0 | 6.47E+01 | 6.35E+01 | 6.97E+01 | 7.66E+01 |
| | | | −7.2 | −8.8 | 0.0 | +10.0 |
| 3d | 28.6 | 32.0 | 5.11E+01 | 5.01E+01 | 5.45E+01 | 6.03E+01 |
| | | | −6.3 | −8.1 | 0.0 | +10.7 |
| 3e | 19.1 | 24.0 | 6.57E+01 | 6.45E+01 | 6.87E+01 | 7.67E+01 |
| | | | −4.4 | −6.1 | 0.0 | +11.6 |
| 3f | 14.3 | 18.0 | 7.61E+01 | 7.47E+01 | 7.85E+01 | 8.81E+01 |
| | | | −3.1 | −4.9 | 0.0 | +12.1 |

IV.C.5 Impact of Non-Uniform Traffic Cases

Table 4 and Table 5 summarize the Shannon throughput simulation results for the various traffic configurations described in Section II.C. For each traffic configuration, several simulations have been run to find the value of $$\frac{N_T}{N_U}$$

that optimizes the throughput. It can be noted that the predicted value for $$\left[\frac{N_T}{N_U}\right]_{opt}$$

following the approach described in Section IV.C.4 provides satisfactory results at least for the cases reported in Table 4.

Concerning the throughput performance for the various M-MIMO schemes with H-RRM it is noted that for case 1 (full visible Earth uniform traffic distribution or PPP Distribution) the proposed H-RRM QVD approach is by 13.8% lower than for case 0 corresponding to the optimum RRM based on the ideal, yet unfeasible, minimum distance guaranteed PDP distribution.

It is worth noting that QVD throughput is generally better than MB, but also better that MF in several cases. The exceptions are represented by cases 2a, 2b (MF and MB), and 3a (MF only). Based on these findings, use of the QVD RRM algorithm is recommended with a performance advantage as high as 9%. The best performance can be obtained for the case of even spots traffic probability reported in Table 5. However, the throughput difference between uneven and even spot traffic probabilities is limited to about 10%, which is considered negligible. This finding demonstrates the H-RRM robustness to the variation of traffic distribution. This is also confirmed by the limited difference in throughput between cases 2a vs 2b and 3a vs 3b. For the "b" cases, $\sigma_{XX}$ is four times larger than for the "a" cases, causing the traffic PDF to appear much flatter. This can be seen also from FIGS. 3A to FIG. 6F. Nevertheless, the throughput reduction between the "a" and "b" cases is less than 7%.

The results for ideal MMSE M-MIMO, represents a performance upper bound, are included as well. The MMSE throughput performance advantage is spanning from 7% to 12% depending on the specific case. It is clear that even disregarding its implementation complexity, the MMSE performance in practice will be well below the reported values due to practical implementation aspects extensively discussed in reference literature 1.

It should also be noted that all simulations have been performed with constant RF power. Hence, when the traffic area $S_T$ reduces, the on-ground received power flux density increases accordingly. This means that the system becomes more interference limited, hence the MMSE potential advantage slightly increases, as is confirmed by the simulation results in Section IV.C.7. FIG. 29 illustrates the simulated Shannon QVD throughput versus the traffic area/coverage area ratio for cases 2 and 3, even and uneven spot traffic probabilities, for $D_A$=1.2 m. The almost proportional dependency of throughput on the $$\frac{s_T}{s_A}$$

ratio is apparent, although the slope is more pronounced for case 3 than for case 2. It is evident that there is limited throughput difference between the cases of even and uneven spot traffic probabilities, which are quite different in terms of traffic density (see FIGS. 3A-3F and FIGS. 5A-5F for uneven spot probabilities, and FIGS. 4A-4F and FIGS. 6A and 6F for even spot probabilities).

Table 6 and Table 7 summarize the DVB-S2X throughput simulation results for the various traffic configurations described in Section II.C above. As expected, the throughput is lower than for the Shannon case, but the results are in line with the previous findings.

TABLE 6

DVB–S2X throughput results for traffic cases 0 to 3 with H-RRM, $D_A$ = 1.2 m, uneven traffic spot distribution for cases 2 and 3, $N_{FR}$ = 30

| Case | Predicted $\left[\frac{N_T}{\bar{N}_U}\right]_{opt}$ | Simulated $\left[\frac{N_T}{\bar{N}_U}\right]_{opt}$ | DVB–S2X Throughout (Gbps)/Δvs QVD % MF | MB | QVD | MMSE |
|---|---|---|---|---|---|---|
| 0 | NA | 2.0 | 3.04E+02 + 2.5 | 2.96E+02 − 0.1 | 2.96E+02 0.0 | 3.12E+02 + 5.3 |
| 1 | NA | 2.2 | 2.61E+02 + 1.2 | 2.55E+02 − 1.0 | 2.58E+02 0.0 | 2.80E+02 + 8.6 |
| 2a | 2.4 | 2.4 | 1.67E+02 + 2.8 | 1.64E+02 + 0.7 | 1.63E+02 0.0 | 1.77E+02 + 8.5 |
| 2b | 2.4 | 2.4 | 1.75E+02 + 3.1 | 1.71E+02 + 0.7 | 1.70E+02 0.0 | 1.86E+02 + 9.3 |
| 2c | 9.9 | 10.0 | 1.00E+02 − 2.5 | 9.83E+01 − 4.3 | 1.03E+02 0.0 | 1.16E+02 + 12.8 |
| 2d | 12.0 | 12.0 | 8.29E+01 − 1.7 | 8.14E+01 − 3.5 | 8.44E+01 0.0 | 9.53E+01 + 13.0 |
| 2e | 8.0 | 8.0 | 1.01E+02 − 0.1 | 9.92E+01 − 1.9 | 1.01E+02 0.0 | 1.15E+02 + 14.1 |
| 2f | 6.0 | 7.0 | 1.13E+02 + 0.3 | 1.11E+02 − 1.9 | 1.13E+02 0.0 | 1.29E+02 + 14.1 |
| 3a | 4.1 | 4.1 | 1.55E+02 + 0.9 | 1.53E+02 − 1.0 | 1.54E+02 0.0 | 1.70E+02+ 10.5 |
| 3b | 4.1 | 2.4 | 1.68E+02 + 0.1 | 1.65E+02 − 1.9 | 1.68E+02 0.0 | 1.85E+02 + 10.3 |
| 3c | 23.7 | 22.0 | 4.94E+01 − 4.8 | 4.85E+01 − 6.5 | 5.19E+01 0.0 | 5.78E+01 + 11.4 |
| 3d | 28.6 | 28.0 | 3.94E+01 − 4.0 | 3.88E+01 − 5.5 | 4.10E+01 0.0 | 4.62E+01 + 12.7 |
| 3e | 19.1 | 20.0 | 5.09E+01 − 2.6 | 5.00E+01 − 4.2 | 5.22E+01 0.0 | 5.89E+01 + 12.9 |
| 3f | 14.3 | 15.0 | 5.98E+01 − 1.1 | 5.88E+01 − 2.9 | 6.05E+01 0.0 | 6.83E+01 + 12.8 |

TABLE 7

DVB−S2X throughput results for traffic cases 0 to 3 with H-RRM, $D_A$ = 1.2 m, even traffic spot distribution for cases 2 and 3, $N_{FR}$ = 30

| Case | Predicted $\left[\frac{N_T}{\bar{N}_U}\right]_{opt}$ | Simulated $\left[\frac{N_T}{\bar{N}_U}\right]_{opt}$ | Throughout DVB−S2X (Gbps)/Δ vs QVD % MF | MB | QVD | MMSE |
|---|---|---|---|---|---|---|
| 0 | NA | 2.0 | 3.04E+02 + 2.5 | 2.96E+02 − 0.1 | 2.96E+02 0.0 | 3.12E+02 + 5.3 |
| 1 | NA | 2.2 | 2.61E+02 + 1.2 | 2.55E+02 − 1.0 | 2.58E+02 0.0 | 2.80E+02 + 8.6 |
| 2a | 2.4 | 2.4 | 1.85E+02 + 2.5 | 1.81E+02 + 0.4 | 1.80E+02 0.0 | 1.95E+02 + 8.0 |
| 2b | 2.4 | 2.0 | 1.88E+02 + 3.2 | 1.83E+02 + 0.9 | 1.82E+02 0.0 | 1.98E+02 + 8.9 |
| 2c | 9.9 | 10.0 | 1.12E+02 − 4.4 | 1.09E+02 − 6.5 | 1.17E+02 0.0 | 1.32E+02 + 13.1 |
| 2d | 12.0 | 12.0 | 9.08E+01 − 3.6 | 8.90E+01 − 5.5 | 9.42E+01 0.0 | 1.06E+02 + 12.5 |
| 2e | 8.0 | 9.0 | 1.10E+02 − 2.3 | 1.08E+02 − 4.2 | 1.13E+02 0.0 | 1.29E+02 + 12.5 |
| 2f | 6.0 | 7.0 | 1.22E+02 − 0.7 | 1.20E+02 − 2.6 | 1.23E+02 0.0 | 1.40E+02 + 14.3 |
| 3a | 4.1 | 4.1 | 1.63E+02 + 0.8 | 1.60E+02 − 1.3 | 1.62E+02 0.0 | 1.78E+02 + 10.1 |
| 3b | 4.1 | 4.1 | 1.78E+02 − 0.8 | 1.75E+02 − 2.7 | 1.80E+02 0.0 | 1.98E+02 + 10.4 |
| 3c | 23.7 | 25.0 | 5.39E+01 − 7.6 | 5.29E+01 − 9.4 | 5.83E+01 0.0 | 6.45E+01 10.5 + |
| 3d | 28.6 | 32.0 | 4.24E+01 − 6.9 | 4.15E+01 − 8.8 | 4.55E+01 0.0 | 5.08E+01 + 11.5 |
| 3e | 19.1 | 24.0 | 5.41E+01 − 4.9 | 5.31E+01 − 6.6 | 5.69E+01 0.0 | 6.40E+01 + 12.4 |
| 3f | 14.3 | 18.0 | 6.24E+01 − 3.2 | 6.11E+01 − 5.2 | 6.44E+01 0.0 | 7.28E+01 + 12.9 |

IV.C.6 Impact of Heuristic RRM Algorithm

So far the performances of the proposed pragmatic MB M-MIMO with H-RRM and QVD beam assignment scheme have been compared to ideal MMSE precoding exploiting the same RRM scheme. To fully appreciate the importance of the proposed H-RRM technique, simulations using a simple RRM scheme have been performed. The simple RRM scheme randomly assigns the users to TDM frames (colors) with equal number of active users per frame. The beamforming/precoding matrix is then evaluated according to the population of users in the assigned color.

Table 8 summarizes the difference in Shannon throughput between H-RRM combined with QVD (H-RRM+QVD) versus simple RRM combined with MMSE (S-RRM+MMSE), and H-RRM combined with QVD (H-RRM+QVD) vs H-RRM combined with MMSE (H-RRM+MMSE), for different traffic cases, assuming uniform and uneven traffic spot distributions. Further, $$P_T^c = 2\ \text{kW},\ D_A = 1.2\ \text{m},\ N_{FR} = 30$$

are assumed. It is apparent that there is a substantial advantage provided by the H-RRM+QVD scheme compared to the simple RRM scheme. This makes the pragmatic M-MIMO throughput performance superior to S-RRM+MMSE. The H-RRM+QVD vs S-RRM+MMSE gain is up to 42% and 38% for cases 1 and 3d instead of a respective loss of −8% and −10% when comparing H-RRM+QVD to H-RRM+MMSE.

The results for DVB-S2X throughput are reported in Table 9, again for different traffic cases, assuming uniform and uneven traffic spot distributions. Further, $$P_T^c = 2\ \text{kW},\ D_A = 1.2\ \text{m},\ N_{FR} = 30$$

are assumed. In this case the H-RRM+QVD vs S-RRM+MMSE gain is up to 53% for cases 1 and 3d instead of a loss of −8% or −11% when comparing H-RRM+QVD to H-RRM+MMSE.

TABLE 8

Shannon throughput results impact for: a) H-RRM and QVD (H-RRM + QVD) vs simple RRM and MMSE (S-RRM + MMSE); b) H-RRM and QVD (H-RRM + QVD) vs H-RRM and MMSE (H-RRM + MMSE)

| Case | Sub-case | Shannon Throughout Δ % H-RRM + QVD vs S-RRM + MMSE | H-RRM + QVD vs H-RRM + MMSE |
|---|---|---|---|
| 1 | NA | +41.7 | −8.1 |
| 2 | a | +16.0 | −7.5 |
| | d | +35.0 | −11.0 |
| | f | +29.1 | −11.0 |
| 3 | a | +28.3 | −8.9 |
| | d | +37.8 | −10.3 |
| | f | +31.8 | −10.8 |

TABLE 9

DVB-S2X throughput results impact for: a) H-RRM and QVD (H-RRM + QVD) vs simple RRM and MMSE (S-RRM + MMSE); b) H-RRM and QVD (H-RRM + QVD) vs H-RRM and MMSE (H-RRM + MMSE)

| | | DVB-S2X Throughout Δ % | |
|---|---|---|---|
| Case | Sub-case | H-RRM + QVD vs S-RRM + MMSE | H-RRM + QVD vs H-RRM + MMSE |
| 1 | NA | +53.1 | −7.9 |
| 2 | a | +23.2 | −7.8 |
| | d | +37.3 | −11.5 |
| | f | +30.8 | −12.3 |
| 3 | a | +31.8 | −9.5 |
| | d | +53.2 | −11.2 |
| | f | +35.5 | −11.3 |

IV.C.7 Impact of RF Power

As noted above, when reducing the traffic area served for constant payload RF power $$P_T^c$$

the on-ground power flux density approximately increases proportionally to the ratio $$\frac{s_A}{s_T}.$$

This means that the co-channel interference increases as well. It is therefore interesting to assess the impact of a $$P_T^c$$

reduction for $$\frac{s_T}{s_A} < 1.$$

This has been investigated for traffic case 2e that has a 70% reduction in the traffic area compared to case 2a. Table 10 and Table 11 summarize the Shannon and DVB-S2X throughput simulation results, respectively. It is noted that reducing the RF power from 2.0 kW to 1.5 kW has a modest impact on the throughput (about 7%). For $$P_T^c = 1.0\ \text{kW}$$

the throughput loss rises to about 17%. FIG. 30 illustrates the simulated Shannon QVD and MMSE throughputs as functions of the RF power $$P_T^c$$

for case 2e and $D_A$=1.2 m. It is apparent that the MMSE to QVD gap reduces with $$P_T^c$$

for the reasons given above.

TABLE 10

Shannon throughput results for traffic case 2e with H-RRM for different payload RF power levels $P_T^c$, $D_A$ = 1.2 m, uneven traffic spot distribution, $N_{FR}$ = 30

| $P_T^c$ (kW) | Predicted $\left[\frac{N_T}{\bar{N}_U}\right]_{opt}$ | Simulated $\left[\frac{N_T}{\bar{N}_U}\right]_{opt}$ | Shannon Throughout (Gbps)/Δ vs QVD % MF | MB | QVD | MMSE |
|---|---|---|---|---|---|---|
| 1.0 | 8.0 | 8.0 | 1.07E+02 + 1.2 | 1.05E+02 − 0.5 | 1.05E+02 0.0 | 1.17E+02 + 11.3 |
| 1.5 | 8.0 | 8.0 | 1.18E+02 + 0.3 | 1.16E+02 − 1.4 | 1.26E+02 0.0 | 1.42E+02 + 12.2 |
| 2.0 | 8.0 | 8.0 | 1.26E+02 − 0.1 | 1.24E+02 − 1.9 | 1.26E+02 0.0 | 1.42E+02 + 12.7 |

TABLE 11

DVB−S2X throughput results for traffic case 2e with H-RRM for different payload RF power levels $P_T^c$, $D_A$ = 1.2 m, uneven traffic spot distribution,$N_{FR}$ = 30

| $P_T^c$ (kW) | Predicted $\left[\frac{N_T}{\bar{N}_U}\right]_{opt}$ | Simulated $\left[\frac{N_T}{\bar{N}_U}\right]_{opt}$ | Throughout DVB−S2X (Gbps)/Δ vs QVD % MF | MB | QVD | MMSE |
|---|---|---|---|---|---|---|
| 1.0 | 8.0 | 8.0 | 8.41E+01 + 1.0 | 8.25E+01 − 0.8 | 8.32E+01 0.0 | 9.29E+01 + 11.7 |
| 1.5 | 8.0 | 8.0 | 9.42E+01 + 0.2 | 9.24E+01 − 1.6 | 9.40E+01 0.0 | 1.07E+02 + 13.6 |

TABLE 11-continued

DVB-S2X throughput results for traffic case 2e with H-RRM for different payload RF power levels $P_T^c$, $D_A$ = 1.2 m, uneven traffic spot distribution, $N_{FR}$ = 30

| $P_T^c$ (kW) | Predicted $\left[\frac{N_T}{\bar{N}_U}\right]_{opt}$ | Simulated $\left[\frac{N_T}{\bar{N}_U}\right]_{opt}$ | Throughout DVB-S2X (Gbps)/Δ vs QVD % MF | MB | QVD | MMSE |
|---|---|---|---|---|---|---|
| 2.0 | 8.0 | 8.0 | 1.01E+02 − 0.1 | 9.92E+01 − 1.9 | 1.01E+02 0.0 | 1.15E+02 + 14.1 |

IV.D. Results for Array of Size 2.0 m

The 2 m array size is more demanding in terms of simulation time. Hence, the present section focuses on the uneven traffic spots probability case, reusing the optimized $$\frac{N_T}{\bar{N}_U}$$

values previously derived.

IV.D.1 Impact of Non-Uniform Traffic Cases

Table 12 and Table 13 respectively summarize the Shannon and DVB-S2X throughput simulation results for a DRA of 2.0 m size and the various traffic configurations described in Section II.C. Concerning the throughput performance for the various M-MIMO schemes with RRM, it is noted that for case 1 (full visible Earth uniform traffic distribution or PPP distribution) the H-RRM QVD throughput is by 13.5% lower than for case 0. The above comments related to 1.2 m DRA size as regards the dependence on the traffic cases are also applicable here. The main difference is that for the 2.0 m array size the QVD loss versus MMSE can be as high as 25%, i.e., almost twice the loss compared to the 1.2 m DRA size case.

The increased MMSE advantage versus MF/MB/QVD can be explained as follows:

Increased beam power spectral density, and hence SNR, compared to the 1.2 m DRA case due to the increased antenna size and same RF power. This implies a higher level of co-channel interference for a given active beam geometry provided by the RRM algorithm that MMSE can mitigate.

Increased number of simultaneously active beams $N_U$ causing an increased co-channel interference mitigated by the MMSE.

In any case, this pragmatic M-MIMO QVD performance loss will be turned into a QVD gain when practical MMSE implementation aspects will be considered. In addition, the MB+QVD complexity is much lower compared to the MMSE solution.

FIG. 31 illustrates the simulated Shannon QVD throughput versus the traffic area/coverage area ratio for cases 2 and 3, for $D_A$=2.0 m. The almost proportional throughput dependency on the ratio $$\frac{s_T}{s_A}$$

is apparent, although the slope is more pronounced for case 3 than for case 2.

TABLE 12

Shannon throughput results for traffic cases 0 to −3 with H-RRM, $D_A$ = 2.0 m, uneven traffic spot distribution for cases 2 and 3, $N_{FR}$ = 30

| Case | Predicted $\left[\frac{N_T}{\bar{N}_U}\right]_{opt}$ | Simulated $\left[\frac{N_T}{\bar{N}_U}\right]_{opt}$ | Shannon Throughout (Gbps)/Δ vs QVD % MF | MB | QVD | MMSE |
|---|---|---|---|---|---|---|
| 0 | NA | 2.0 | 9.89E+02 + 2.4 | 9.65E+02 − 0.1 | 9.66E+02 0.0 | 1.03E+03 + 6.1 |
| 1 | NA | 2.2 | 8.62E+02 + 0.8 | 8.45E+02 − 1.1 | 8.55E+02 0.0 | 9.53E+02 + 11.5 |
| 2a | 2.4 | 2.4 | 6.00E+02 + 2.4 | 5.90E+02 + 0.6 | 5.86E+02 0.0 | 6.45E+02 + 10.1 |
| 2b | 2.4 | 2.4 | 6.28E+02 + 2.4 | 6.17E+02 + 0.6 | 6.13E+02 0.0 | 6.74E+02 + 9.9 |
| 2c | 9.9 | 10.0 | 3.15E+02 − 2.1 | 3.09E+02 − 3.8 | 3.21E+02 0.0 | 3.89E+02 + 21.0 |
| 2d | 12.0 | 12.0 | 2.55E+02 − 1.5 | 2.51E+02 − 3.1 | 2.59E+02 0.0 | 3.17E+02 + 22.3 |
| 2e | 8.0 | 8.0 | 3.26E+02 − 0.2 | 3.20E+02 − 1.8 | 3.26E+02 0.0 | 3.93E+02 + 20.4 |
| 2f | 6.0 | 7.0 | 3.68E+02 − 0.1 | 3.62E+02 − 1.8 | 3.69E+02 0.0 | 4.40E+02 + 19.2 |
| 3a | 4.1 | 4.1 | 5.25E+02 + 0.6 | 5.15E+02 − 1.2 | 5.22E+02 0.0 | 5.94E+02 + 13.9 |
| 3b | 4.1 | 2.4 | 5.59E+02 0.0 | 5.49E+02 − 1.8 | 5.58E+02 0.0 | 6.40E+02 + 14.6 |
| 3c | 23.7 | 22.0 | 1.49E+02 − 4.0 | 1.47E+02 − 5.7 | 1.56E+02 0.0 | 1.93E+02 + 23.8 |
| 3d | 28.6 | 28.0 | 1.18E+02 − 3.3 | 1.16E+02 − 5.0 | 1.22E+02 0.0 | 1.53E+02 + 25.0 |

TABLE 12-continued

Shannon throughput results for traffic cases 0 to −3 with H−RRM, $D_A$ = 2.0 m, uneven traffic spot distribution for cases 2 and 3, $N_{FR}$ = 30

| Case | Predicted $\left[\frac{N_T}{\bar{N}_U}\right]_{opt}$ | Simulated $\left[\frac{N_T}{\bar{N}_U}\right]_{opt}$ | Shannon Throughout (Gbps)/Δ vs QVD % MF | MB | QVD | MMSE |
|---|---|---|---|---|---|---|
| 3e | 19.1 | 20.0 | 1.57E+02 − 2.2 | 1.54E+02 − 3.8 | 1.60E+02 0.0 | 1.99E+02 + 24.3 |
| 3f | 14.3 | 15.0 | 1.89E+02 − 1.0 | 1.86E+02 − 2.7 | 1.91E+02 0.0 | 2.33E+02 + 21.9 |

TABLE 13

DVB−S2X throughput results for traffic cases 0 to −3 with H−RRM, $D_A$ = 2.0 m, uneven traffic spot distribution for cases 2 and 3, $N_{FR}$ = 30

| Case | Predicted $\left[\frac{N_T}{\bar{N}_U}\right]_{opt}$ | Simulated $\left[\frac{N_T}{\bar{N}_U}\right]_{opt}$ | DVB−S2X Throughout (Gbps)/Δ vs QVD % MF | MB | QVD | MMSE |
|---|---|---|---|---|---|---|
| 0 | NA | 2.0 | 8.08E+02 + 2.8 | 7.85E+02 − 0.1 | 7.86E+02 0.0 | 8.39E+02 + 6.8 |
| 1 | NA | 2.2 | 6.98E+02 + 1.0 | 6.83E+02 − 1.2 | 6.91E+02 0.0 | 7.71E+02 + 11.5 |
| 2a | 2.4 | 2.4 | 4.47E+02 + 2.5 | 4.37E+02 + 0.4 | 4.36E+02 0.0 | 4.83E+02 + 10.9 |
| 2b | 2.4 | 2.4 | 4.67E+02 + 2.8 | 4.56E+02 + 0.5 | 4.54E+02 0.0 | 5.01E+02 + 10.4 |
| 2c | 9.9 | 10.0 | 2.55E+02 − 2.2 | 2.51E+02 − 4.0 | 2.61E+02 0.0 | 3.20E+02 + 22.4 |
| 2d | 12.0 | 12.0 | 2.08E+02 − 1.5 | 2.05E+02 − 3.2 | 2.11E+02 0.0 | 2.61E+02 + 23.2 |
| 2e | 8.0 | 8.0 | 2.61E+02 − 0.1 | 2.57E+02 − 2.0 | 2.62E+02 0.0 | 3.22E+02 + 23.1 |
| 2f | 6.0 | 7.0 | 2.95E+02 − 0.1 | 2.90E+02 − 2.0 | 2.95E+02 0.0 | 3.59E+02 + 23.1 |
| 3a | 4.1 | 4.1 | 4.11E+02 + 0.7 | 4.03E+02 − 1.3 | 4.08E+02 0.0 | 4.69E+02 + 14.9 |
| 3b | 4.1 | 2.4 | 4.43E+02 − 0.1 | 4.35E+02 − 2.0 | 4.43E+02 0.0 | 5.11E+02 + 15.4 |
| 3c | 23.7 | 22.0 | 1.22E+02 − 4.1 | 1.20E+02 − 5.8 | 1.27E+02 0.0 | 1.60E+02 + 25.6 |
| 3d | 28.6 | 28.0 | 9.68E+01 − 3.4 | 9.51E+01 − 5.1 | 1.00E+02 0.0 | 1.27E+02 + 27.1 |
| 3e | 19.1 | 20.0 | 1.28E+02 − 2.2 | 1.26E+02 − 3.9 | 1.31E+02 0.0 | 1.66E+02 + 26.4 |
| 3f | 14.3 | 15.0 | 1.53E+02 − 1.1 | 1.51E+02 − 2.9 | 1.55E+02 0.0 | 1.91E+02 + 23.5 |

IV.D.2 Impact of RF Power

Table 14 and Table 15 respectively summarize the Shannon and DVB-S2X throughput simulation results for the throughput dependency as a function of the payload RF power for traffic case 2e. It is noted that reducing the RF power from 2.0 kW to 1.5 kW has a modest impact on the throughput (about 7%). For $P_T^c = 1.0$ kW the throughput loss rises to about 17%. FIG. 32 illustrates the simulated Shannon QVD and MMSE throughputs versus the RF power $P_T^c$ for case 2e and $D_A$=2.0 m. It is apparent that the MMSE to QVD gap reduces with $P_T^c$ for the reasons explained above.

TABLE 14

Shannon throughput results for traffic case 2e with H–RRM for different payload RF power levels $P_T^c$, $D_A$ = 2.0 m, uneven traffic spot distribution, $N_{FR}$ = 30

| $P_T^c$ (kW) | Predicted $\left[\frac{N_T}{\bar{N}_U}\right]_{opt}$ | Simulated $\left[\frac{N_T}{\bar{N}_U}\right]_{opt}$ | Shannon Throughout (Gbps)/Δ vs QVD % MF | MB | QVD | MMSE |
|---|---|---|---|---|---|---|
| 1.0 | 8.0 | 8.0 | 2.79E+02 + 1.1 | 2.74E+02 − 0.6 | 2.76E+02 0.0 | 3.20E+02 + 16.1 |
| 1.5 | 8.0 | 8.0 | 3.08E+02 + 0.2 | 3.03E+02 − 1.5 | 3.07E+02 0.0 | 3.64E+02 + 18.6 |
| 2.0 | 8.0 | 8.0 | 3.26E+02 − 0.2 | 3.20E+02 − 1.8 | 3.26E+02 0.0 | 3.93E+02 + 20.4 |

TABLE 15

DVB–S2X throughput results for traffic case 2e with H–RRM for different payload RF power levels $P_T^c$, $D_A$ = 2.0 m, uneven traffic spot distribution, $N_{FR}$ = 30

| $P_T^c$ (KW) | Predicted $\left[\frac{N_T}{\bar{N}_U}\right]_{opt}$ | Simulated $\left[\frac{N_T}{\bar{N}_U}\right]_{opt}$ | DVB–S2X Throughout (Gbps)/Δ vs QVD % MF | MB | QVD | MMSE |
|---|---|---|---|---|---|---|
| 1.0 | 8.0 | 8.0 | 8.41E+01 + 1.1 | 8.25E+01 − 0.8 | 8.32E+01 0.0 | 9.29E+01 + 17.2 |
| 1.5 | 8.0 | 8.0 | 9.42E+01 + 0.2 | 9.24E+01 − 1.7 | 9.40E+01 0.0 | 1.07E+02 + 21.2 |
| 2.0 | 8.0 | 8.0 | 1.01E+02 − 0.1 | 9.92E+01 − 2.0 | 1.01E+02 0.0 | 1.15E+02 + 23.1 |

V. SUMMARY AND CONCLUSIONS

The proposed H-RRM for M-MIMO has been shown to closely approximate the NP-Hard MIQP performance and to be robust with respect to very different traffic distributions. The linear complexity H-RRM throughput when applied to the pragmatic MB M-MIMO is 12% to 24% lower than for the much more complex MMSE precoding technique with H-RRM and assuming perfect channel knowledge for the 1.2 m and 2.0 m DRA cases, respectively. When MMSE M-MIMO is combined with a more basic RRM, the MB M-MIMO H-RRM show 23% to 53% throughput advantage compared thereto. The H-RRM is shown to be very robust to the users' spatial distributions, and the key RRM parameters are easy to adapt to current traffic conditions.

The H-RRM and beam assignment algorithms proposed in the present disclosure are well matched to the MB M-MIMO beam-hopped fixed grid of beams architecture that does not require any adaptive beam forming (fixed beam grid generation, as described for example in reference literature 1). Furthermore, the proposed RRM can be implemented on ground and the hopping pattern can be uploaded to the satellite via conventional telecommand functionality. The H-RRM MB M-MIMO physical layer can be based on the current DVB-S2X standard, thus making it a short-term close to optimum feasible solution.

VI. INTERPRETATION

The present disclosure likewise relates to apparatus for performing methods and techniques described throughout the disclosure. The apparatus may comprise one or more processors and a memory coupled to the processor(s). The processor may be adapted to carry out all steps of the methods described throughout the disclosure. This apparatus may relate to a controller of a hub station, for example. Further, the present disclosure likewise relates to a computer program comprising instructions that, when executed by a processor (e.g., computer processor, server processor), cause the processor to carry out all steps of the methods described throughout the disclosure. Yet further, the present disclosure likewise relates to a non-transitory computer-readable storage medium storing the aforementioned computer program.

It is further understood that any circuitry, units, or blocks described throughout the present disclosure may be implemented by a computer processor or respective computer processors, or the like.

It should yet further be noted that the description and drawings merely illustrate the principles of the proposed method and system. Those skilled in the art will be able to implement various arrangements that, although not explicitly described or shown herein, embody the principles of the disclosure and are included within its spirit and scope. Furthermore, all examples and embodiment outlined in the present document are principally intended expressly to be only for explanatory purposes to help the reader in understanding the principles of the proposed method and system. Furthermore, all statements herein providing principles, aspects, and embodiments of the disclosure, as well as specific examples thereof, are intended to encompass equivalents thereof.

APPENDIX A: ELEMENTS OF STOCHASTIC GEOMETRY

Appendix A summarizes key elements of stochastic geometry and point processes that may be relevant to the techniques described elsewhere in the present disclosure.

A.I. Poisson Point Processes

For a Poisson Point Process (PPP) of intensity ρ (where ρ is the mean number of points per unit area, i.e., the point density), the probability that a randomly chosen area of measure A will contain exactly n points is given by Poisson's exponential function $$P(N(A)=n)=\frac{(\rho A)^n e^{-\rho A}}{n!}. \tag{61}$$

The probability distribution $\hat{G}(r)$ (known as Diggle's G-function) of the distance D from a random point (event) to its nearest neighbor point (event) in the same point process is defined as $$\hat{G}(r)=P\{D<r\}. \tag{62}$$

Exploiting the rule of subtraction of probabilities (i.e., that probability that event will occur is equal to 1 minus the probability that the event will not occur), $$P\{D<r\}=1-P\{D>r\}, \tag{63}$$

P{D<r} can be interpreted as the probability that a circle of radius r centred on an arbitrary point contains at least one point, and P{D>r} as the probability that a circle of radius r centred on an arbitrary point contains no point, which can be obtained by substituting n=0 and $A=\pi r^2$ into the Poisson distribution, $$P\{N(\pi r^2)=0\}=e^{-\pi\rho r^2}. \tag{64}$$

Thus the probability distribution of PPP can be obtained as $$\hat{G}(r)=1-e^{-\pi\rho r^2}, \tag{65}$$

which after differentiation yields a Rayleigh probability density function, $$\hat{g}(r)=\frac{d\hat{G}(r)}{dr}=2\pi\rho r e^{-\pi\rho r^2}. \tag{66}$$

The mean nearest neighbor distance of the PPP, $\bar{R}_{PPP}$, can be evaluated as expectation of the Rayleigh probability density function, $$\bar{R}_{PPP}=E\{r\}=\int_0^\infty r\hat{g}(r)dr=\int_0^\infty 2\pi\rho r^2 e^{-\pi\rho r^2}dr=\frac{1}{2\sqrt{\rho}}. \tag{67}$$

The Poisson Disk Process, also known as Poisson Hard-Core Process (PHCP), is a point process with a uniform distribution of occurrence of points in the region of interest with the additional constraint that each point of the pattern must be separated from the other points by a minimum distance $2r_{min}$, where the parameter $r_{min}$ is called the Poisson disk radius. It is worth noting that reference literature 1 has empirically shown that a user distribution according to PDP characteristics provides optimal throughput performance.

The extreme end of the family of point patterns is marked by periodic lattices that are fully deterministic. Given a point density ρ, the maximum mean nearest neighbor distance is obtained for hexagonal lattices as $$\bar{R}_{HEX}=\frac{\sqrt{2}}{\sqrt[4]{3}}\frac{1}{\sqrt{\rho}}\approx 1.0746\frac{1}{\sqrt{\rho}}. \tag{68}$$

A.II. Empirical Analysis of Point Patterns

The algorithms, techniques, and methods described throughout the present disclosure manipulate an input point pattern in a single (as in the case of VDI and QVD) or in multiple (as in the case of RRM) output point patterns. In all cases, the input point pattern represents the geometrical distribution of users, which can be simulated as the realization of a set of random variables based on a continuous bi-dimensional probability density function. At first order the performance of the algorithms can be assessed with an analysis of the nearest-neighbor distance statistics of the output point patterns. For this reason, some of the techniques for point pattern analysis need to be discussed/adapted.

For each point of the point pattern under analysis, the nearest-neighbor distance can be evaluated to build the empirical distribution function, viz., a staircase function with steps or height $$\frac{1}{N}$$

(where N is the number of points) for each of the ordered nearest-neighbor distances.

In plotting the empirical distribution function of the nearest-neighbor distance it must be considered that the distance is an absolute geometric measure. To compare different distributions, it is necessary to define a re-normalization of the x-axis. The y-axis is intrinsically normalized to 0-1 by the definition of distribution function.

Considering the centrality of the Poisson point process for point pattern analysis (including hypothesis testing of the complete spatial randomness), a re-scaling of the distance to the PPP mean nearest-neighbor distance can be introduced for the given point density. The re-scaling procedure may be performed as follows:

Given A, the area of the Region of Interest, and N, the size of the empirical point pattern population, define the empirical density $$\rho=\frac{N}{A}. \tag{69}$$

Re-scale to distances, r, to the PPP mean nearest neighbor distance for the empirical density ρ, $$\hat{r}=\frac{r}{\bar{R}_{PPP}(\rho)}=2r\sqrt{\rho}=2r\sqrt{\frac{N}{A}}. \tag{70}$$

The re-normalization allows to compare point patterns with different sizes of the number of empirical points. Examples of point patterns and relevant empirical distribution function of the nearest-neighbor distance are illustrated in FIGS. 33A and 33B, FIGS. 34A and 34B, and FIGS. 35A and 35B. FIG. 33A illustrates the Poisson Point Pattern and FIG. 33B illustrates the corresponding Diggle's G-function (800 points). FIG. 34A illustrates the point pattern of the Poisson Disk Process and FIG. 34B illustrates the corresponding Diggle's G-function (800 points). Finally, FIG. 35A illustrates a realization of the RRM point pattern and FIG. 35B illustrates the corresponding Diggle's G-function (800 points).

A.III. Maximum Likelihood Estimation

Maximum likelihood estimation (MLE) is a well-established statistical method for estimating the parameters of a probability density function (PDF) based on empirical observations. It is based on the optimization of the PDF parameters such that the likelihood of making the observations is maximized for the optimal parameters. MATLAB® statistical toolbox has a generic MLE routine, mle( ), which can be used for the estimations of the RRM Diggle's G-function.

Concerning the functional form of the PDF for the best fitting, a Weibull three-parameters PDF can be implemented (not available in MATLAB®), $$\hat{g}(r) = \begin{cases} \frac{\beta}{\alpha}\left(\frac{r-r_0}{\alpha}\right)^{\beta-1}\exp\left[-\left(\frac{r-r_0}{\alpha}\right)^{\beta}\right] & r \geq r_0 \\ 0 & r < r_0 \end{cases}. \quad (71)$$

Its adoption is empirically justified on the base of the following findings:

- Considering that the Poisson Point Processes has an exact theoretical Rayleigh distribution, which is a one-parameter (i.e., α-scale) distribution, it is natural to consider the Weibull distribution which is a two-parameter generalization (i.e., α-scale and β-shape) of the Rayleigh distribution (for β=2 the Weibull distribution coincides with the Rayleigh distribution).
- The additional shape parameter of the Weibull distribution allows to change the growth rate (for β>2) of the PDF allowing to adapt it to different empirical slopes.
- The third parameter ($r_0$-location) added to the standard Weibull distribution allows to control both the non-zero attack point of the distribution, and to adapt a given slope to the mean.

The qualitative goodness of the estimation for a typical RRM point pattern can be appreciated from FIGS. 35A and 35B by comparing the black empirical PDF with the grey curve for Weibull 3P best fitted with MLE techniques.

APPENDIX B: GENERALIZATIONS

B.I. Generalized System Model

In the following, a general formulation of the Radio Resource Management and Beamforming/Precoding problem for Multi-User (Massive-) MIMO communication systems will be developed starting from the link and capacity equations.

The hub-station is assumed to transmit to the j-th user by means of the l-th radio resource (e.g., time slots in Time Division Multiplexing (TDM), carriers' frequency in Frequency Division Multiplexing (FDM), polarizations, direct-sequence spread-spectrum code in case of Code Division Multiplexing (CDM) or any combination of these including polarization reuse which allows to double the TDM/FDM/CDM colors). It is of interest to first determine the link budget for the i-th user when receiving via the k-th radio resource. For this purpose the generalized power transfer coefficients s(i,k|j,l) (with i,j=1 . . . N; k,l=1 . . . C) representing the power (normalized to its noise power) received by user i in color k when the hub station transmits for user j in color l can be introduced. A lexicographic ordering of the indexes (i,k) and (j,l) allows to collect the power transfer coefficients in a generalized power transfer matrix S̃. It should be noted that this formulation is over-redundant for analysis purposes, as a single color will be associated to each user, i.e., k=COL(i) and l=COL(j). In this case, signal-to-noise, interference-to-noise, and signal-to-noise plus interference ratios become, respectively, $$SNR^G(i) = s(i, COL(i) \mid i, COL(i)), \quad (72)$$

$$INR^G(i) = \sum_{j=1, j\neq i}^{N} s(i, COL(i) \mid j, COL(j)) \quad (73)$$

$$SNIR^G(i) = \frac{s(i, COL(i) \mid j, COL(j))}{1 + \sum_{j=1, j\neq i}^{N} s(i, COL(i) \mid j, COL(j))} = \frac{SNR^G(i)}{1 + INR^G(i)}. \quad (74)$$

The assignment of colors to users is the central problem of Radio Resource Management. To address the assignment problem, it can be imagined that the generalized power transfer coefficient s(i,k|j,l) assumes the meaning of what would be the power received by user i in color k if the hub station would transmit in color l for user j.

Here and in the following, the term "color" is used as a synonym for radio resource block or radio resource of any kind.

A user coloring matrix C of size (N×C) can be introduced, with binary entries, $$C = \begin{bmatrix} c(1,1) & \dots & c(1,C) \\ \vdots & & \vdots \\ c(N,1) & \dots & c(N,C) \end{bmatrix}, \quad (75)$$

where $$c(i,k) = \begin{cases} 1 & \text{if } COL(i) = k \\ 0 & \text{otherwise} \end{cases}. \quad (76)$$

Also in this case the matrix C can be seen as a mapping matrix for mapping the plurality of users to respective colors. Considering that the i-th user can be assigned only to one color, the rows of C must satisfy the following linear constraint corresponding to one user per color:

$$\sum_{j=1}^{C} c(i,j) = 1 \ \forall\, i. \quad (77)$$

Making use of the binary nature of the entries of the coloring matrix, the signal-to-noise, interference-to-noise, and signal-to-noise plus interference ratios can be written as, respectively, $$SNR^G(i) = \sum_{k=1}^{C}\sum_{l=1}^{C} c(i,k)\, s(i,k \mid i,l)\, c(i,l), \quad (78)$$

-continued $$INR^G(i) = \sum_{j=1, j\neq i}^{N} \sum_{k=1}^{C} \sum_{l=1}^{C} c(i,k)\, s(i,k \mid j,l)\, c(j,l), \tag{79}$$

$$SINR^G(i) = \frac{\sum_{k=1}^{C} \sum_{l=1}^{C} c(i,k)\, s(i,k \mid i,l)\, c(i,l)}{1 + \sum_{j=1, j\neq i}^{N} \sum_{k=1}^{C} \sum_{l=1}^{C} c(i,k)\, s(i,k \mid j,l)\, c(j,l)} = \frac{SNR^G(i)}{1 + INR^G(i)}. \tag{80}$$

The system throughput can be evaluated as the sum of the individual users' throughput contributions $T^S(i)$. The latter can be computed applying the Shannon capacity using the signal-to-noise plus interference ratio experienced by user i as derived in Eq. (80) as $$T^S(i) = \delta R_s \log_2\left(1 + SNIR^G(i)\right), \tag{81}$$

where $R_s$ is the carrier baud rate and δ is the duty cycle. A similar result can be obtained for the DVB-S2X standard or any other applicable air interface standard. Notably, Eq. (81) is in accordance with the notation adopted in Section II.B, Eq. (9), $\delta = 1/N_{FR}N_{SL}$, and $\eta(i) = \log_2(1+SNIR^G(i))$.

For simplicity, this notation assumes that baud rate and duty cycle are color independent. The notation can be easily extended introducing color dependent quantities δ(k), $R_s(k)$ substituting $\delta=\delta(COL(i))$ and $R_s=R_s(COL(i))$ in the user throughput equation.

The total Shannon throughput $$T_T^S$$

is obtained summing all users' Shannon throughput contributions, $T^S(i)$, $$T_T^S = \sum_{i=1}^{N} T^S(i). \tag{82}$$

Here, the sum-capacity $$T_T^S$$

is evaluated for the given user distribution.

When the generalized power transfer coefficients s(i,k|j,l) are known, the resource management problem can be cast in an Integer Programming problem of the form $$\underset{c(i,k)}{\text{maximize}} \sum_{i=1}^{N} \log_2\left(1 + \frac{\sum_{k=1}^{C} \sum_{l=1}^{C} c(i,k)\, s(i,k \mid i,l)\, c(i,l)}{1 + \sum_{j=1, j\neq i}^{N} \sum_{k=1}^{C} \sum_{l=1}^{C} c(i,k)\, s(i,k \mid j,l)\, c(j,l)}\right) \tag{83}$$

$$\text{subject to } \sum_{k=1}^{C} c(i,k) = 1,\ i = 1, \ldots, N$$

$$c(i,k) \in \{0,1\},\ i = 1, \ldots, N;\ k = 1, \ldots, C.$$

While general, this formulation hides the fact that when the hub station is composed by an array of antennas (e.g., with fixed or reconfigurable beamforming and/or precoding), the generalized power transfer coefficients s(i,k|j,l) would depend on the beamforming/precoding vectors selected for each user, e.g., the j-th user, $w_j$, and subject to physical feasibility constraints (such as total power, and per element power constraints, for example). Indicating the ($N_T \times 1$) channel row vector representing the complex transfer function between the $N_T$ radiating elements of the hub-station array and the user i when the hub-station transmit at color l and the user receives at color k with $$h_i^{k|l} (\text{with } l, k = 1 \ldots C, i = 1 \ldots N),$$

the generalized power transfer coefficients can be evaluated as $$s(i,k \mid j,l) = \left|h_i^{k|l} w_j\right|^2, \tag{84}$$

The most general RRM and precoding/beamforming optimization can then be expressed as the following Mixed Integer Programming problem, $$\underset{c(i,k), w_j}{\text{maximize}} \sum_{i=1}^{N} \log_2\left(1 + \frac{\sum_{k=1}^{C} \sum_{l=1}^{C} c(i,k) \left|h_i^{l|l} w_i\right|^2 c(i,l)}{1 + \sum_{j=1, j\neq i}^{N} \sum_{k=1}^{C} \sum_{l=1}^{C} c(i,k) \left|h_i^{k|l} w_j\right|^2 c(j,l)}\right) \tag{85}$$

$$\text{subject to } \sum_{k=1}^{C} c(i,k) = 1,\ i = 1, \ldots, N$$

$$c(i,k) \in \{0,1\},\ i = 1, \ldots, N;\ k = 1, \ldots, C$$

$$w_j \text{ satisfy per } \frac{\text{element}}{\text{total}} \text{ constraints.}$$

Some comments may be in order. The color assignment and the beamforming/precoding optimization are coupled problems, as the optimal precoding/beamforming depends strongly on the active users sharing the same color. Additionally, for a certain assignment of users to colors, the optimal precoding/beamforming will be color dependent (e.g., due to frequency dispersion of the channel row vectors).

The joint optimization of the radio resources and of the precoding/beamforming is thus a problem of formidable complexity and requires pragmatic solutions.

It can be observed that the complexity of the problem is reduced if the beamforming weights are known, or the problem of their determination can be decoupled from the radio resource management problem. In this respect, the simplifying hypothesis could be exploited that each precoding/beamforming vector depends only on the geometry and link conditions of each associated user (they are determined, for user j, at color l by the channel row vector $$h_j^{l|l}).$$

In this, w(h) will indicate the mapping function that determines a zero-order approximation of the optimal precoding/beamforming vector given the channel row vector h.

Relaxing the per-element/total power constraints, and considering the possible color dependency of the channel row vector, $$h_i^{k|l},$$

a formulation of the radio resource optimization can be obtained that is decoupled from the precoding/beamforming optimization problem. With the substitution, $$s(i,k\,|\,j,l)=\left|h_i^{k|l}w\left(h_j^{l|l}\right)\right|^2, \tag{86}$$

and under the precoding/beamforming constraints relaxation, the Mixed Integer Programming problem of Eq. (85) collapses into the Integer Programming problem of Eq. (83).

Once a user coloring matrix C is found as solution to the Integer Programming problem of Eq. (83), the precoding/beamforming optimization and normalization can be performed according to either known techniques (e.g., Matched-Filter, Zero-Forcing, Minimum-Mean-Square-Error, Pragmatic Multi-Beam, etc.) or newly disclosed techniques (e.g., Virtual Distancing or Quantized Virtual Distancing).

Solving the Integer Programming problem of Eq. (83) is thus pivotal to finding a solution to the general RRM problem. In this respect it can be leveraged on the results obtained by substituting the Integer Programming problem of the maximization of sum-capacity with the Mixed Integer Quadratic Problem of the minimization of the sum-interference.

Also in the general case, the aggregated co-channel interference, evaluated as the total interference-to-noise ratio $$INR_T^G,$$

can be assumed as a figure of merit of the overall performance. It satisfies the following definition, $$INR_T^G=\sum_{i=1}^{N}INR(i)=\sum_{i=1}^{N}\sum_{j=1,j\neq i}^{N}\sum_{k=1}^{C}\sum_{l=1}^{C}c(i,k)s(i,k\,|\,j,l)\,c(j,l). \tag{87}$$

From the generalized power transfer coefficients s(i,k|j,l) the generalized interference coefficients q(i,k|j,l) can be obtained as $$q(i,k\,|\,j,l)=\begin{cases}0 & \text{if } i=j\ \forall\, k,l\\ s(i,k\,|\,j,l) & \text{if } i\neq j\ \forall\, k,l\end{cases}. \tag{88}$$

Similarly to how the generalized power transfer matrix $\tilde{S}$ is organized, a generalized interference matrix $\tilde{Q}$ can be obtained. Specifically, the matrix $\tilde{Q}$ can be obtained from the coefficients q(i,k|j,l) with the lexicographic ordering of the indices (i,k) and (j,l)). It is worth noting that in this case, not only the diagonal entries of the matrix $\tilde{Q}$ are null, but also all diagonals of the (N×N) square submatrices composing $\tilde{Q}$.

Vectorizing the matrix C of size (N×C) into a column vector vec(C) of size (NC×1), which is obtained by stacking the columns of C on top of each other as $$vec(C)=[c(1,1),\ldots,c(N,1),\ldots,c(1,C),\ldots,c(N,C)]^T, \tag{89}$$

the aggregated co-channel interference can be formulated as a quadratic form on the column vector vec(C), $$\begin{aligned}INR_T^G&=\sum_{i=1}^{N}\sum_{j=1}^{N}\sum_{k=1}^{C}\sum_{l=1}^{C}c(i,k)\,q(i,k\,|\,j,l)\,c(j,l)=\\&=(vec(C))^T\tilde{Q}\,vec(C).\end{aligned} \tag{90}$$

The approximated resource management problem can be thus cast in a Mixed Integer Quadratic Programming (MIQP) problem of the form $$\begin{aligned}&\underset{c(i,k)}{\text{minimize}}\ (vec(C))^T\tilde{Q}\,vec(C)\\&\text{subject to}\ \sum_{k=1}^{C}c(i,k)=1,\ i=1,\ldots,N\\&c(i,k)\in\{0,1\},\ i=1,\ldots,N;\ k=1,\ldots,C.\end{aligned} \tag{91}$$

Before entering in the details of the heuristic optimization of such problem, it is worth discussing some particular forms that the generalized interference matrix $\tilde{Q}$ can take depending on the nature of interference.

Color-Independent/Orthogonal Colors:

This case identifies the situation where the use of a color does not generate interference in the other colors and the power transfer coefficients and the interference coefficients do not depend on the color (e.g., in single-frequency TDM), $$s(i,k\,|\,j,l)=\begin{cases}s(i\,|\,j) & \text{if } k=l\ \forall\, i,j\\ 0 & \text{if } k\neq l\ \forall\, i,j\end{cases}. \tag{92}$$

In this case the generalized interference matrix $\tilde{Q}$ can be written as a block diagonal matrix, $$\tilde{Q}=I\otimes Q=\begin{bmatrix}Q & 0 & & \ldots & 0\\ 0 & \ddots & & & \\ \vdots & & Q & & \vdots\\ & & & \ddots & 0\\ 0 & & & 0 & Q\end{bmatrix}, \tag{93}$$

which corresponds to the basic case already treated, with $$\begin{aligned}Q&=S-\mathrm{diag}\{\mathrm{diag}(S)\},\\ S&=|HW|^2,\end{aligned} \tag{94}$$

where H is the color independent channel matrix and W is the precoding/beamforming matrix, $$H=\begin{bmatrix} h_1 \\ \vdots \\ h_N \end{bmatrix}, \tag{95}$$

$$W=[\,w_1\ \ldots\ w_N\,], \tag{96}$$

and the squared absolute value operation $|\ |^2$ on the matrix has to be performed entry-wise.

Color-Dependent/Orthogonal Colors:

This case identifies the situation where the use of a color does not generate interference in the other colors but the power transfer coefficients and the interference coefficients are color dependent (e.g., in FDM due to the frequency dependency of the payload or antenna, or to the dependency on the polarization but neglecting cross-polarization interference, etc.), $$s(i,k\,|\,j,l)=\begin{cases} s^l(i\,|\,j) & \text{if } k=l\ \forall\ i,j \\ 0 & \text{if } k\neq l\ \forall\ i,j \end{cases}. \tag{97}$$

In this case the generalized interference matrix Q can be written as $$\tilde{Q}=I\otimes\{Q^l\}=\begin{bmatrix} Q^1 & 0 & \ldots & 0 \\ 0 & \ddots & & \\ \vdots & & Q^l & \vdots \\ & & \ddots & 0 \\ 0 & & 0 & Q^N \end{bmatrix}, \tag{98}$$

where the Fino and Algazi Generalized Kronecker Product notation has been used, and $$Q^l=S^l-\mathrm{diag}\{\mathrm{diag}(S^l)\},\quad S^l=|H^lW^l|^2, \tag{99}$$

where $H^l$ is the l-color channel matrix and $W^l$ is the precoding/beamforming matrix for color l, $$H^l=\begin{bmatrix} h_1^l \\ \vdots \\ h_N^l \end{bmatrix}, \tag{100}$$

$$W=[\,w_1^l\ \ldots\ w_N^l\,]. \tag{101}$$

Color-Dependent/Non-Orthogonal Colors:

This case identifies the most general situation where different colors are non-orthogonal and the power transfer coefficients and the interference coefficients can be color dependent (e.g., in FDM/CDM cases and when polarization reuse schemes are adopted). In this case the generalized interference matrix has non-zero elements also outside the block-diagonal, $$\tilde{Q}=\begin{bmatrix} Q^{1|1} & Q^{1|2} & \ldots & Q^{1|N} \\ Q^{2|1} & \ddots & & \\ \vdots & & Q^{k|l} & \vdots \\ & & \ddots & 0 \\ Q^{N|1} & & \ldots & Q^{N|N} \end{bmatrix}, \tag{102}$$

with $$Q^{k|l}=S^{k|l}-\mathrm{diag}\{\mathrm{diag}(S^{k|l})\},\quad S^{k|l}=|H^{k|l}W^l|^2, \tag{103}$$

where $S^{k|l}$ is the k-color channel matrix when the hub-station transmits at color l and $W^l$ is the precoding/beamforming matrix for color l, $$H^{k|l}=\begin{bmatrix} h_1^{k|l} \\ \vdots \\ h_N^{k|l} \end{bmatrix}, \tag{104}$$

$$W=[\,w_1^l\ \ldots\ w_N^l\,]. \tag{105}$$

It is worth noting that although not always negligible, the entries of the matrices $H^{k|l}$ for k≠l, which contribute to the off-block-diagonal part of $\tilde{Q}$, are related to a wanted transmission in color l that is spilled in color k and could be often considered as a second-order refinement to the block diagonal matrix related to the color-dependent/orthogonal-colors case.

B.II. Generalized Heuristic Rrm Algorithm

Following the line of thought which led to the efficient heuristic algorithm described above in Section III.A, also in this case an auxiliary co-channel interference matrix A of size (N×C) can be introduced, with elements $$a_i^k$$

representing the aggregated co-channel interference on user i is due to the co-frequency interference of all active users in color k, $$A=\begin{bmatrix} a_1^1 & \ldots & a_1^C \\ \vdots & & \vdots \\ a_N^1 & \ldots & a_N^C \end{bmatrix}. \tag{106}$$

The change of notation from a(i,k) to $$a_i^k$$

will be useful to better understand some of the required matrix operations. In the basic version of the Heuristic RRM algorithm (which is applicable for example to the Color-independent/Orthogonal colors case), the definition of the auxiliary co-channel interference matrix A is derived from the equation of the aggregated interference, $$INR_T=tr(C^TQ\,C), \tag{107}$$

so that the matrix A takes the form $$A = Q\,C. \tag{108}$$

Observing that $$tr\left(C^T A\right) = (vec(C))^T vec(A), \tag{109}$$

and considering the definition of the auxiliary co-channel interference matrix A, $$vec(A) = \tilde{Q}\,vec(C) \tag{110}$$

the aggregated interference equation for the generalized case can be obtained as $$INR_T^G = (vec(C))^T \tilde{Q}\,vec(C). \tag{111}$$

The information contained in A or vec(A) is the same, but for homogeneity of description of the heuristic algorithm the inverse vectorization operation, $vec^{-1}(\ )$, is introduced, which is a re-shaping operation that transforms a vector into a matrix. In the following, the argument vectors will be of size (NC×1) and the resultant matrix of size (N×C), such that $vec^{-1}(vec(A))=A$, and $$A = vec^{-1}\left(\tilde{Q}\,vec(C)\right). \tag{112}$$

According to what has been shown for the Color-independent/Orthogonal-colors case, the assumption can be made that at the n-th iteration a number of users has been assigned to a color such that the temporary coloring matrix $C^{(n)}$ satisfies $$\sum_{k=1}^{c} c^{(n)}(j,k) = \begin{cases} 1 & \text{if user } j \text{ has a color assigned} \\ 0 & \text{otherwise} \end{cases}. \tag{113}$$

At each iteration the temporary auxiliary matrix $A^{(n)}$ can be evaluated, and one can select, among the non-assigned users, the one (row) with worst interference and for it the least interfering color (within the row). The matrix $A^{(n)}$ is evaluated as $$A^{(n)} = vec^{-1}\left(\tilde{Q}\,vec\left(C^{(n)}\right)\right). \tag{114}$$

Together with the different inputs (i.e., collection of matrices $\{Q^l\}$ or the full generalized interference matrix $\tilde{Q}$ instead of the single interference matrix Q), the above generalization for the evaluation of the temporary auxiliary matrix $A^{(n)}$ are the only modifications that need to be applied to the heuristic coloring algorithm.

The development of a fast version of the algorithm can be based on the expansion $$C^{(n+1)} = C^{(n)} + \Delta C^{(n)}, \tag{115}$$

$$\begin{aligned} A^{(n+1)} &= vec^{-1}\left(\tilde{Q}\,vec\left(C^{(n)} + \Delta C^{(n)}\right)\right) = \\ &= vec^{-1}\left(\tilde{Q}\,vec\left(C^{(n)}\right)\right) + vec^{-1}\left(\tilde{Q}\,vec\left(\Delta C^{(n)}\right)\right) = \\ &= A^{(n)} + \Delta A^{(n)}. \end{aligned} \tag{116}$$

To understand the form of $\Delta A^{(n)}$, it can be observed that rewriting the user coloring matrix C as column vectors $$c_l^C,$$

$$C = \left[c_1^C\ \dots\ c_l^C\ \dots\ c_C^C\right], \tag{117}$$

the vectorization vec(C) takes the form $$vec(C) = \begin{bmatrix} c_1^C \\ \vdots \\ c_l^C \\ c_C^C \end{bmatrix}, \tag{118}$$

and the matrix-vector product, $\tilde{Q}$ vec(C), becomes $$\tilde{Q}\,vec(C) = \begin{bmatrix} Q^{1|1} & Q^{1|2} & & \dots & Q^{1|N} \\ Q^{2|1} & \ddots & & & \\ \vdots & & Q^{k|l} & & \vdots \\ & & & \ddots & 0 \\ Q^{N|1} & & & \dots & Q^{N|N} \end{bmatrix} \begin{bmatrix} c_1^C \\ \vdots \\ c_l^C \\ \vdots \\ c_C^C \end{bmatrix} = \begin{bmatrix} \sum_{l=1}^{C} Q^{1|l} c_l^C \\ \vdots \\ \sum_{l=1}^{C} Q^{k|l} c_l^C \\ \sum_{l=1}^{C} Q^{C|l} c_l^C \end{bmatrix}. \tag{119}$$

Finally, $$vec^{-1}\left(\tilde{Q}\,vec\left(C^{(n)}\right)\right) = \left[\sum_{l=1}^{C} Q^{1|l} c_l^C\ \dots\ \sum_{l=1}^{C} Q^{k|l} c_l^C\ \dots\ \sum_{l=1}^{C} Q^{C|l} c_l^C\right]. \tag{120}$$

At iteration (n), color $l^{(n)}$ is assigned to user $j^{(n)}$. The only unit entry element of $\Delta C^{(n)}$ is the one with index $(j^{(n)}, l^{(n)})$, and $$\Delta C^{(n)} = \left[0\ \dots\ \Delta c_{l^{(n)}}^C\ \dots\ 0\right], \tag{121}$$

substituting $$\begin{aligned} \Delta A^{(n)} &= vec^{-1}\left(\tilde{Q} vec\left(\Delta C^{(n)}\right)\right) \\ &= \left[\,Q^{1|l^{(n)}} \Delta c_{l^{(n)}}^C\ \dots\ Q^{k|l^{(n)}} c_{l^{(n)}}^C\ \dots\ Q^{C|l^{(n)}} c_{l^{(n)}}^C\,\right] \\ &= \left[\left[Q^{1|l^{(n)}}\right]_{j^{(n)}}^C \dots \left[Q^{k|l^{(n)}}\right]_{j^{(n)}}^C \dots \left[Q^{C|l^{(n)}}\right]_{j^{(n)}}^C\right]. \end{aligned} \tag{122}$$

The notation $$[Q]_j^C$$

indicates the j-th column of the matrix Q. Eq. (122) above can be interpreted as the fact that the assignment of color $l^{(n)}$ to user $j^{(n)}$ increases each color column vector interference of $A^{(n)}$ with relevant contribution. This equation provides also a fast update of the auxiliary matrix $A^{(n)}$ which avoids any matrix multiplication with substantial computational speed-up. Depending on the case applicable to the generalized interference matrix $\tilde{Q}$, further simplifications can be performed, as described below.

Color-Independent/Orthogonal Colors:

In this case, according to Eq. (92), $$Q^{k|l} = \begin{cases} Q & \text{for } k = l \,\forall\, k, l \\ 0 & \text{otherwise} \end{cases}. \tag{123}$$

The update of the auxiliary matrix $A^{(n)}$ becomes $$\begin{matrix} & & l^{(n)} & & \\ & & \downarrow & & \\ \Delta A^{(n)} = \big[0 & \dots & [Q]_{j^{(n)}}^C & \dots & 0\big], \end{matrix} \tag{124}$$

which corresponds to the basic case already treated.

Color-Dependent/Orthogonal Colors:

In this case, according to Eq. (97), $$Q^{k|l} = \begin{cases} Q^l & \text{for } k = l \\ 0 & \text{otherwise} \end{cases}. \tag{125}$$

The update of the auxiliary matrix $A^{(n)}$ becomes $$\begin{matrix} & & l^{(n)} & & \\ & & \downarrow & & \\ \Delta A^{(n)} = \big[0 & \dots & \big[Q^{l^{(n)}}\big]_{j^{(n)}}^C & \dots & 0\big]. \end{matrix} \tag{126}$$

Color-Dependent/Non-Orthogonal Colors:

In this case, the generalized interference matrix $\tilde{Q}$ is broadly non-null and composed of block sub-matrices $Q^{k|l}$. Eq. (122) applies, $$\begin{matrix} 1 & & k & & C \\ \downarrow & & \downarrow & & \downarrow \\ \Delta A^{(n)} = \Big[\big[Q^{1|l^{(n)}}\big]_{j^{(n)}}^C & \dots & \big[Q^{k|l^{(n)}}\big]_{j^{(n)}}^C & \dots & \big[Q^{C|l^{(n)}}\big]_{j^{(n)}}^C\Big]. \end{matrix} \tag{127}$$

B.III. Radio Resource Management for Massive-MIMO Networks

Wireless networks exploiting M-MIMO technology are of growing commercial interest. In the following a method to perform Radio Resource Management in M-MIMO based on the disclosed Heuristic Radio Resource Management algorithm(s) will be described. The formulation will be first detailed for the Color-independent/Orthogonal colors case, i.e., the channel matrix H is independent (or approximately independent) of the radio resource (e.g., single-carrier TDM or narrowband FDM and/or MF-TDM), and the assignment of a given radio resource to a user does not generate interference to users assigned to different colors. The more general cases can be easily derived and necessary modifications will be shortly addressed.

Once the channel matrix H is known (e.g., either from direct channel estimation, or derived from the hub-station/users geometry), under the assumption that all users exploit the same color, precoding/beamforming matrix W could be derived according to any of the known M-MIMO techniques, such as Matched Filtering (MF):

$$W = H^H. \tag{128}$$

Zero-Forcing (ZF):

$$W = \left(H^H H\right)^+ H^H = H^H\left(H H^H\right)^+. \tag{129}$$

Minimum Mean Square Error (MMSE):

$$W = \left(H^H H + \lambda I\right)^{-1} H^H = H^H\left(H H^H + \lambda I\right)^{-1}. \tag{130}$$

With the precoding/beamforming matrix W established, the power transfer matrix S can be evaluated, $$S = |HW|^2, \tag{131}$$

where the squared absolute value operation on the matrix has to be performed entry-wise.

The power transfer matrix S can now be used as input to the Heuristic RRM. Once the sets of users per color are known, the optimal precoding/beamforming matrices for each set can be evaluated. It is to be remarked that for terrestrial wireless networks, the channel matrix H estimation is eased by the fact that the channel reciprocity in case of commonly used Time Division Duplexing (TDD) can be used. Techniques for M-MIMO channel matrix estimation in wireless terrestrial networks are summarized in Chapter 3 of the book "Massive MIMO Networks: Spectral, Energy, and Hardware Efficiency", by Emil Björnson, Jakob Hoydis, Luca Sanguinetti, http://www.nowpublishers.com (reference literature 4).

In this respect it can be noted that the matrices $(H^H H)^+$ or $(HH^H)^+$ of zero forcing as well as the matrices $(H^H H+\lambda I)^{-1}$ or $H^H(HH^H+\lambda I)^{-1}$ of the MMSE are corrective terms to the zero-order matrix $H^H$ of the matched filter precoding/beamforming matrix. Considering that the matched filter precoding/beamforming can be evaluated in the most economical way (as it does not require matrices inversion), it can be efficiently used for a fast evaluation of the power transfer matrix, $$S_{MF} = \left|HH^H\right|^2. \tag{132}$$

The goodness of the choice of the $S_{MF}$ to perform the color assignment in M-MIMO can be also justified by the fact that the Gram matrix $HH^H$ is an algebraic measure of the orthogonality between channel row vectors of every possible pair of users.

For the most general case of color dependency of the channel, the information of the channel response for each user j, for receiving color k when the hub-station array transmits at color l, $$h_j^{k|l},$$

would be needed. This information is collected in block channel matrices $H^{k|l}$, and an optimal precoding/beamforming matrix can be derived for each color based on $H^{l|l}$. The form of the power transfer matrices is summarized below.

Color-Independent/Orthogonal Colors:

$$S_{MF} = |HH^H|^2, \tag{133}$$

Color-Dependent/Orthogonal Colors:

$$S_{MF}^{l} = |H^{l}(H^{l})^H|^2, \tag{134}$$

Color-Dependent/Non-Orthogonal Colors:

$$S_{MF}^{k|l} = |H^{k|l}(H^{l|l})^H|^2, \tag{135}$$

The various embodiments described above can be combined to provide further embodiments. All of the patents, patent application publications, and non-patent publications referred to in this specification and/or listed in the Application Data Sheet are incorporated herein by reference, in their entirety. Aspects of the embodiments can be modified, if necessary to employ concepts of the various patents, applications, and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled.

The invention claimed is:

1. A method of determining a radio resource mapping that assigns a plurality of user terminals to a set of radio resource blocks, for performing wireless communications between a hub station and the plurality of user terminals, the method comprising:

obtaining a set of quantities indicating mutual radio interferences between pairs of user terminals among the plurality of user terminals;

determining the radio resource mapping in one or more iterations, by successively updating an intermediate radio resource mapping, applying a constraint that each user terminal is assigned to at most one radio resource block among the set of radio resource blocks, wherein each iteration comprises:

determining, for each radio resource block, based on the intermediate radio resource mapping and the set of quantities indicating mutual radio interferences, indications of aggregated radio interferences that are expected to be received by any non-assigned user terminals among the plurality of user terminals when assigned to the respective radio resource block, from any user terminals already assigned to the respective radio resource block;

for a given non-assigned user terminal, determining, based on said indications of aggregated radio interferences, a radio resource block among the set of radio resource blocks that results in the smallest aggregated radio interference for the given non-assigned user terminal; and updating the intermediate radio resource mapping to assign the given non-assigned user terminal to the determined radio resource block.

2. The method according to claim 1, further comprising, in each iteration:

determining, based on said indications of aggregated radio interferences, a non-assigned user terminal that is expected to receive the largest aggregated radio interference among the non-assigned user terminals for any of the radio resource blocks; and selecting the determined non-assigned user terminal as the given non-assigned user terminal.

3. The method according to claim 1, wherein the given non-assigned user terminal is a user terminal that newly requests wireless communication with the hub station.

4. The method according to claim 1, further comprising, in a first iteration:

selecting the user terminal that has the largest mutual radio interference among the mutual radio interferences; and initializing the intermediate radio resource mapping to assign the selected user terminal to a radio resource block among the set of radio resource blocks.

5. The method according to claim 1, wherein obtaining the set of quantities indicating mutual radio interferences between pairs of user terminals among the plurality of user terminals comprises obtaining an N×N interference matrix Q that indicates mutual radio interferences between pairs of user terminals among the plurality of user terminals, where N is the number of user terminals;

wherein determining the indications of aggregated radio interferences comprises determining an N×C aggregated interference matrix Aby a matrix multiplication based on the interference matrix Q and an N×C intermediate radio resource mapping matrix C, where C is the number of radio resource blocks, with matrix entries $a_{ij}$ of the aggregated interference matrix A indicating an aggregated radio interference that an i-th user terminal is expected to receive when assigned to a j-th radio resource block; and wherein the radio resource mapping matrix C is a binary matrix that implements the intermediate radio resource mapping, with matrix entries $c_{ij}$ indicating whether or not the i-th user terminal is assigned to the j-th radio resource block.

6. The method according to claim 1, further comprising:

determining the set of quantities indicating mutual radio interferences between pairs of user terminals among the plurality of user terminals based on mutual distances on ground between the user terminals among the plurality of terminals.

7. The method according to claim 1, further comprising: determining the set of quantities indicating mutual radio interferences between pairs of user terminals among the plurality of user terminals based on an independent determination of a beam pattern for each user terminal among the plurality of user terminals.

8. The method according to claim 1, further comprising: determining the set of quantities indicating mutual radio interferences between pairs of user terminals among the plurality of user terminals based on a channel matrix representing a complex transfer function between an antenna array of the hub-station array and the plurality of user terminals.

9. The method according to claim 1, wherein obtaining the set of quantities indicating mutual radio interferences between pairs of user terminals among the plurality of user terminals comprises obtaining a CN×CN generalized interference matrix $\tilde{Q}$ that indicates mutual radio interferences between pairs of user terminals among the plurality of user terminals, with a first user terminal using one of the radio resource blocks of C radio resource blocks, and a second user terminal using another one of the radio resource blocks of C radio resource blocks, where N is the number of user terminals;

wherein determining the indications of aggregated radio interferences comprises determining an N×C aggregated interference matrix A by a reordering of a matrix multiplication based on the generalized interference matrix $\tilde{Q}$ and a vectorization of a N×C intermediate radio resource mapping matrix C, where C is the number of radio resource blocks, with matrix entries $s_{ij}$ of the aggregated interference matrix A indicating an aggregated radio interference that an i-th user terminal is expected to receive when assigned to a j-th radio resource block; and wherein the radio resource mapping matrix C is a binary matrix that implements the intermediate radio resource mapping, with matrix entries $c_{ij}$ indicating whether or not the i-th user terminal is assigned to the j-th radio resource block.

10. The method according to claim 1, wherein the radio resource blocks are time slots, frequency slots, pseudo-random spreading sequences, polarization modes, or combinations thereof.

11. A method of performing wireless communications between a hub station and a plurality of user terminals, comprising:

the method of determining a radio resource mapping according to claim 1; and communicating wirelessly between the hub station and the plurality of user terminals using the radio resource mapping.

12. A non-transitory computer-readable storage medium storing a computer program including instructions that, when executed by a computer processor, cause the computer processor to perform the method according to claim 1.

* * * * *